United States Patent
Ota

(10) Patent No.: US 9,383,546 B2
(45) Date of Patent: Jul. 5, 2016

(54) IMAGING LENS AND IMAGING APPARATUS EQUIPPED WITH THE IMAGING LENS

(71) Applicant: FUJIFILM Corporation, Tokyo (JP)

(72) Inventor: Motoari Ota, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 77 days.

(21) Appl. No.: 14/547,156

(22) Filed: Nov. 19, 2014

(65) Prior Publication Data

US 2015/0146309 A1    May 28, 2015

(30) Foreign Application Priority Data

Nov. 25, 2013  (JP) ................................. 2013-243022

(51) Int. Cl.
*G02B 9/62* (2006.01)
*G02B 13/00* (2006.01)

(52) U.S. Cl.
CPC .............. *G02B 9/62* (2013.01); *G02B 13/0045* (2013.01)

(58) Field of Classification Search
CPC ........ G02B 13/0045; G02B 13/18; G02B 9/62
See application file for complete search history.

(56) References Cited

U.S. PATENT DOCUMENTS

| | | | |
|---|---|---|---|
| 8,379,323 B2 | 2/2013 | Huang et al. | |
| 8,385,006 B2 | 2/2013 | Tsai et al. | |
| 2014/0111873 A1* | 4/2014 | Huang ..................... | G02B 9/62 359/713 |
| 2014/0211326 A1* | 7/2014 | Lai ..................... | G02B 13/0045 359/713 |
| 2014/0254029 A1* | 9/2014 | Hsu .......................... | G02B 9/62 359/713 |
| 2014/0320980 A1* | 10/2014 | Chen ........................ | G02B 9/62 359/713 |

\* cited by examiner

*Primary Examiner* — David N Spector
(74) *Attorney, Agent, or Firm* — Young & Thompson

(57) ABSTRACT

An imaging lens is substantially constituted by six lenses, including: a first lens having a positive refractive power and a convex surface toward the object side; a second lens having a negative refractive power; a third lens having a negative refractive power; a fourth lens having a positive refractive power; a fifth lens having a negative refractive power; and a sixth lens having a biconcave shape, provided in this order from the object side.

20 Claims, 26 Drawing Sheets

EXAMPLE 1

EXAMPLE 5

EXAMPLE 6

EXAMPLE 9

EXAMPLE 10

EXAMPLE 12

IMAGING LENS AND IMAGING APPARATUS EQUIPPED WITH THE IMAGING LENS

CROSS REFERENCE TO RELATED APPLICATIONS

The present application claims priority under 35 U.S.C §119 to Japanese Patent Application No. 2013-243022 filed on Nov. 25, 2013. The above application is hereby expressly incorporated by reference in its entirety, into the present application.

BACKGROUND OF THE INVENTION

1. Technical Field

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

2. Background Art

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, have been proposed. Recently, imaging lenses having a six lens configuration have also been proposed. For example, U.S. Pat. Nos. 8,385,006 and 8,379,323 propose imaging lenses with six lens configurations, constituted by: a first lens having a positive refractive power, a second lens having a negative refractive power, a third lens having a negative refractive power, a fourth lens having a positive refractive power, a fifth lens having a negative refractive power, and a sixth lens having a negative refractive power.

DISCLOSURE OF THE INVENTION

Meanwhile, there is demand for imaging lenses for use in apparatuses which are becoming thinner such as smart phones and tablet terminals to have shorter total lengths and wider angles of view while being compatible with the higher numbers of pixels in imaging elements. However, a wider angle of view is desired in the imaging lens disclosed in U.S. Pat. No. 8,385,006, and a further shortening of the total length is desired in the imaging lens disclosed in U.S. Pat. No. 8,379,323.

The present invention has been developed in view of the foregoing points. The object of the present invention is to provide an imaging lens that can realize a shortening of the total length and a wider angle of view, while being compatible with the higher numbers of pixels in imaging elements. It is another object of the present invention to provide an imaging apparatus equipped with the lens, which is capable of obtaining high resolution photographed images.

An imaging lens of the present invention substantially consists of six lenses, including:

a first lens having a positive refractive power and a convex surface toward the object side;
a second lens having a negative refractive power;
a third lens having a negative refractive power;
a fourth lens having a positive refractive power;
a fifth lens having a negative refractive power; and
a sixth lens having a biconcave shape, provided in this order from the object side.

The optical performance of the imaging lens of the present invention can be further improved by adopting the following favorable configurations.

In the imaging lens of the present invention, it is preferable for the fifth lens to be of a meniscus shape having a concave surface toward the object side.

In the imaging lens of the present invention, it is preferable for the fourth lens to have a convex surface toward the image side.

In the imaging lens of the present invention, it is preferable for the second lens to have a concave surface toward the image side.

It is preferable for the imaging lens of the present invention to satisfy one or arbitrary combinations of Conditional Formulae (1) through (5), (1-1) through (5-1), and (1-2) through (5-2) below.

$$-10 < f/f6 < -0.8 \tag{1}$$

$$-5 < f/f6 < -0.85 \tag{1-1}$$

$$-3 < f/f6 < -0.89 \tag{1-2}$$

$$-1.1 < f \cdot P23 < 0 \tag{2}$$

$$-1.1 < f \cdot P23 < -0.2 \tag{2-1}$$

$$-1.1 < f \cdot P23 < -0.4 \tag{2-2}$$

$$-0.088 < f/f5 < 0 \tag{3}$$

$$-0.088 < f/f5 < -0.02 \tag{3-1}$$

$$-0.085 < f/f5 < -0.03 \tag{3-2}$$

$$0 < (L5r - L5f)/(L5r + L5f) < 0.073 \tag{4}$$

$$0.02 < (L5r - L5f)/(L5r + L5f) < 0.068 \tag{4-1}$$

$$0.03 < (L5r - L5f)/(L5r + L5f) < 0.063 \tag{4-2}$$

$$0.5 < f \tan \omega / L6r < 20 \tag{5}$$

$$0.7 < f \tan \omega / L6r < 10 \tag{5-1}$$

$$1 < f \tan \omega / L6r < 5 \tag{5-2}$$

wherein f is the focal distance of the entire system, f5 is the focal length of the fifth lens, f6 is the focal length of the sixth lens, L5f is the paraxial radius of curvature of the surface of the fifth lens toward the object side, L5r is the paraxial radius of curvature of the surface of the fifth lens toward the image side, L6r is the paraxial radius of curvature of the surface of the sixth lens toward the image side, ω is half the maximum angle of view when focused on an object at infinity, and P23 is the refractive power of an air lens formed between the surface of the second lens toward the image side and the surface of the third lens toward the object side, the refractive power of the air lens being obtained by Formula (P) below:

$$P23 = \frac{1-Nd2}{L2r} + \frac{Nd3-1}{L3f} - \frac{(1-Nd2) \times (Nd3-1) \times D5}{L2r \times L3f} \quad (P)$$

wherein Nd2 is the refractive index of the second lens with respect to the d line, Nd3 is the refractive index of the third lens with respect to the d line, L2r is the paraxial radius of curvature of the surface of the second lens toward the image side, L3f is the paraxial radius of curvature of the surface of the third lens toward the object side, and D5 is an air space distance between the second lens and the third lens along the optical axis.

Note that in the imaging lens of the present invention, the expression "substantially consists of six lenses" means that the imaging lens of the present invention may also include lenses that practically have no power, optical elements other than lenses such as a stop and a cover glass, and mechanical components such as lens flanges, a lens barrel, a camera shake correcting mechanism, etc., in addition to the six lenses.

Note also that the shapes of the surfaces of the lenses and the signs of the refractive indices thereof are considered in the paraxial region in the case that the lenses include aspherical surfaces. The signs of the refractive indices are positive for surfaces having convex surfaces toward the object side, and negative for surfaces having convex surfaces toward the image side.

An imaging apparatus of the present invention is equipped with the imaging lens of the present invention.

According to the imaging lens of the present invention, the configuration of each lens element is optimized within a lens configuration having six lenses as a whole, and the shapes of the first lens and the sixth lens are favorably configured in particular. Therefore, a lens system that can achieve a short total length and a wide angle of view while being compatible with an increased number of pixels of imaging elements can be realized.

The imaging apparatus of the present invention is equipped with the imaging lens of the present invention. Therefore, the apparatus size of the imaging lens in the direction of the optical axis can be shortened, and the imaging apparatus of the present invention is capable of obtaining high resolution photographed images at a wide angle of view.

BEST MODE FOR CARRYING OUT THE INVENTION

Hereinafter, embodiments of the present invention will be described in detail with reference to the attached drawings.

Figure 1:
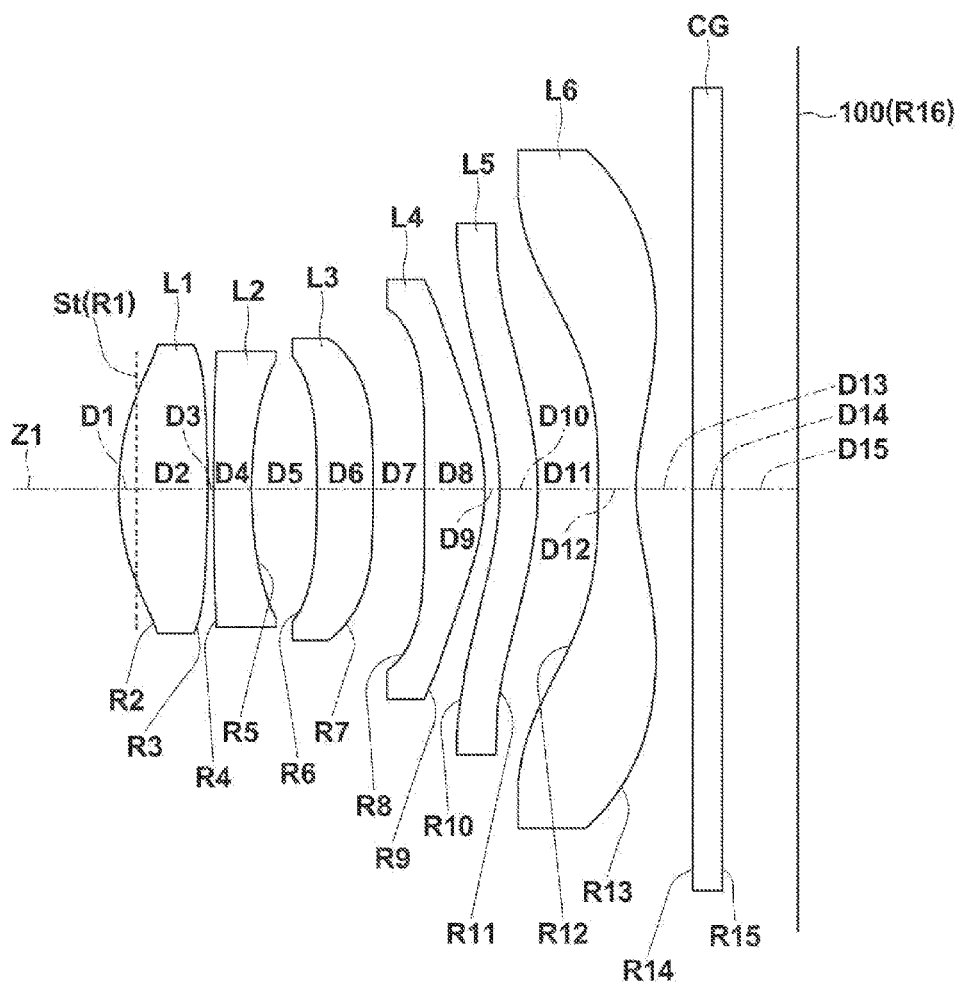
FIG. 1 is a sectional diagram that illustrates a first example of the configuration of an imaging lens according to an embodiment of the present invention, and corresponds to a lens of Example 1.
Figure 2:
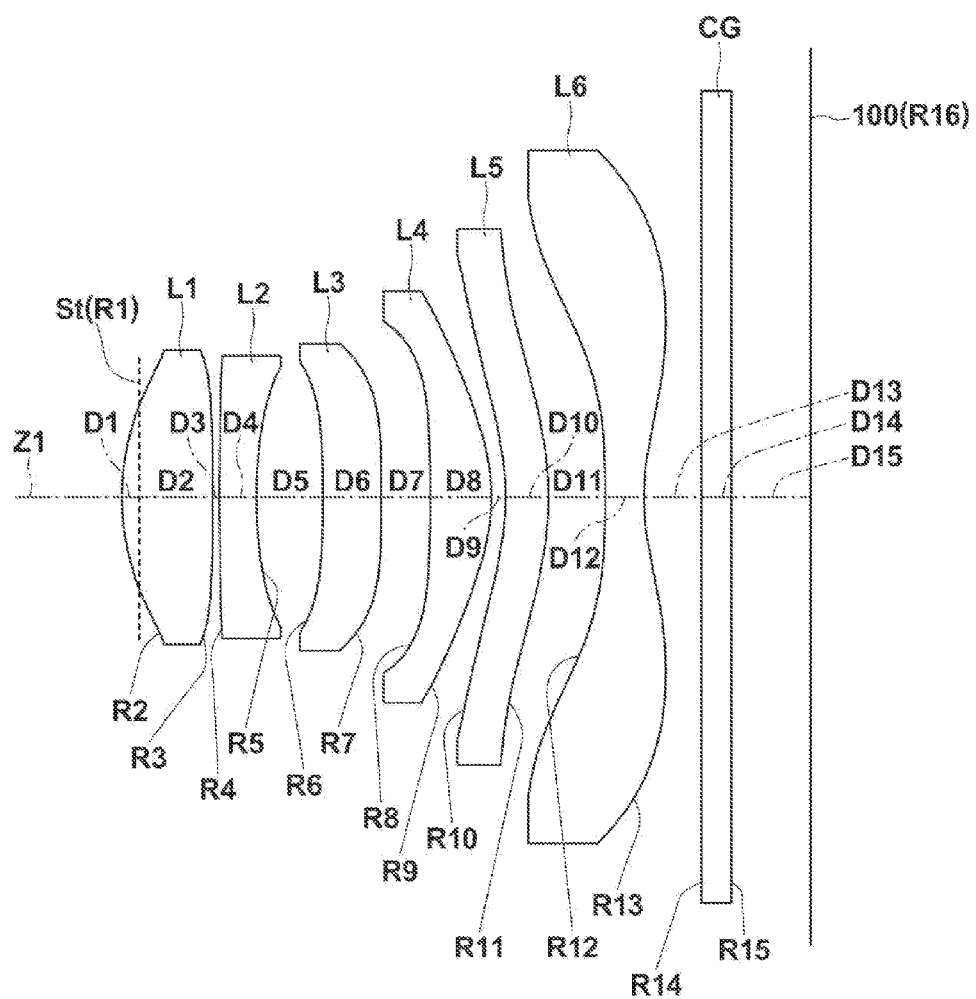
FIG. 2 is a sectional diagram that illustrates a second example of the configuration of an imaging lens according to an embodiment of the present invention, and corresponds to a lens of Example 2.
Figure 3:
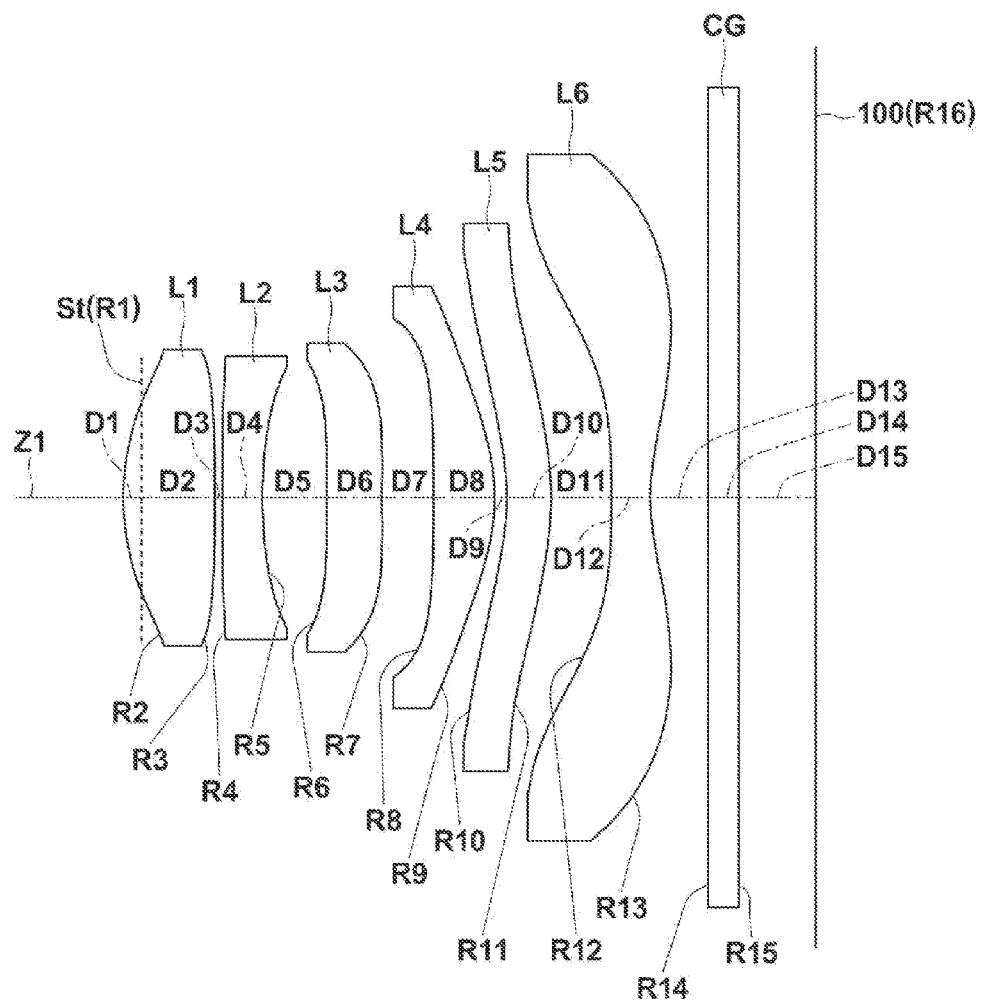
FIG. 3 is a sectional diagram that illustrates a third example of the configuration of an imaging lens according to an embodiment of the present invention, and corresponds to a lens of Example 3.
Figure 4:
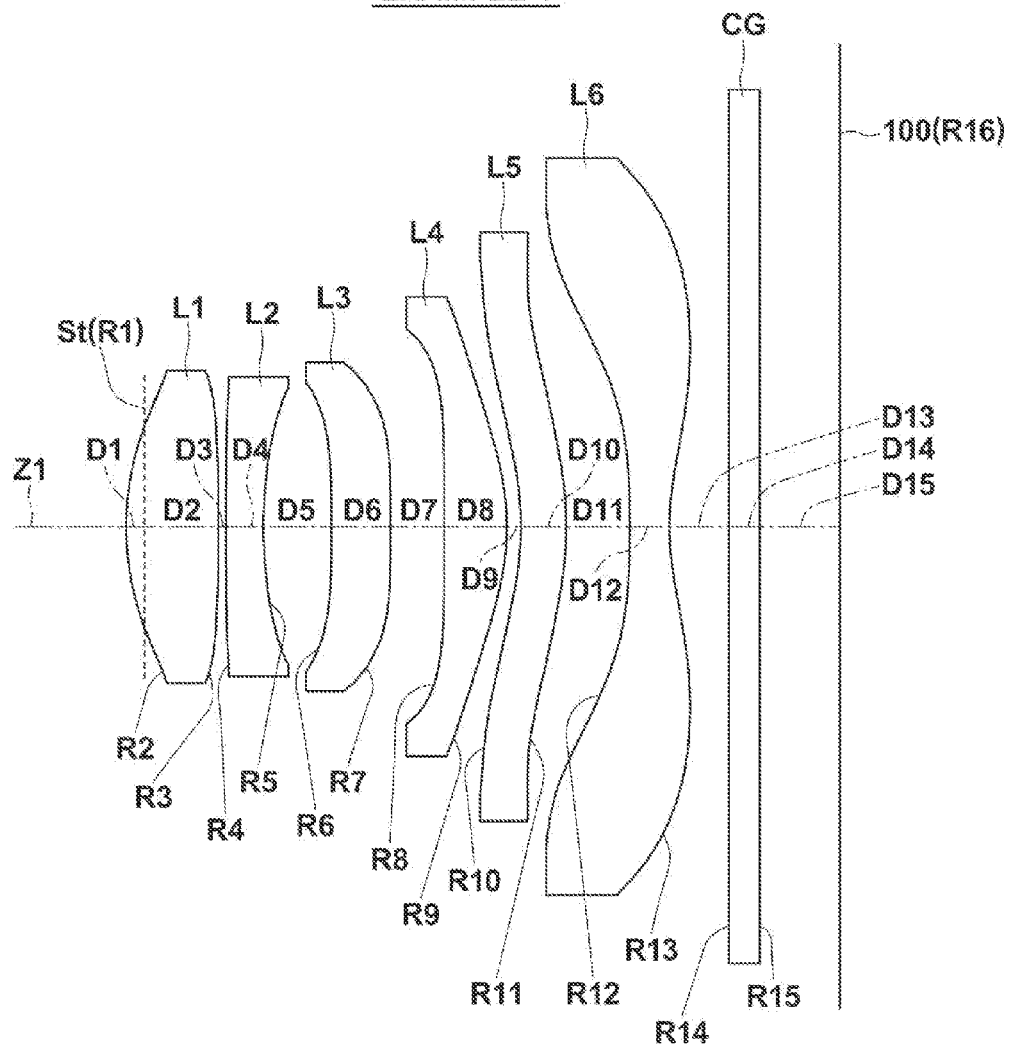
FIG. 4 is a sectional diagram that illustrates a fourth example of the configuration of an imaging lens according to an embodiment of the present invention, and corresponds to a lens of Example 4.
Figure 5:
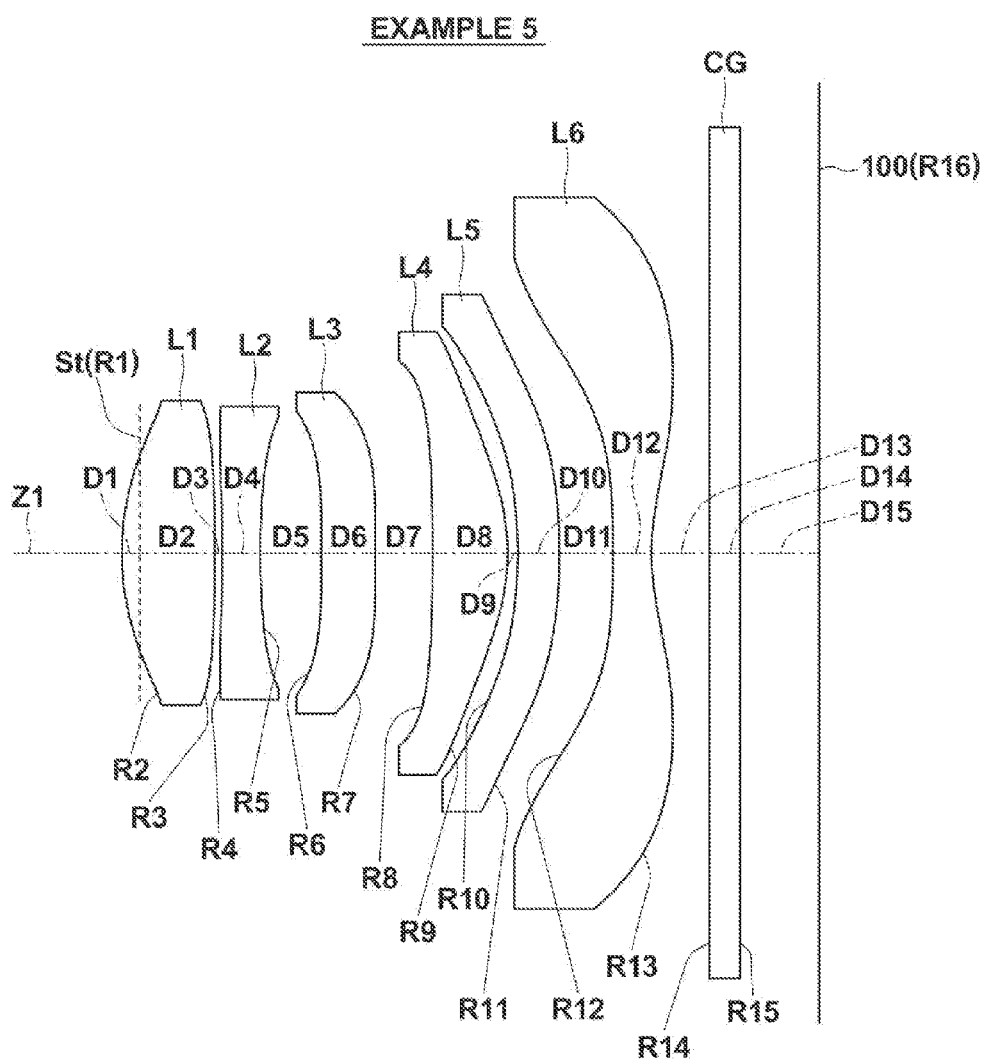
FIG. 5 is a sectional diagram that illustrates a fifth example of the configuration of an imaging lens according to an embodiment of the present invention, and corresponds to a lens of Example 5.
Figure 6:
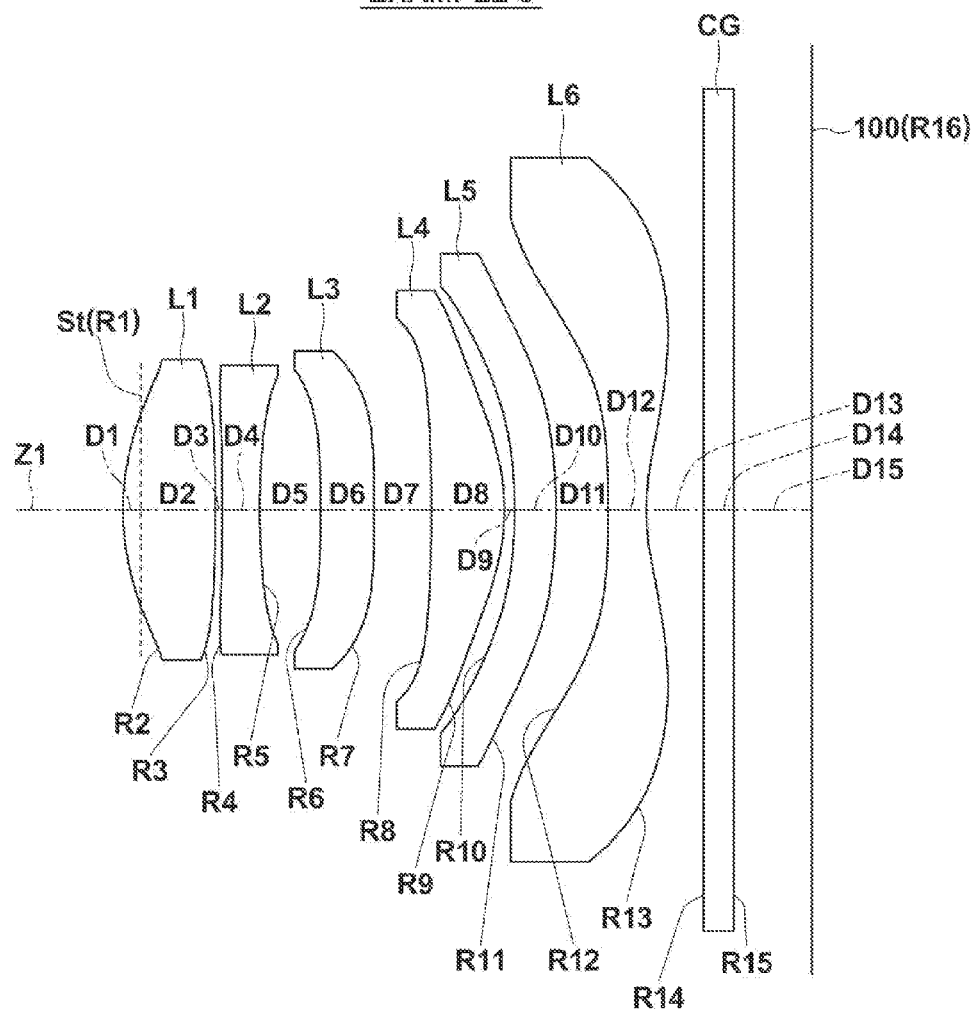
FIG. 6 is a sectional diagram that illustrates a sixth example of the configuration of an imaging lens according to an embodiment of the present invention, and corresponds to a lens of Example 6.
Figure 7:
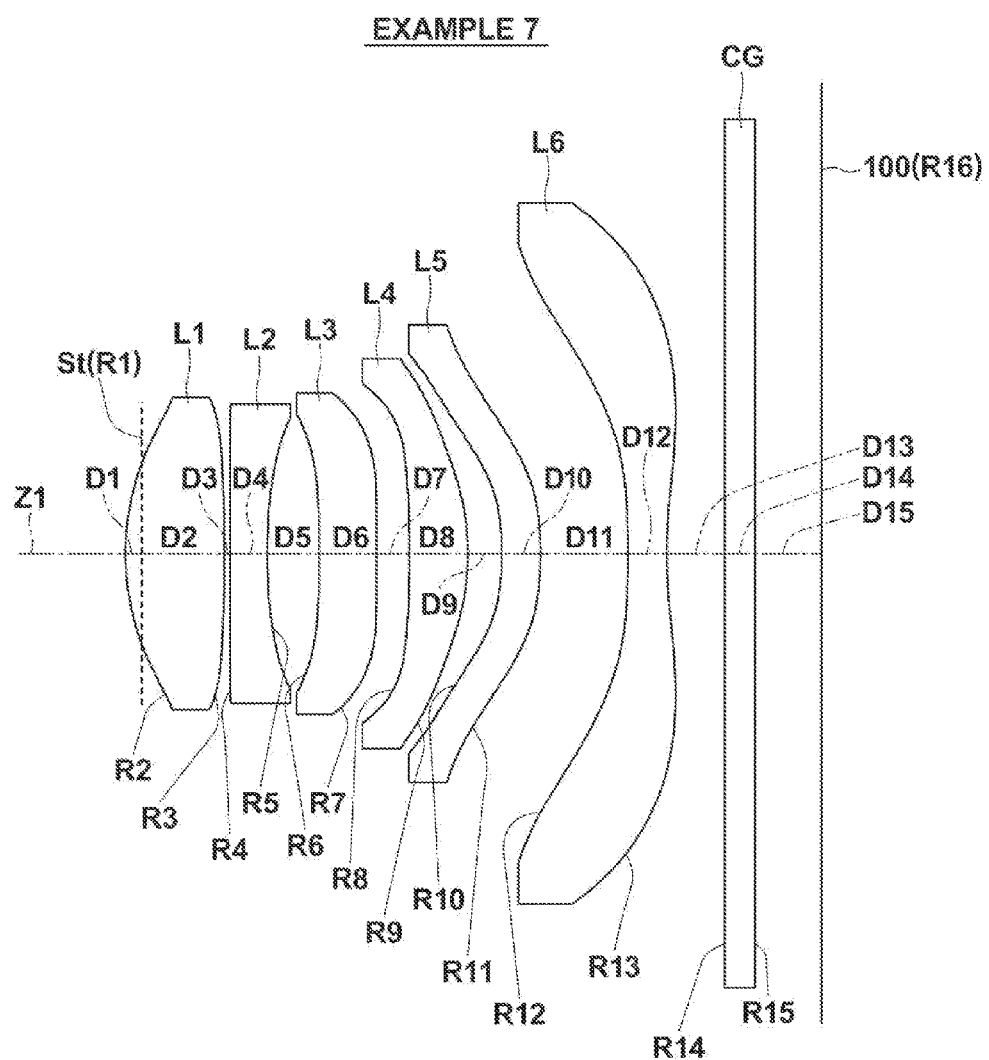
FIG. 7 is a sectional diagram that illustrates a seventh example of the configuration of an imaging lens according to an embodiment of the present invention, and corresponds to a lens of Example 7.
Figure 8:
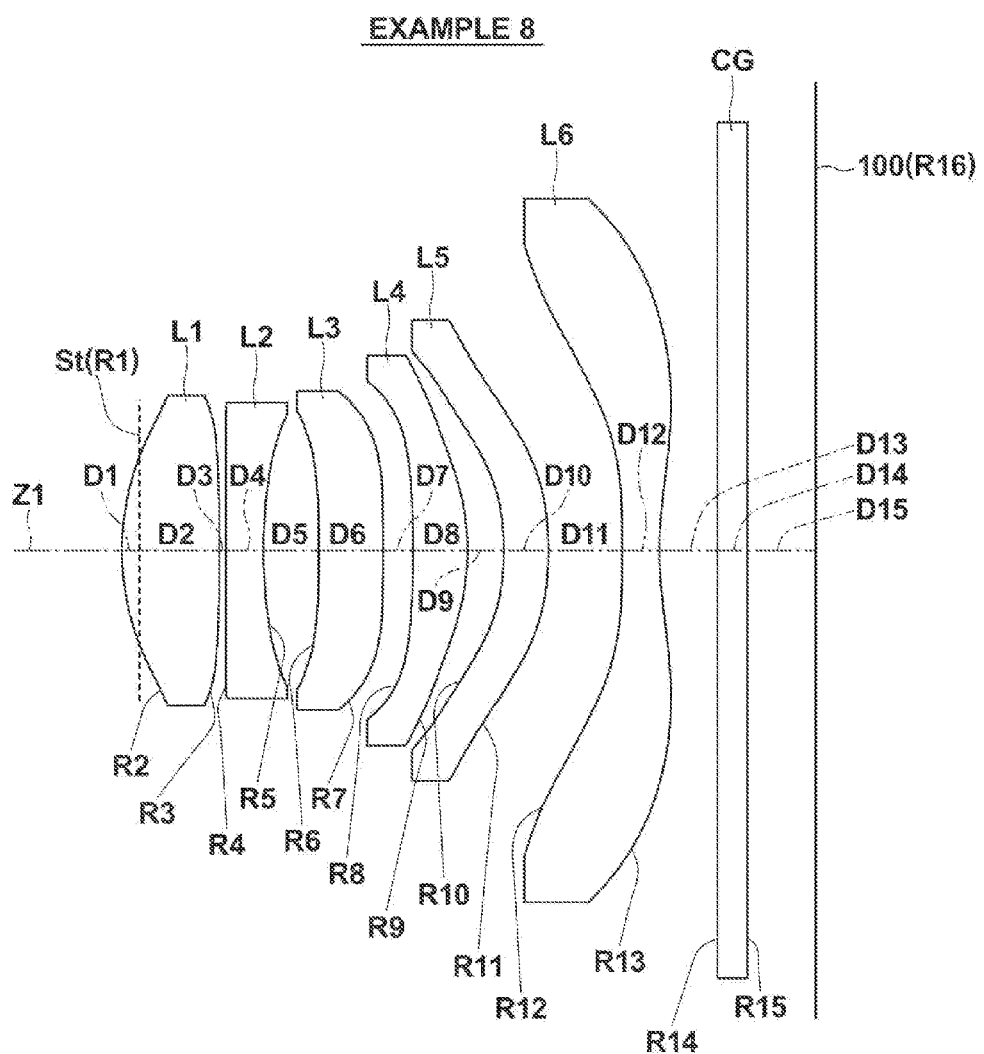
FIG. 8 is a sectional diagram that illustrates an eighth example of the configuration of an imaging lens according to an embodiment of the present invention, and corresponds to a lens of Example 8.
Figure 9:
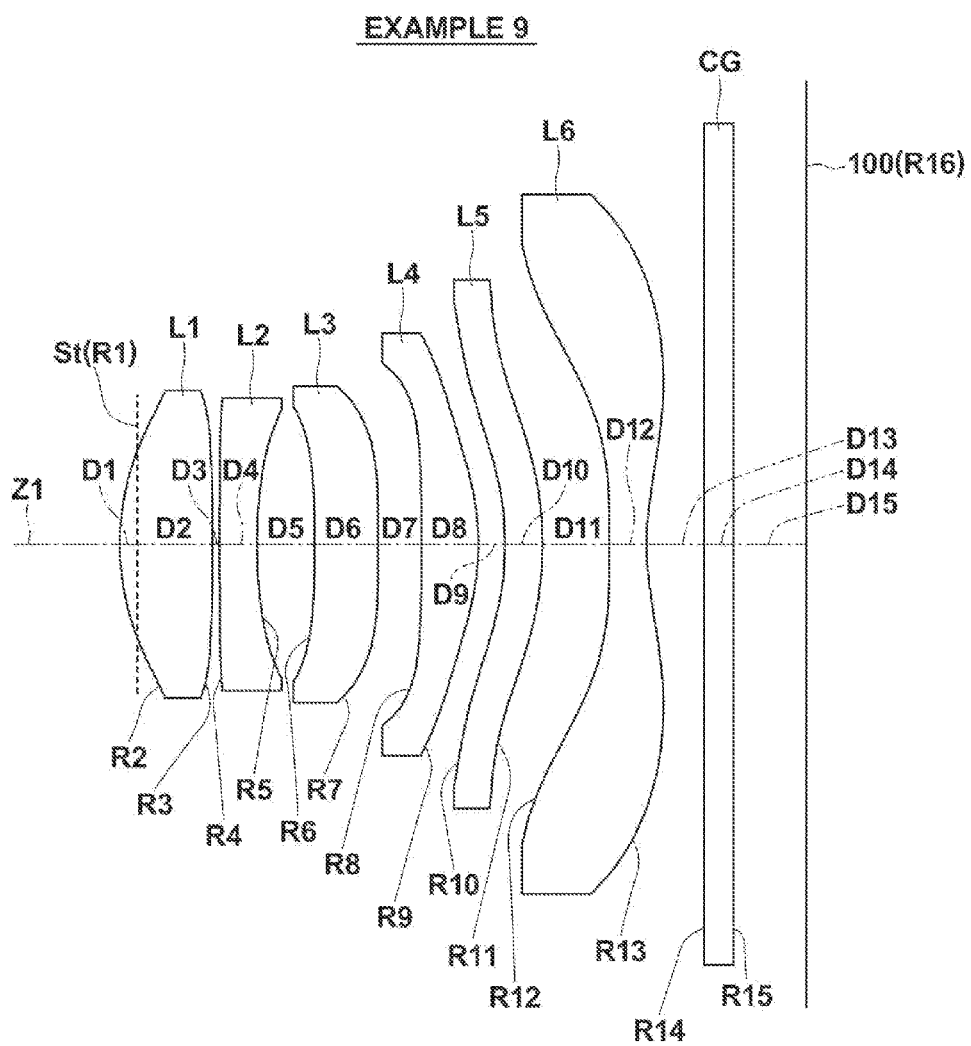
FIG. 9 is a sectional diagram that illustrates a ninth example of the configuration of an imaging lens according to an embodiment of the present invention, and corresponds to a lens of Example 9.
Figure 10:
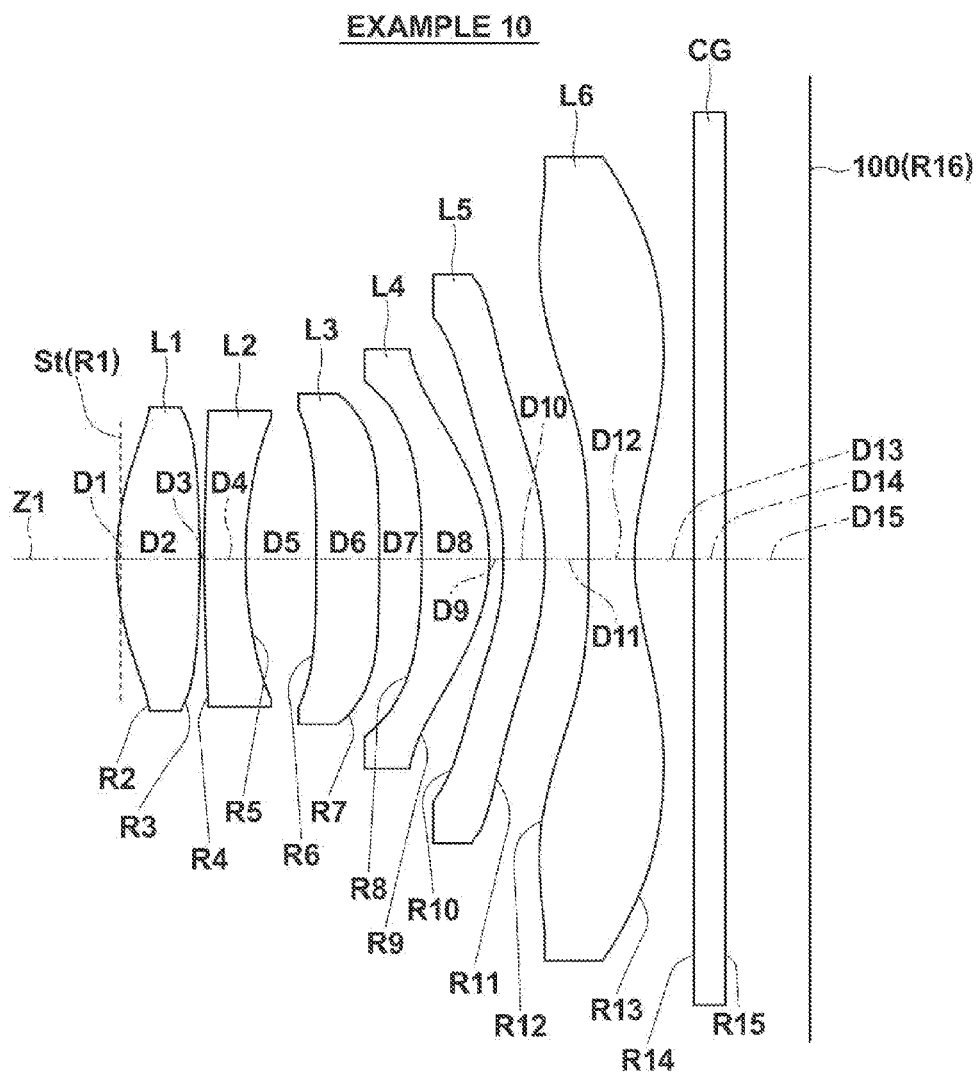
FIG. 10 is a sectional diagram that illustrates a tenth example of the configuration of an imaging lens according to an embodiment of the present invention, and corresponds to a lens of Example 10.
Figure 11:
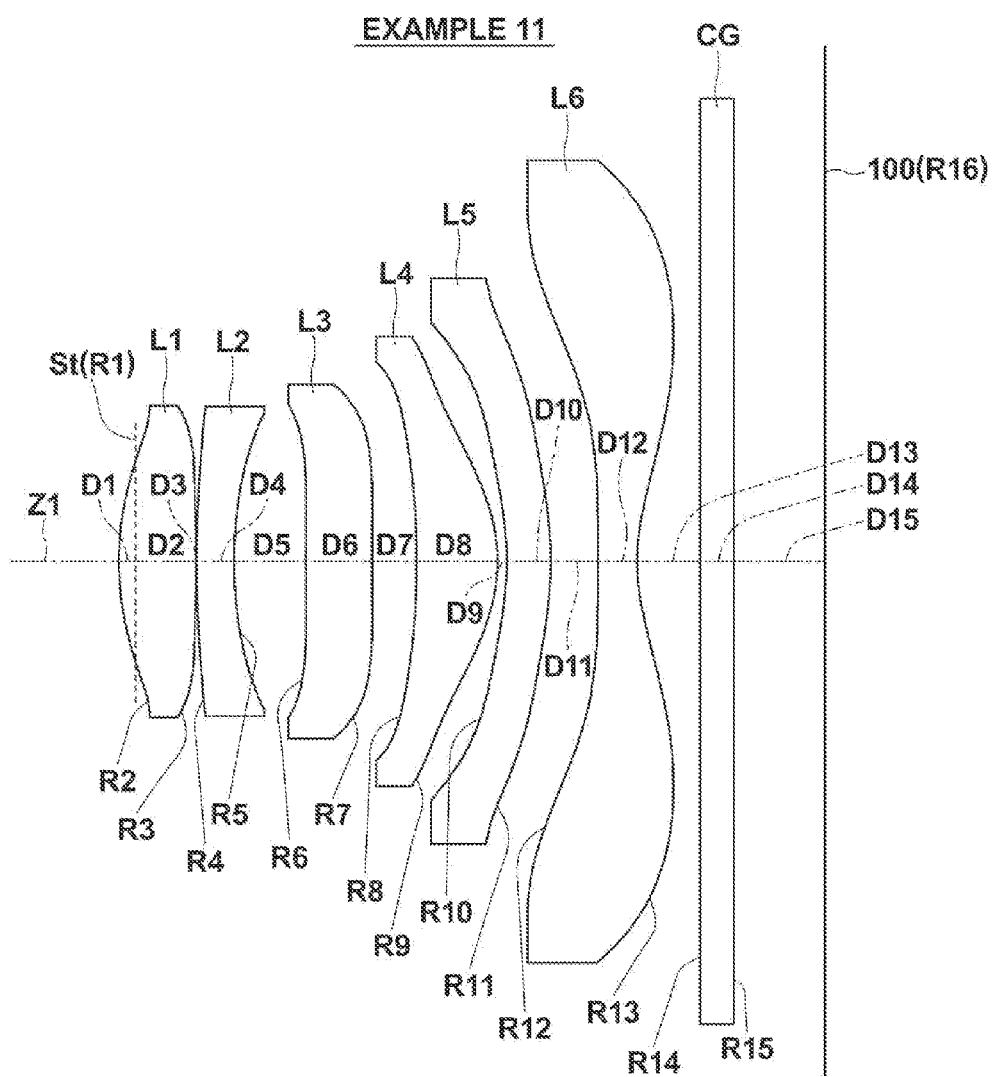
FIG. 11 is a sectional diagram that illustrates an eleventh example of the configuration of an imaging lens according to an embodiment of the present invention, and corresponds to a lens of Example 11.
Figure 12:
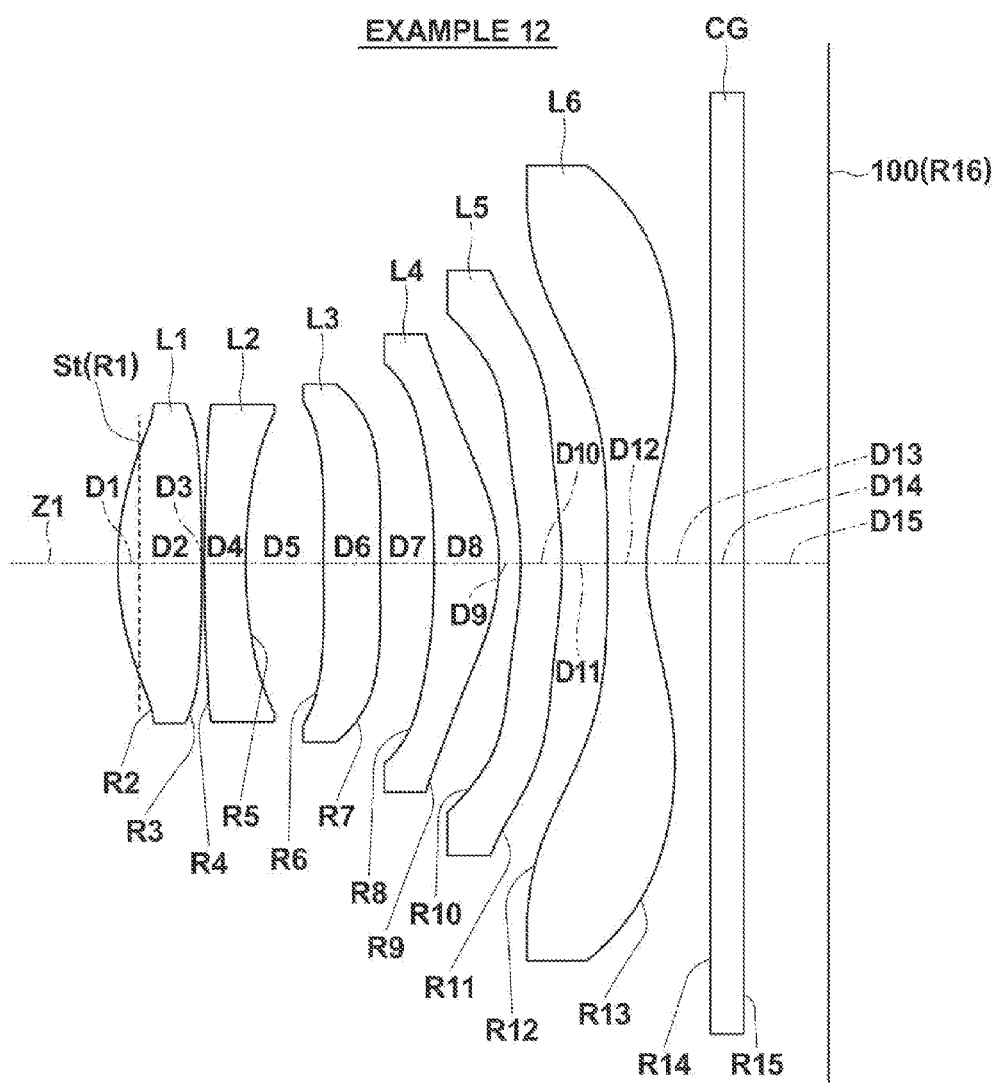
FIG. 12 is a sectional diagram that illustrates a twelfth example of the configuration of an imaging lens according to an embodiment of the present invention, and corresponds to a lens of Example 12.
Figure 13:
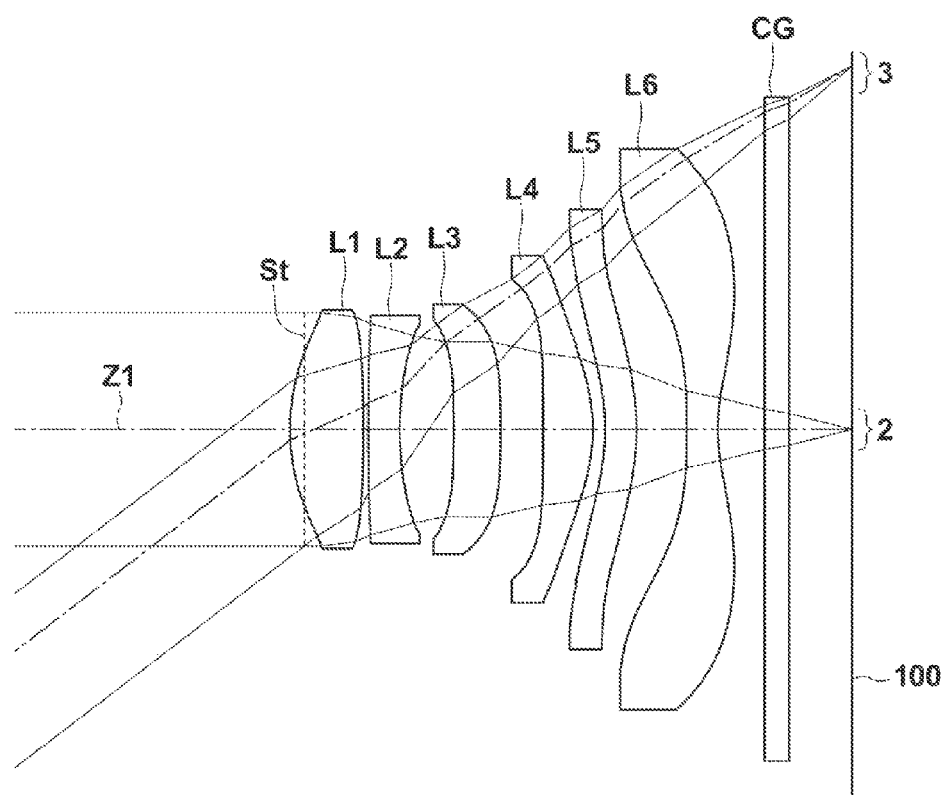
FIG. 13 is a diagram that illustrates the paths of light rays that pass through the imaging lens of FIG. 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 12 are sectional diagrams that illustrate second through twelfth examples of lens configurations that correspond to Numerical Examples 2 through 12 (Table 3 through Table 24). In FIGS. 1 through 12, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 12 will also be described as necessary. In addition, FIG. 13 is a diagram that illustrates the paths of light rays that pass through the imaging lens L of FIG. 1. FIG. 13 illustrates the paths of an axial light beam 2 and a maximum angle of view light beam 3 from an object at a distance of infinity.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, a fifth lens L5, and a sixth lens L6 along the optical axis Z1, in this order from the object side.

Figure 26:
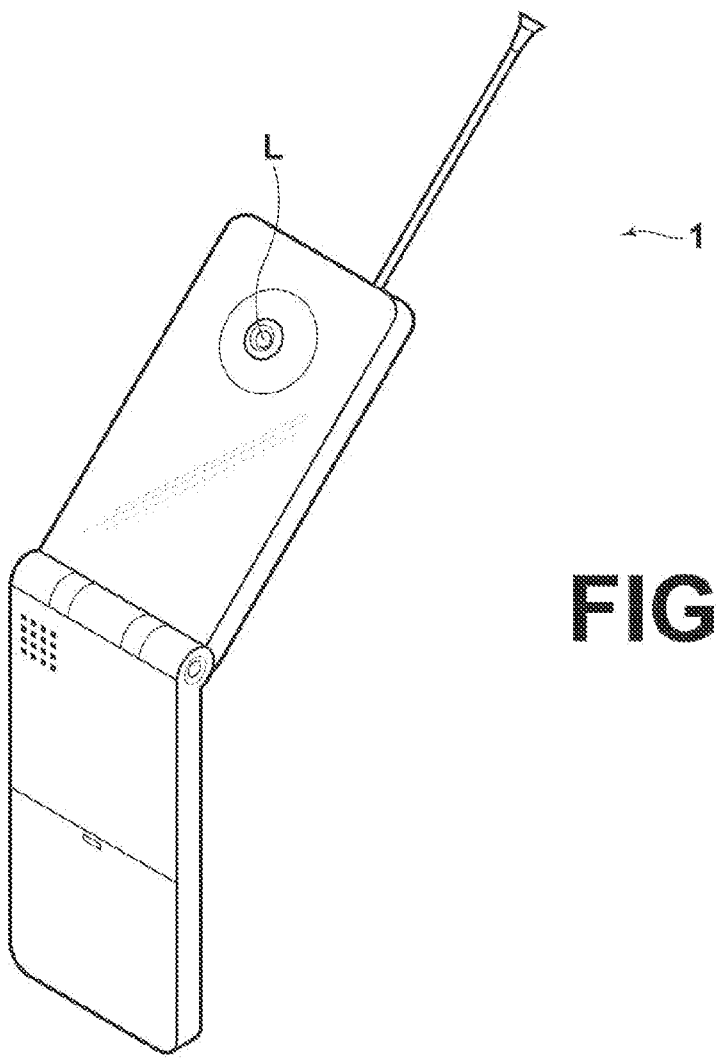
FIG. 26 is a diagram that illustrates a cellular telephone as an imaging apparatus equipped with the imaging lens of the present invention.

FIG. 26 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an image formation plane of the imaging lens L.

Figure 27:
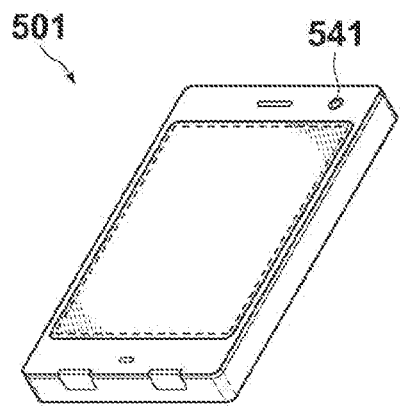
FIG. 27 is a diagram that illustrates a smart phone as an imaging apparatus equipped with the imaging lens of the present invention.

FIG. 27 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (image surface) of the imaging lens L.

Various optical members CG may be provided between the sixth lens L6 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the sixth lens L6 to obtain the same effect as that of the optical member CG. In this case, the number of parts can be reduced, and the total length can be shortened.

It is preferable for the imaging lens L to be equipped with an aperture stop St positioned at the object side of the surface of the second lens L2 toward the object side. By positioning the aperture stop St at the object side of the surface of the second lens L2 toward the object side, increases in the incident angles of light rays at peripheral angles of view that enter the image formation plane (imaging element) can be suppressed. It is preferable for the apertures stop St to be positioned at the object side of the surface of the first lens L1 toward the object side, in order to cause this advantageous effect to become more prominent. Note that the expression "positioned at the object side of the surface of the second lens L2 toward the object side" means that the position of the aperture stop in the direction of the optical axis is at the same position as the intersection of marginal axial rays of light and the surface of the second lens L2 toward the object side, or more toward the object side than this position. Similarly, the expression "positioned at the object side of the surface of the first lens L1 toward the object side" means that the position of the aperture stop in the direction of the optical axis is at the same position as the intersection of marginal axial rays of light and the surface of the second lens L1 toward the object side, or more toward the object side than this position.

Further, in the case that the aperture stop St is positioned at the object side of the surface of the first lens L1 toward the object side in the direction of the optical axis, it is preferable for the aperture stop St to be positioned at the image side of the apex of the surface of the first lens L1. In the case that the aperture stop St is positioned at the image side of the apex of the surface of the first lens L1 in this manner, the total length of the imaging lens including the aperture stop St can be shortened. Note that in the imaging lenses L of Examples 1 through 12 illustrated in FIG. 1 through FIG. 12, the aperture stop St is positioned at the object side of the surface of the first lens L1 toward the object side, and at the image side of the apex of the surface of the first lens L1. Note that the aperture stops St illustrated in FIG. 1 through FIG. 12 do not necessarily represent the sizes or shapes thereof, but indicate the positions thereof on the optical axis Z1.

In the imaging lens L, the first lens L1 has a positive refractive power in the vicinity of the optical axis. This configuration is advantageous from the viewpoint of shortening the total length of the lens. In addition, the first lens L1 has a convex surface toward the object side in the vicinity of the optical axis. Thereby, the positive refractive power of the first lens L1, which performs a substantial portion of the image forming function, can be sufficiently increased. As a result, shortening of the total length of the lens can be more favorably realized. In addition, it is preferable for the first lens L1 to be of a meniscus shape having a convex surface toward the object side in the vicinity of the optical axis, as shown in the second, the seventh through ninth, and the twelfth embodiments. In this case, the position of the rearward principal point can be closer to the object side, which is advantageous from the viewpoint of shortening the total length. Alternatively, the first lens L1 may be of a biconvex shape in the vicinity of the optical axis, as shown in the first, third through sixth, tenth, and eleventh embodiments. In this case spherical aberration can be favorably corrected.

The second lens L2 has a negative refractive power in the vicinity of the optical axis. Thereby, spherical aberration, field curvature, and longitudinal chromatic aberration can be favorably corrected. It is preferable for the second lens L2 to have a concave surface toward the image side in the vicinity of the optical axis. In this case, spherical aberration and longitudinal chromatic aberration which are generated when rays of light pass through the first lens L1 can be favorably corrected, facilitating realization of a shortening of the total length. In addition, the generation of field curvature can be favorably suppressed in the case that the second lens L2 has a concave surface toward the image side in the vicinity of the optical axis. The second lens L2 may be of a meniscus shape having a concave surface toward the image side in the vicinity of the optical axis, as shown in the first through fourth and the seventh through twelfth embodiments. In this case, the position of the rearward principal point of the second lens L2 can be closer to the object side, and the total length can be favorably shortened. Alternatively, the second lens L2 may be of a biconcave shape in the vicinity of the optical axis, as shown in the fifth and sixth embodiments. In this case, chromatic aberration can be favorably corrected, while the generation of higher order spherical aberration can be suppressed.

The third lens L3 has a negative refractive power in the vicinity of the optical axis. Thereby, spherical aberration, field curvature, and longitudinal chromatic aberration can be favorably corrected. By configuring both the second lens L2 and the third lens L3 adjacent to the second lens L2 to have negative refractive powers in the vicinity of the optical axis, negative refractive power is distributed between the second lens L2 and the third lens L3. Thereby, the refractive power of a negative lens group constituted by the second lens L2 and the third lens L3 can be favorably increased, while suppressing excessive increases in the individual negative refractive powers of the second lens L2 and the third lens L3. For this reason, the advantageous effects of favorably correcting spherical aberration, field curvature, and longitudinal chromatic aberration can become more prominent. In addition, the third lens L3 may be of a meniscus shape having a convex surface toward the object side in the vicinity of the optical axis, as shown in the tenth through twelfth embodiments. In this case, shortening of the total length can be favorably realized, while favorably correcting spherical aberration. Alternatively, the third lens L3 may be of a biconcave shape in the vicinity of the optical axis, as shown in the fifth, seventh, and eighth embodiments. In this case, longitudinal chromatic aberration can be favorably corrected. As a further alternative, the third lens L3 may be of a meniscus shape having a convex surface toward the image side in the vicinity of the optical axis, as shown in the first, second, fourth, sixth, and ninth embodiments. In this case, spherical aberration and astigmatism can be favorably corrected.

The fourth lens L4 has a positive refractive power in the vicinity of the optical axis. In addition, both the fifth lens L5 and the sixth lens L6 have negative refractive powers in the vicinity of the optical axis in the present imaging lens L. If the first lens L1 through the fourth lens L4 is considered to be a single positive lens group, the fifth lens L5 and the sixth lens L6 may be considered to be a single negative lens group in the present imaging lens L. That is, the imaging lens L is of a telephoto type configuration as a whole. For this reason, in the present imaging lens L, the rearward principal point of the imaging lens as a whole can be more toward the object side because the imaging lens L is of a telephoto configuration as a whole, and the total length can be favorably shortened. In addition, the fourth lens L4, which is provided most toward the image side within the positive lens group constituted by the first lens L1 through the fourth lens L4, has a positive refractive power in the vicinity of the optical axis. Therefore, the positive refractive power of the positive lens group constituted by the first lens L1 through the fourth lens L4 can be sufficiently increased, and the advantageous effect of shortening the total length of the lens obtained by the imaging lens L being of a telephoto type becomes more prominent. Further, by the fourth lens L4, which is provided most toward the image side within the positive lens group constituted by the first lens L1 through the fourth lens L4, having a positive refractive power in the vicinity of the optical axis, generation of distortion at a central angle of view can be suppressed. In addition, increases in the incident angles of light rays that pass through the optical system into the image formation plane (imaging element) can be suppressed.

In addition, it is preferable for the fourth lens L4 to have a convex surface toward the image side in the vicinity of the optical axis. By adopting this configuration, astigmatism can be favorably corrected. In addition, it is preferable for the fourth lens L4 to be of a meniscus shape having a convex surface toward the image side in the vicinity of the optical axis as shown in the first through third and the fifth through twelfth embodiments, in order to cause this advantageous effect to become more prominent. Alternatively, the fourth lens L4 may be of a biconvex shape as shown in the fourth embodiment. In this case, the positive refractive power of the fourth lens L4 can be favorably increased, which is advantageous from the viewpoint of shortening the total length of the lens.

The fifth lens L5 has a negative refractive power in the vicinity of the optical axis. In addition, it is preferable for the fifth lens L5 to be of a meniscus shape having a concave surface toward the object side in the vicinity of the optical axis. In this case, astigmatism can be favorably corrected, which is advantageous from the viewpoint of widening the angle of view.

The sixth lens L6 has a negative refractive power in the vicinity of the optical axis. Thereby, shortening of the total length can be realized, while favorably correcting field curvature. In addition, the sixth lens L6 is of a biconcave shape in the vicinity of the optical axis. The surface of the sixth lens L6 toward the object side has a negative refractive power in the vicinity of the optical axis, which is advantageous from the viewpoint of widening the angle of view. In addition, the surface of the sixth lens L6 toward the image side has a negative refractive power in the vicinity of the optical axis, which is advantageous from the viewpoint of shortening the total length. Further, by the sixth lens L6 being of a biconcave shape in the vicinity of the optical axis, excessive increases in the absolute values of the radii of curvature of the surfaces of the sixth lens L6 can be suppressed, while sufficiently increasing the negative refractive power of the sixth lens L6. In addition, by the sixth lens L6 being of a biconcave shape in the vicinity of the optical axis, field curvature can be more favorably corrected.

In the present imaging lens L, both the fifth lens L5 and the sixth lens L6 adjacent to the fifth lens L5 are configured to have negative refractive powers in the vicinity of the optical axis. Thereby, the refractive power of a negative lens group constituted by the fifth lens L5 and the sixth lens L6 can be favorably increased. For this reason, the advantageous effect of shortening the total length of the lens obtained by the imaging lens L being of the telephoto type formed by the positive lens group constituted by the first lens L1 through the fourth lens L4 and the negative lens group constituted by the fifth lens L5 and the sixth lens L6 as described above becomes more prominent. In addition, by configuring both the fifth lens L5 and the sixth lens L6 adjacent to the fifth lens L5 to have negative refractive powers in the vicinity of the optical axis, negative refractive power can be distributed between the fifth lens L5 and the sixth lens L6. That is, excessive increases in the individual negative refractive powers of the fifth lens L5 and the sixth lens L6 can be suppressed. Therefore, distortion can be favorably reduced.

In addition, it is preferable for the surface toward the image side of the sixth lens L6 to be of an aspherical shape having at least one inflection point. Thereby, increases in the incident angles of light rays that pass through the optical system at peripheral angles of view into the image formation plane (imaging element) can be suppressed, particularly at the peripheral portions of an imaging region. Note that the "inflection point" on the surface of the sixth lens L6 toward the image side refers to a point at which the shape of the surface of the sixth lens L6 toward the image side changes from a convex shape to a concave shape (or from a concave shape to a convex shape) with respect to the image side. The position of the inflection point may be any arbitrary position in an outwardly radial direction from the optical axis up to the effective diameter of the surface of the sixth lens L6 toward the image side.

According to the imaging lens L described above, the configurations of each of the first lens through the sixth lens are optimized as lens elements in a lens configuration having a total of six lenses. Therefore, a lens system having a shortened total length, a wide angle of view, and high imaging performance compatible with the increased number of pixels in imaging elements can be realized.

It is preferable for at least one of the surfaces of each of the first lens L1 through the sixth lens L6 of the imaging L to be an aspherical surface, in order to improve performance.

In addition, it is preferable for each of the first lens L1 through the sixth lens L6 that constitute the imaging lens L to be a single lens, not a cemented lens. If all of the lenses are single lenses, the number of surfaces in contact with air will be greater than a case in which some of the lenses are cemented lenses. Therefore, the degree of freedom in the design of each lens will increase. As a result, shortening of the total length, widening of the angle of view, and increase in resolution will be facilitated.

In addition, in the case that the lens configurations of each of the first lens L1 through the sixth lens L6 are set such that the maximum angle of view in a state focused on an object at infinity is 70 degrees or greater as in the imaging lenses of the first through twelfth embodiments, a shortening of the total length of the lens can be realized, while the imaging lens L may be favorably applied for use with imaging elements that satisfy demand regarding increased resolution, such as those in cellular telephones.

Next, the operation and effects of conditional formulae related to the imaging lens L will be described in greater detail. Note that it is preferable for the imaging lens L to satisfy any one of the following conditional formulae, or arbitrary combinations of the following conditional formulae. It is preferable for the conditional formulae to be satisfied to be selected as appropriate according to the items required of the imaging lens L.

First, it is preferable for the focal length f6 of the sixth lens L6 and the focal length f of the entire system to satisfy Conditional Formula (1) below.

$$-10 < f/f6 < -0.8 \quad (1)$$

Conditional Formula (1) defines a preferable range of numerical values for the ratio of the focal length f of the entire system with respect to the focal length f6 of the sixth lens L6. By suppressing the refractive power of the sixth lens L6 such that the value of f/f6 is not less than or equal to the lower limit defined in Conditional Formula (1), the generation of distortion can be suppressed. In addition, increases in the incident angles of light rays that pass through the optical system and enter the image formation plane (imaging element) can be suppressed, particularly at intermediate angles of view. By securing the refractive power of the sixth lens L6 such that the value of f/f6 is not greater than or equal to the upper limit defined in Conditional Formula (1), shortening of the total length of the lens can be favorably realized. It is more preferable for Conditional Formula (1-1) to be satisfied, and even more preferable for Conditional Formula (1-2) to be satisfied, in order to cause these advantageous effects to become more prominent.

$$-5 < f/f6 < -0.85 \quad (1\text{-}1)$$

$$-3 < f/f6 < -0.89 \quad (1\text{-}2)$$

In addition, it is preferable for f is the focal length of the entire system and the refractive power P23 of an air lens formed between the surface of the second lens L2 toward the image side and the surface of the third lens L3 toward the object side to satisfy Conditional Formula (2) below.

$$-1.1 < f \cdot P23 < 0 \quad (2)$$

Here, P23 is obtained by Formula (P) below.

$$P23 = \frac{1 - Nd2}{L2r} + \frac{Nd3 - 1}{L3f} - \frac{(1 - Nd2) \times (Nd3 - 1) \times D5}{L2r \times L3f} \quad (P)$$

wherein Nd2 is the refractive index of the second lens L2 with respect to the d line, Nd3 is the refractive index of the third lens L3 with respect to the d line, L2r is the paraxial radius of curvature of the surface of the second lens L2 toward the image side, L3f is the paraxial radius of curvature of the surface of the third lens L3 toward the object side, and D5 is an air space distance between the second lens L2 and the third lens L3 along the optical axis.

Refractive power is an inverse of focal length. Therefore, if the focal length of the air lens formed between the surface of the second lens L2 toward the image side and the surface of the third lens L3 toward the object side is designated as f23a, Conditional Formula (2) defines a preferable range of numerical values for the ratio of the focal length f of the entire system with respect to the focal length f23a. By configuring the imaging lens such that the value of f·P23 is not less than or equal to the lower limit defined in Conditional Formula (2), excessive correction of spherical aberration can be suppressed, and spherical aberration can be favorably corrected. By configuring the imaging lens such that the value of f·P23 is not greater than or equal to the upper limit defined in Conditional Formula (2), the air lens formed between the surface of the second lens L2 toward the image side and the surface of the third lens L3 toward the object side can be that which has a negative refractive power. By adopting this configuration, the previously described advantageous effects which are obtained by configuring both the second lens L3 and the third lens L3 to have negative refractive powers in the vicinity of the optical axis such that the negative refractive power is distributed between the second lens L2 and the third lens L3 becomes more prominent. That is, by all of the second lens L2, the air lens, and the third lens L3 having a negative refractive power in the vicinity of the optical axis, the refractive power of a negative lens group constituted by the second lens L2, the air lens, and the third lens L3 can be favorably increased, while excessive increases in the individual negative refractive powers of the second lens L2 and the third lens L3 can be suppressed, by distributing the negative refractive power among the second lens L2, the air lens, and the third lens L3. For this reason, spherical aberration, field curvature, and longitudinal chromatic aberration can be more favorably corrected, by configuring the imaging lens such that the value of f·P23 is not greater than or equal to the upper limit defined in Conditional Formula (2). It is more preferable for Conditional Formula (2-1) to be satisfied, and even more preferable for Conditional Formula (2-2) to be satisfied, in order to cause these advantageous effects to become more prominent.

$$-1.1 < f \cdot P23 < -0.2 \quad (2\text{-}1)$$

$$-1.1 < f \cdot P23 < -0.4 \quad (2\text{-}2)$$

In addition, it is preferable for the focal length f5 of the fifth lens L5 and the focal length f of the entire system to satisfy Conditional Formula (3) below.

$$-0.088 < f/f5 < 0 \quad (3)$$

Conditional Formula (3) defines a preferable range of numerical values for the ratio of the focal length f of the entire system with respect to the focal length f5 of the fifth lens L5. By suppressing the refractive power of the fifth lens L5 such that the value of f/f5 is not less than or equal to the lower limit defined in Conditional Formula (3), distortion can be favorably corrected. By securing the refractive power of the fifth lens L5 such that the value of f/f5 is not greater than or equal to the upper limit defined in Conditional Formula (3), shortening of the total length of the lens can be favorably realized. It is more preferable for Conditional Formula (3-1) to be satisfied, and even more preferable for Conditional Formula (3-2) to be satisfied, in order to cause these advantageous effects to become more prominent.

$$-0.088 < f/f5 < -0.02 \quad (3\text{-}1)$$

$$-0.085 < f/f5 < -0.03 \quad (3\text{-}2)$$

In addition, it is preferable for the paraxial radius of curvature L5f of the surface of the fifth lens L5 toward the object side and the paraxial radius of curvature L5r of the surface of the fifth lens L5 toward the image side to satisfy Conditional Formula (4) below.

$$0 < (L5r - L5f)/(L5r + L5f) < 0.073 \quad (4)$$

Conditional Formula (4) defines a preferable range of numerical values related to the paraxial radius of curvature L5f of the surface of the fifth lens L5 toward the object side and the paraxial radius of curvature L5r of the surface of the fifth lens L5 toward the image side. By configuring the imaging lens such that the value of (L5r−L5f)/(L5r+L5f) is not less than or equal to the lower limit defined in Conditional Formula (4), the absolute value of the paraxial radius of curvature of the surface of the fifth lens L5 toward the image side can be prevented from becoming excessively small. As a result, spherical aberration can be favorably corrected. By configuring the imaging lens such that the value of (L5r−L5f)/(L5r+L5f) is not greater than or equal to the upper limit defined in Conditional Formula (4), the absolute value of the paraxial radius of curvature of the surface of the fifth lens L5 toward the object side can be prevented from becoming excessively large. As a result, astigmatism can be favorably corrected. It is more preferable for Conditional Formula (4-1) to be satisfied, and even more preferable for Conditional Formula (4-2) to be satisfied, in order to cause these advantageous effects to become more prominent.

$$0.02 < (L5r - L5f)/(L5r + L5f) < 0.068 \quad (4\text{-}1)$$

$$0.03 < (L5r - L5f)/(L5r + L5f) < 0.063 \quad (4\text{-}2)$$

In addition, it is preferable for the focal distance f of the entire system, the half angle of view ω when in a state of focus on an object at infinity, and the paraxial radius of curvature L6r of the surface of the sixth lens L6 toward the image side to satisfy Conditional Formula (5) below.

$$0.5 < f \cdot \tan \omega / L6r < 20 \quad (5)$$

Conditional Formula (5) defines a preferable range of numerical values for the ratio of a paraxial image height (f·tan ω) with respect to the paraxial radius of curvature L6r of the surface of the sixth lens L6 toward the image side. By configuring the imaging lens such that the value of f·tan ω/L6r is not less than or equal to the lower limit defined in Conditional Formula (1), the absolute value of the paraxial radius of curvature L6r of the surface of the sixth lens L6 toward the image side, which is the surface most toward the image side in the imaging lens L, will not be excessively large with respect to the paraxial image height (f·tan ω). Thereby, field curvature can be sufficiently corrected while realizing a shortening of the total length. Note that field curvature can be favorably corrected from a central angle of view to peripheral angles of view in the case that in the case that the sixth lens L6 is of an aspherical shape having a concave surface toward the image side and at least one inflection point as illustrated in the imaging lenses L of each of the Examples, and in the case that the lower limit of Conditional Formula (5) is satisfied. Therefore, this configuration facilitates realization of a wide angle of view. In addition, by configuring the imaging lens such that the value of f·tan ω/L6r is not greater than or equal to the upper limit defined in Conditional Formula (5), the absolute value of the paraxial radius of curvature L6r of the surface of the sixth lens L6 toward the image side, which is the surface most toward the image side in the imaging lens, will not be excessively small with respect to the paraxial image height (f·tan ω). Thereby, increases in the incident angle of light rays that pass through the optical system and enter the image formation plane (imaging element) can be suppressed at intermediate angles of view. It is preferable for Conditional Formula (5-1) to be satisfied, and more preferable for Conditional Formula (5-2) to be satisfied, in order to cause these advantageous effects to become more prominent.

$$0.7 < f \cdot \tan \omega / L6r < 10 \quad (5\text{-}1)$$

$$1 < f \cdot \tan \omega / L6r < 5 \quad (5\text{-}2)$$

Further improved imaging performance can be realized by satisfying preferred conditions appropriately. In addition, the imaging apparatuses according to the embodiments of the present invention output image signals corresponding to optical images formed by the high performance imaging lenses according to the embodiments of the present invention. Therefore, images having high resolution and wide angles of view can be obtained, while achieving a shortening of the apparatus size.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with the lens surface at the most object side designated as first, are shown in the column Si for the imaging lens of Example 1. The radii of curvature (mm) of ith surfaces from the object side corresponding to the symbols Ri illustrated in FIG. 1 are shown in the column Ri. Similarly, the distances between an ith surface and an i+1st surface from the object side along the optical axis Z are shown in the column Di. The refractive indices of jth optical elements from the object side with respect to the d line (wavelength: 587.6 nm) are shown in the column Ndj. The Abbe's numbers of the jth optical elements with respect to the d line are shown in the column νdj.

Table 1 also shows the aperture stop St and the optical member CG. The signs of the radii of curvature are positive for surface shapes having convex surfaces toward the object side, and negative for surface shapes having convex surfaces toward the image side. Note that the values of the focal length f (m) of the entire system, the back focus Bf (nm), the F number Fno., and the maximum angle of view 2ω(°) are shown as data above the lens data. Note that the back focus Bf is represented as an air converted value.

A "*" mark is appended to the surface numbers of aspherical surfaces in the basic lens data of Table 1. In the imaging lens of Example 1, both of the surfaces of the first lens L1 through the sixth lens L6 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$".

The values of coefficients An and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the peak of the aspherical surface.

$$Z = \frac{C \times h^2}{1 + \sqrt{1 - KA \times C^2 \times h^2}} + \sum_n An \times h^n \quad (A)$$

wherein: Z is the depth of the aspherical surface (m), h is the distance from the optical axis to the surface of the lens (height) (mm), C is the paraxial curvature=1/R (R is the paraxial radius of curvature), An is an nth ordinal aspherical surface coefficient (n is an integer 3 or greater), and KA is an aspherical surface coefficient.

Specific lens data corresponding to the configurations of the imaging lenses illustrated in FIG. 2 through FIG. 12 are shown in Table 3 through Table 24 as Example 2 through Example 12. In the imaging lenses of Examples 1 through 12, both of the surfaces of the first lens L1 through the sixth lens L6 are all aspherical surfaces.

Figure 14:
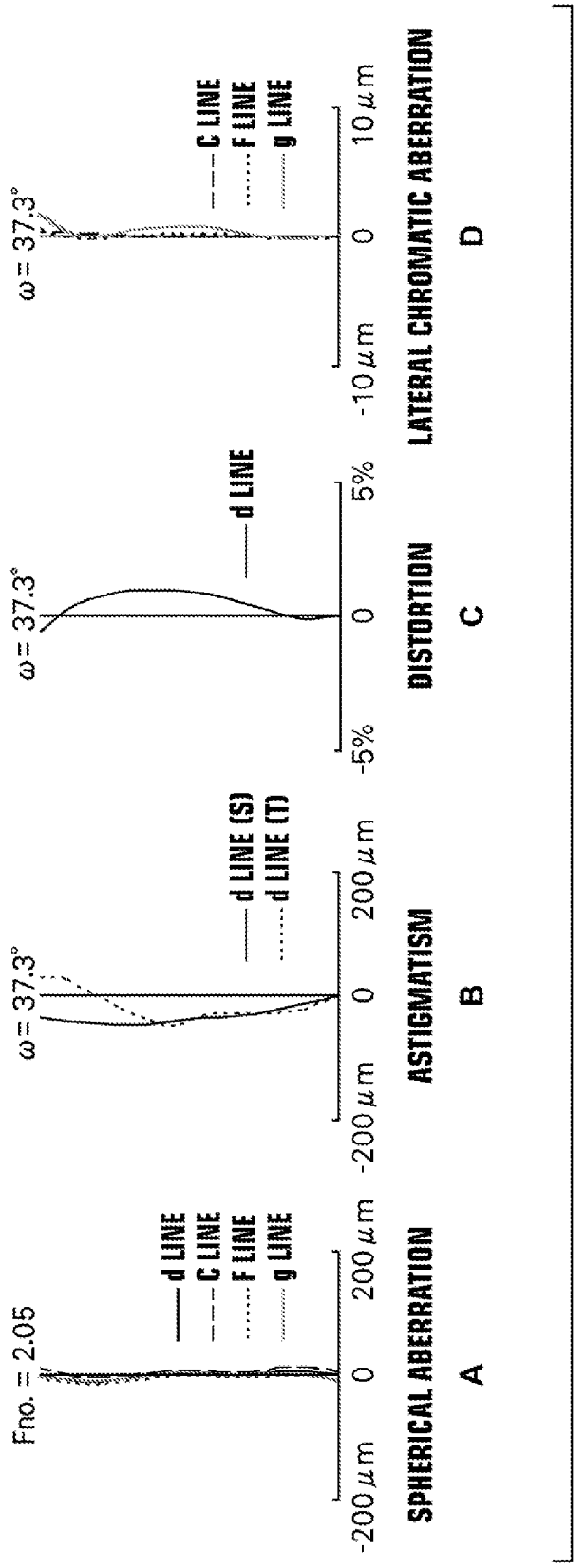
FIG. 14 is a collection of diagrams that illustrate aberrations of the imaging lens of Example 1, wherein A illustrates spherical aberration, B illustrates astigmatic aberration, C illustrates distortion, and D illustrates lateral chromatic aberration.

A through D of FIG. 14 are diagrams that illustrate the spherical aberration, the astigmatic aberration, the distortion, and the lateral chromatic aberration (chromatic aberration according to magnification rate) of the imaging lens of Example 1, respectively. Each of the diagrams that illustrate the spherical aberration, the astigmatic aberration (field curvature), and the distortion illustrate aberrations using the d line (wavelength: 587.6 nm) as a reference wavelength. The diagrams that illustrate spherical aberration also show aberrations related to the F line (wavelengths: 486.1 nm), the C line (wavelength: 656.3 nm), and the g line (wavelength: 435.8 nm). The diagram that illustrates lateral chromatic aberration shows aberrations related to the F line, the C line, and the g line. In the diagram that illustrates astigmatic aberration, aberrations in the sagittal direction (S) are indicated by solid lines, while aberrations in the tangential direction (T) are indicated by broken lines. In addition, "Fno." denotes F numbers, and "ω" denotes a half value of the maximum angle of view in a state focused on an object at infinity.

Figure 15:
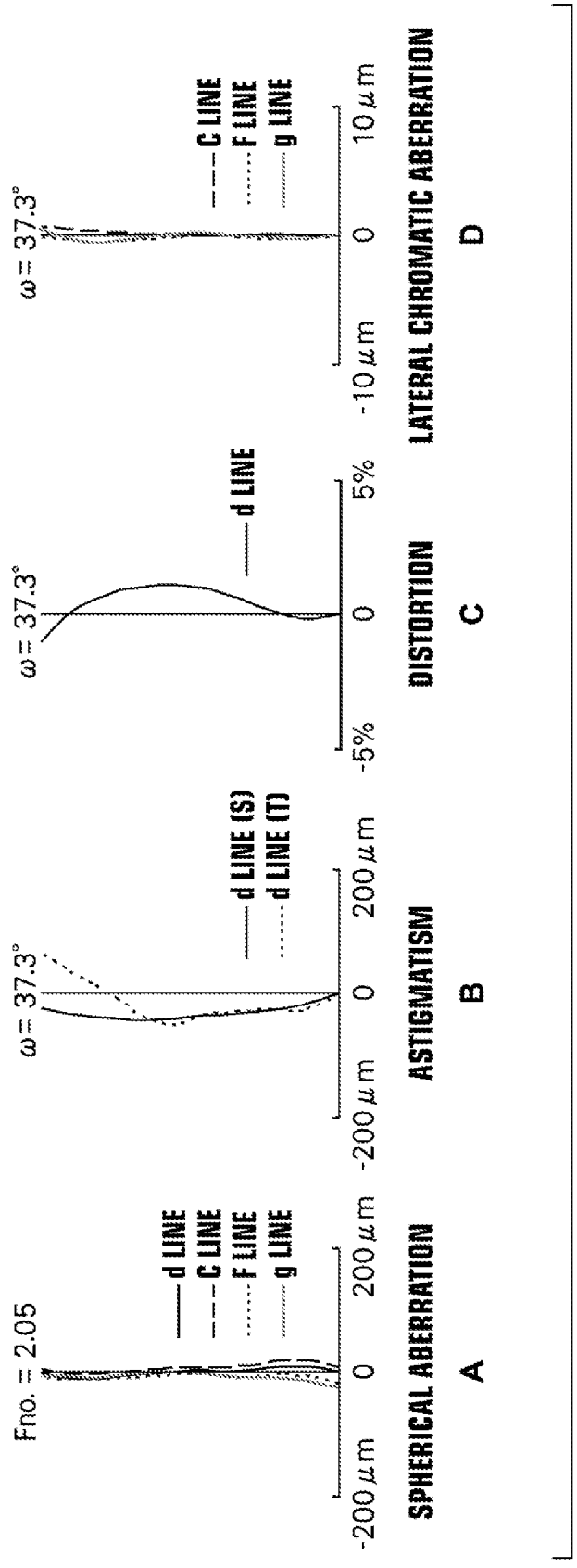
FIG. 15 is a collection of diagrams that illustrate aberrations of the imaging lens of Example 2, wherein A illustrates spherical aberration, B illustrates astigmatic aberration, C illustrates distortion, and D illustrates lateral chromatic aberration.
Figure 16:
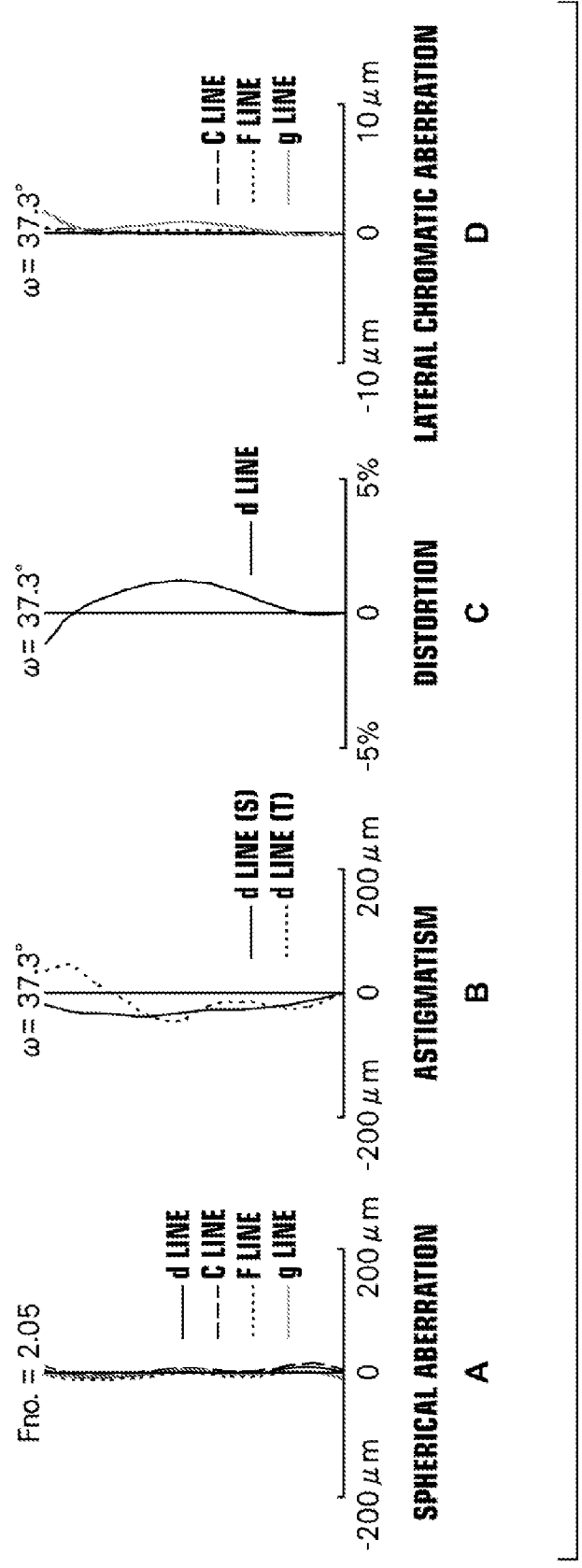
FIG. 16 is a collection of diagrams that illustrate aberrations of the imaging lens of Example 3, wherein A illustrates spherical aberration, B illustrates astigmatic aberration, C illustrates distortion, and D illustrates lateral chromatic aberration.
Figure 17:
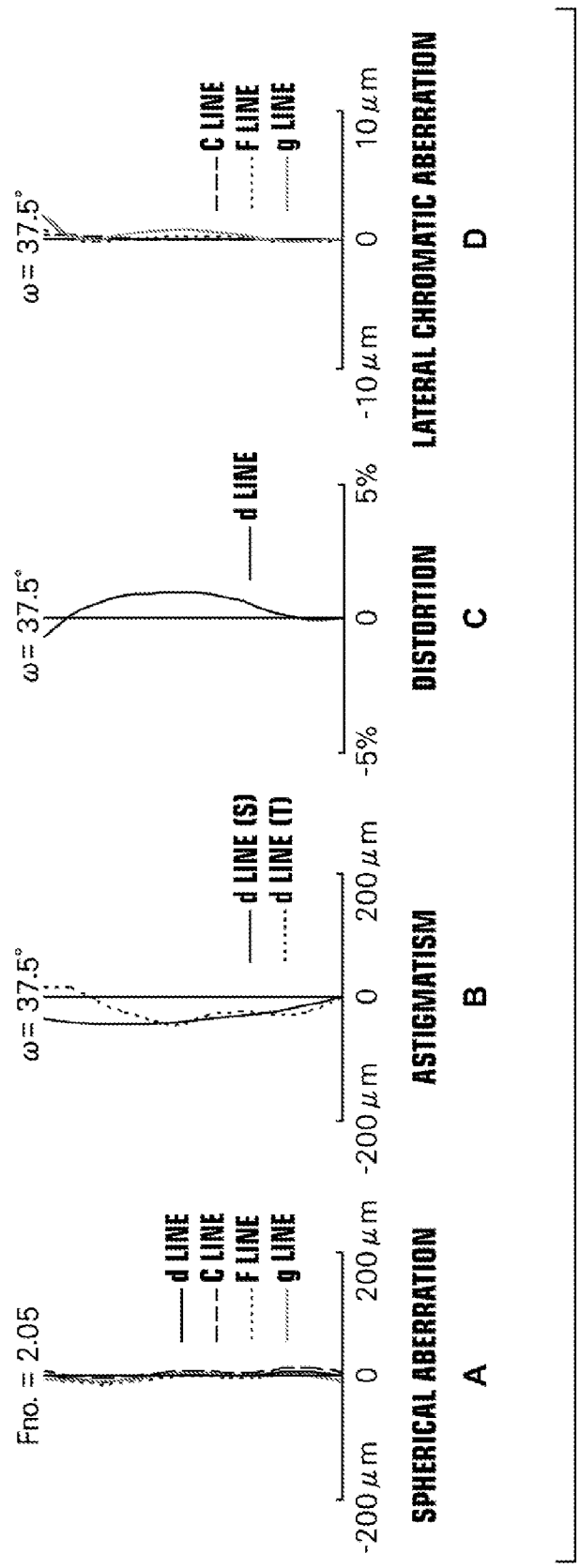
FIG. 17 is a collection of diagrams that illustrate aberrations of the imaging lens of Example 4, wherein A illustrates spherical aberration, B illustrates astigmatic aberration, C illustrates distortion, and D illustrates lateral chromatic aberration.
Figure 18:
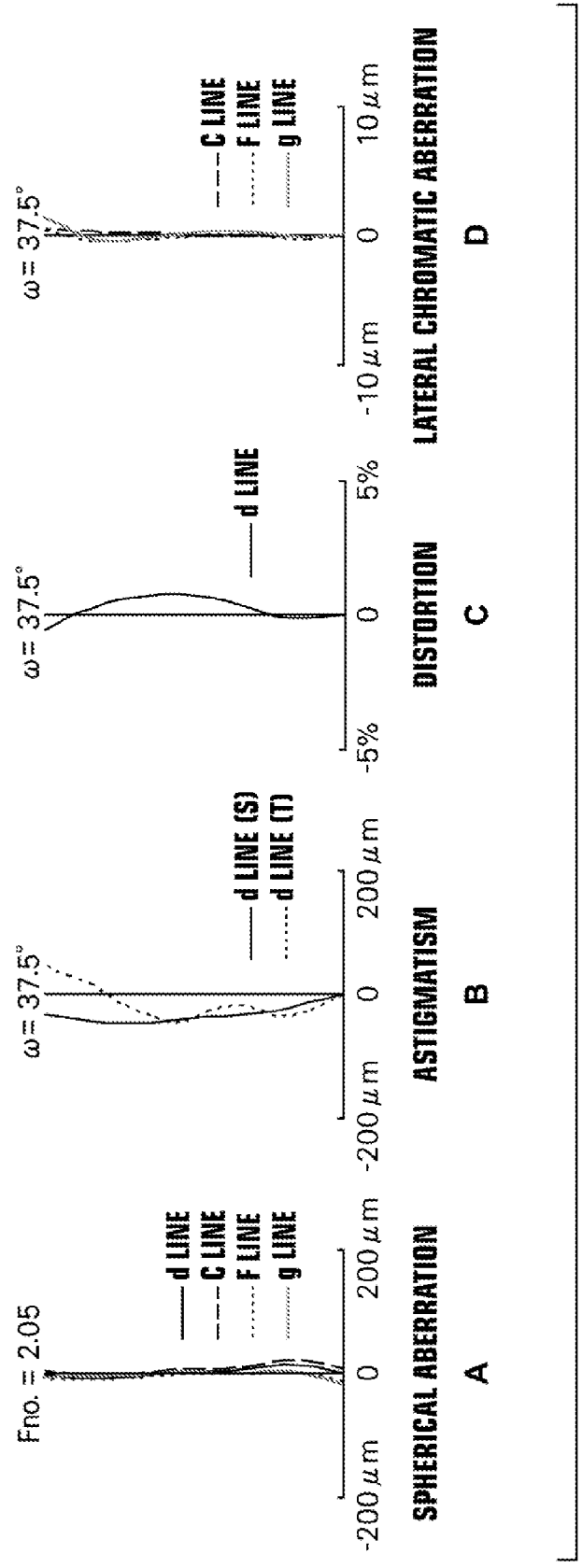
FIG. 18 is a collection of diagrams that illustrate aberrations of the imaging lens of Example 5, wherein A illustrates spherical aberration, B illustrates astigmatic aberration, C illustrates distortion, and D illustrates lateral chromatic aberration.
Figure 19:
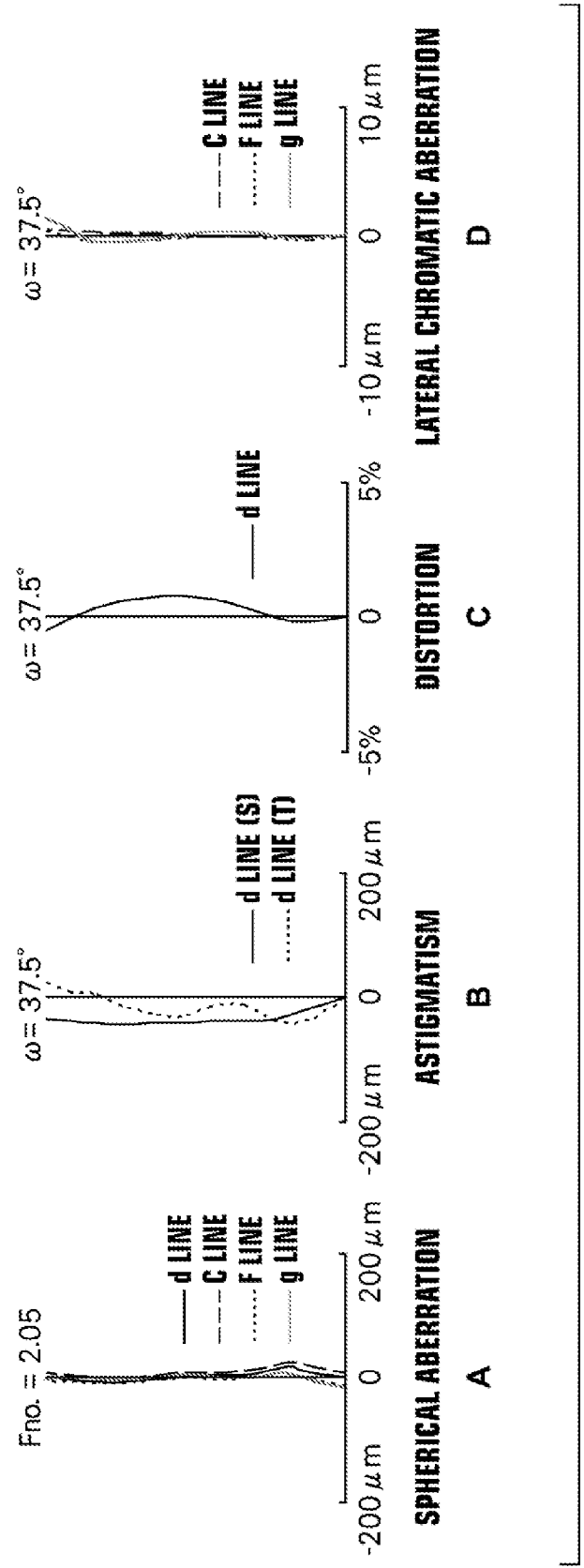
FIG. 19 is a collection of diagrams that illustrate aberrations of the imaging lens of Example 6, wherein A illustrates spherical aberration, B illustrates astigmatic aberration, C illustrates distortion, and D illustrates lateral chromatic aberration.
Figure 20:
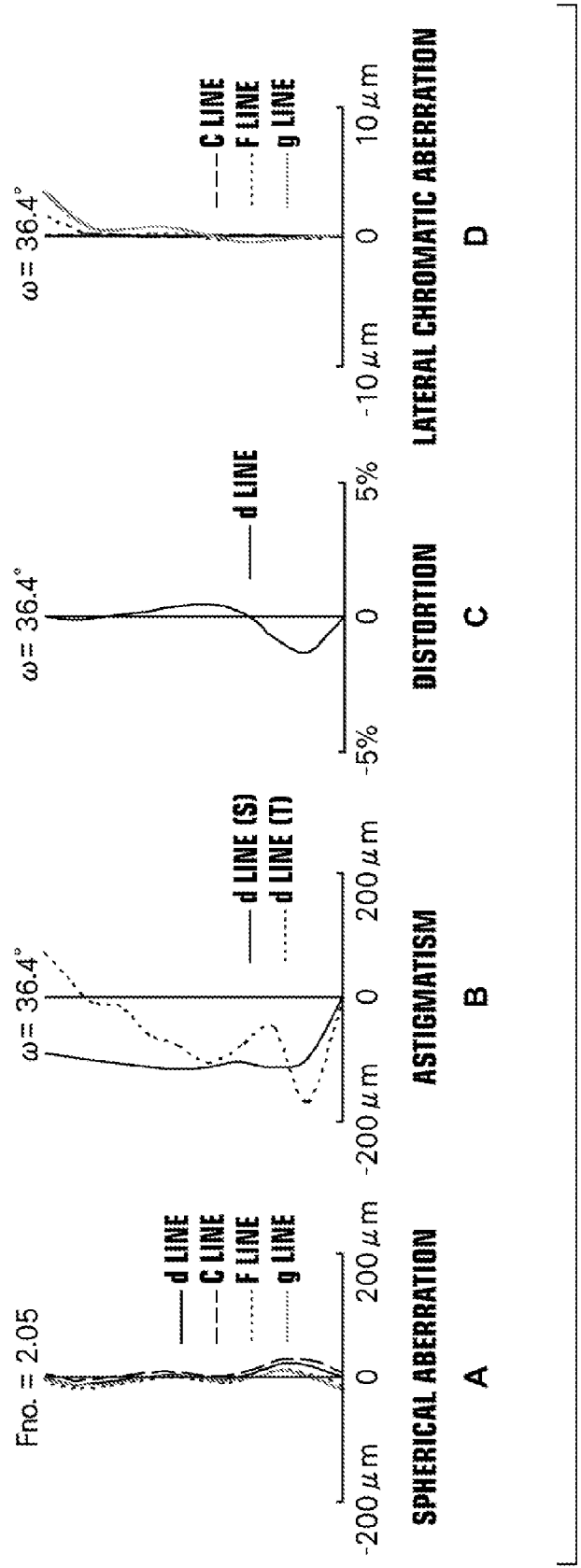
FIG. 20 is a collection of diagrams that illustrate aberrations of the imaging lens of Example 7, wherein A illustrates spherical aberration, B illustrates astigmatic aberration, C illustrates distortion, and D illustrates lateral chromatic aberration.
Figure 21:
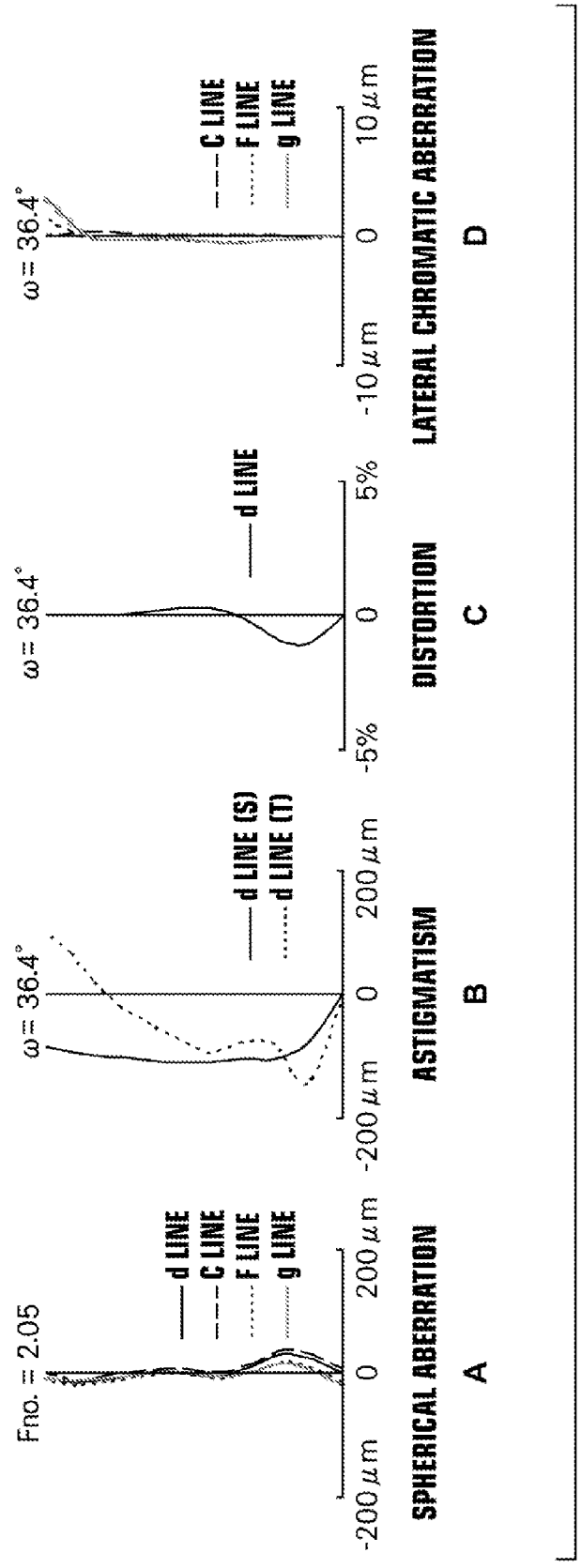
FIG. 21 is a collection of diagrams that illustrate aberrations of the imaging lens of Example 8, wherein A illustrates spherical aberration, B illustrates astigmatic aberration, C illustrates distortion, and D illustrates lateral chromatic aberration.
Figure 22:
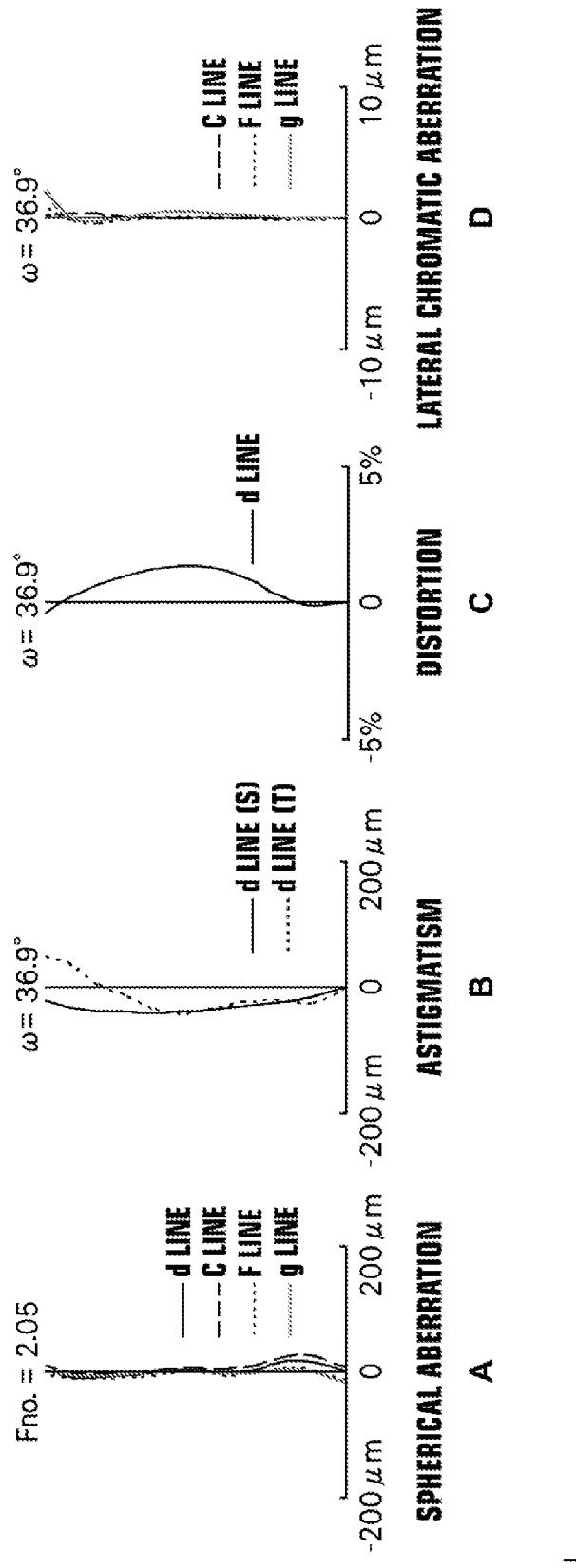
FIG. 22 is a collection of diagrams that illustrate aberrations of the imaging lens of Example 9, wherein A illustrates spherical aberration, B illustrates astigmatic aberration, C illustrates distortion, and D illustrates lateral chromatic aberration.
Figure 23:
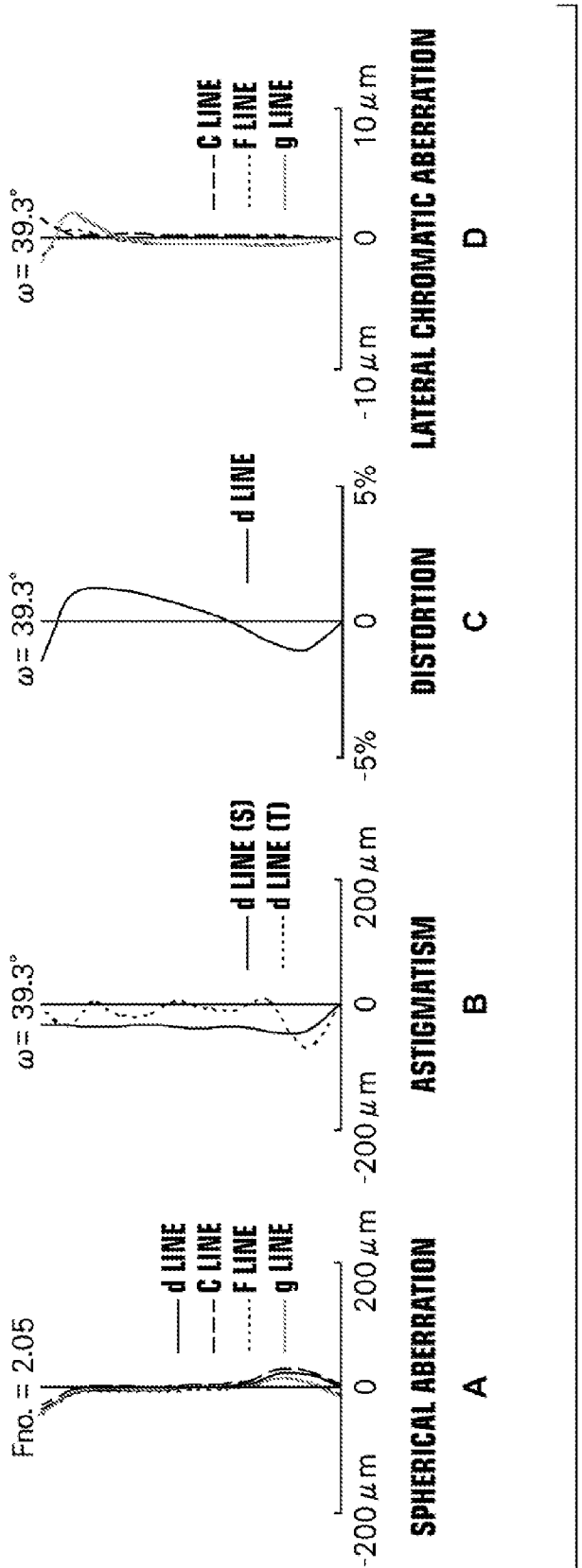
FIG. 23 is a collection of diagrams that illustrate aberrations of the imaging lens of Example 10, wherein A illustrates spherical aberration, B illustrates astigmatic aberration, C illustrates distortion, and D illustrates lateral chromatic aberration.
Figure 24:
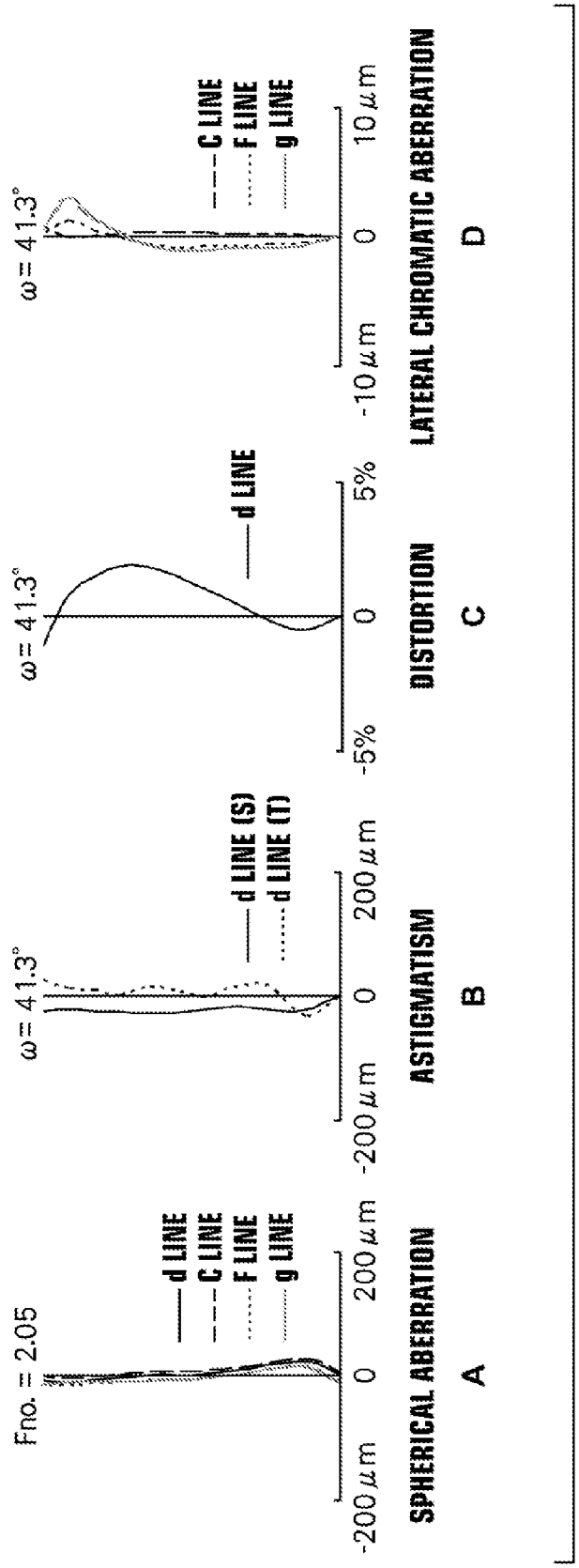
FIG. 24 is a collection of diagrams that illustrate aberrations of the imaging lens of Example 11, wherein A illustrates spherical aberration, B illustrates astigmatic aberration, C illustrates distortion, and D illustrates lateral chromatic aberration.
Figure 25:
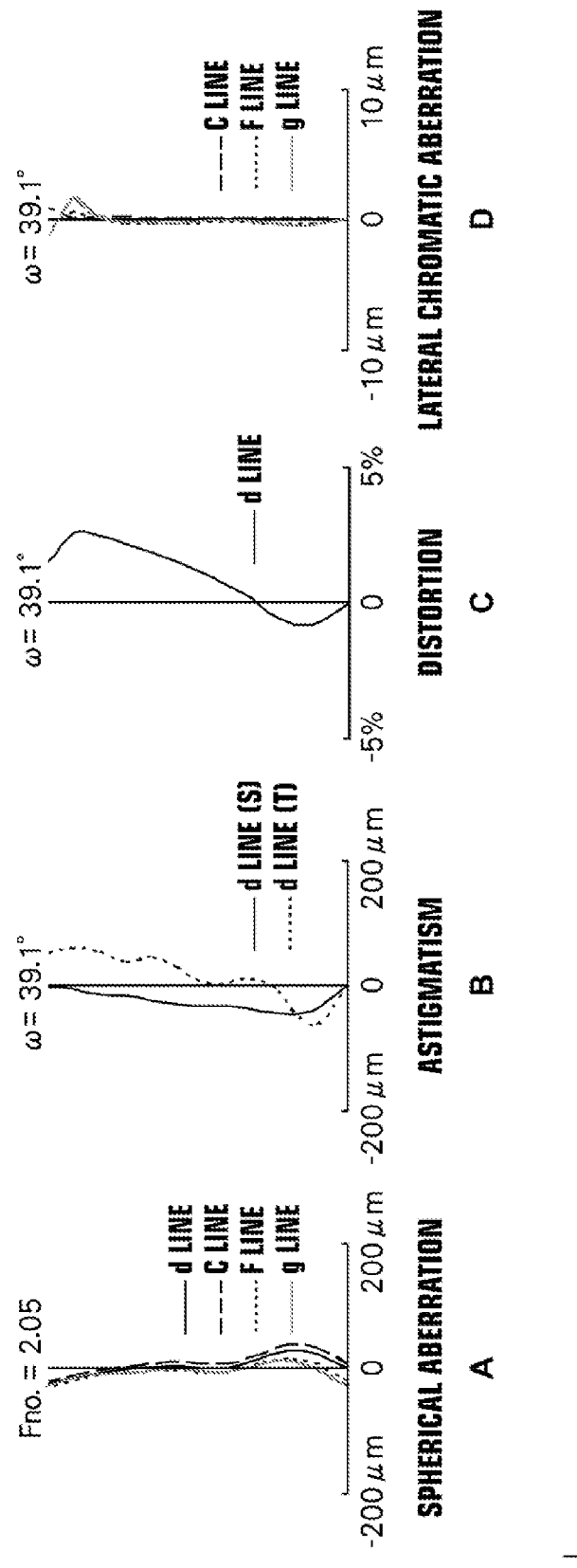
FIG. 25 is a collection of diagrams that illustrate aberrations of the imaging lens of Example 12, wherein A illustrates spherical aberration, B illustrates astigmatic aberration, C illustrates distortion, and D illustrates lateral chromatic aberration.

Similarly, the aberrations of the imaging lens of Example 2 through Example 12 are illustrated in A through D of FIG. 15 through A through D of FIG. 25. The aberrations illustrated in the diagrams of A through D of FIG. 15 through A through D of FIG. 25 are all for cases in which the object distance is infinity.

Table 25 shows values corresponding to Conditional Formulae (1) through (5), respectively summarized for each of Examples 1 through 12.

Note that each of the tables show numerical values which are rounded off at a predetermined number of digits. "°" are employed as units for the numerical values indicating angles and "mm" are employed as units for the numerical values indicating lengths. However, these units are merely examples. Other appropriate units may be employed, because it is possible to utilize optical systems which are proportionately enlarged or proportionately reduced in size.

As can be understood from each set of numerical value data and from the diagrams that illustrate aberrations, the imaging lenses of Examples 1 through 12 have widened maximum angles of view of 70° or greater in a state focused on an object at infinity, shortened total lengths, favorably correct various aberrations, and realize high imaging performance from a central angle of view to peripheral angles of view.

The present invention has been described using the embodiments and the Examples. However, the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 4.063, Bf = 1.073, Fno. = 2.05, 2ω = 74.6

| Si | Ri | Di | Ndj | νdj |
|---|---|---|---|---|
| 1 (aperture stop) | ∞ | −0.125 | | |
| *2 | 1.73436 | 0.626 | 1.54488 | 54.87 |
| *3 | −26.87713 | 0.044 | | |
| *4 | 14.21847 | 0.268 | 1.63350 | 23.62 |
| *5 | 2.81092 | 0.460 | | |
| *6 | −21.19672 | 0.398 | 1.54488 | 54.87 |
| *7 | −30.71882 | 0.365 | | |
| *8 | −74.85320 | 0.425 | 1.54488 | 54.87 |
| *9 | −1.48301 | 0.105 | | |
| *10 | −1.84178 | 0.269 | 1.63350 | 23.62 |
| *11 | −1.99378 | 0.427 | | |
| *12 | −10.14728 | 0.265 | 1.54488 | 54.87 |
| *13 | 1.53555 | 0.400 | | |
| 14 | ∞ | 0.210 | 1.51633 | 64.14 |
| 15 | ∞ | 0.535 | | |
| 16 (imaging plane) | ∞ | | | |

*aspherical surface

TABLE 2

Example 1: Aspherical Surface Data

| Surface Number | KA | A3 | A4 | A5 | A6 |
|---|---|---|---|---|---|
| 2 | 1.1167802E+00 | 0.0000000E+00 | −6.9357846E−02 | 4.5157276E−02 | 1.3846117E+00 |
| 3 | 1.5656729E+02 | 0.0000000E+00 | −1.0519480E−01 | −2.7031461E−01 | 3.1696203E−01 |
| 4 | 2.0048911E+00 | 0.0000000E+00 | −1.8027856E−01 | −8.3474998E−03 | 1.3131994E−01 |
| 5 | −7.3105666E+03 | 0.0000000E+00 | −7.3252265E−02 | 1.8040921E−01 | 4.2945635E−02 |
| 6 | 6.3149558E+01 | 0.0000000E+00 | −2.3692027E−01 | 3.8182264E−01 | −1.3209997E+00 |
| 7 | −4.0351195E+02 | 0.0000000E+00 | −3.8411805E−01 | 1.0039614E+00 | −2.8315615E+00 |
| 8 | −1.8105033E+00 | 0.0000000E+00 | −1.0904302E−01 | 1.8984877E−01 | 3.2888465E−01 |
| 9 | 5.0377671E−01 | 0.0000000E+00 | −9.5844278E−02 | 1.2520210E+00 | −3.4666370E+00 |
| 10 | −2.9270009E+03 | 0.0000000E+00 | −8.7183299E−03 | 2.3675792E−01 | −4.1434445E−02 |
| 11 | −2.2067071E−02 | 0.0000000E+00 | 1.5566593E−01 | −7.7385500E−03 | −1.4900017E−01 |
| 12 | −7.9960917E+00 | 0.0000000E+00 | −2.1403544E−01 | 9.4470063E−02 | 2.9774612E−02 |
| 13 | −6.4201838E+03 | 0.0000000E+00 | −2.1022407E−01 | 1.7295512E−01 | −4.9614266E−02 |

| | A7 | A8 | A9 | A10 | A11 |
|---|---|---|---|---|---|
| 2 | −6.6199428E+00 | 1.4205761E+01 | −1.6393061E+01 | 8.5556614E+00 | 3.6741038E−01 |
| 3 | 3.8530999E+00 | −1.2475326E+01 | 2.0903622E+01 | −3.2753767E+01 | 5.0546050E+01 |
| 4 | 1.9914091E+00 | −3.9731785E+00 | 3.5477509E+00 | −5.4533605E+00 | 5.3276203E+00 |
| 5 | 4.5313915E−02 | −5.0353972E−01 | 7.3452720E−01 | −3.3260036E−01 | −2.1231148E−01 |
| 6 | 1.3327343E+00 | 3.1037657E+00 | −8.3359746E+00 | 3.9193974E+00 | 4.3124787E+00 |
| 7 | 6.2203269E+00 | −1.1892569E+01 | 1.2156213E+01 | 7.6850481E+00 | −3.6557683E+01 |
| 8 | −2.5399774E+00 | 5.4867150E+00 | −5.7685376E+00 | 2.7405081E+00 | −1.0503532E+00 |
| 9 | 5.8120817E+00 | −6.0630936E+00 | 4.0387724E+00 | −1.4757214E+00 | −8.1897037E−01 |
| 10 | −6.3441164E−00 | 9.1464742E−01 | −7.0605236E−01 | 4.9438145E−01 | −2.6239340E−01 |
| 11 | 1.1253062E−01 | −1.1653953E−01 | 1.4911213E−01 | −6.9518423E−02 | −5.8470078E−03 |
| 12 | −3.0134899E−02 | 1.5562549E−02 | −8.4211216E−04 | −6.3597277E−03 | 4.6596105E−03 |
| 13 | −4.2240357E−03 | 8.0727300E−03 | −4.8951190E−03 | 2.4864624E−03 | −8.4255297E−04 |

| | A12 | A13 | A14 | A15 | A16 |
|---|---|---|---|---|---|
| 2 | 3.5139035E+00 | −1.8226795E+01 | 2.4653124E+01 | −1.5061062E+01 | 3.5949982E+03 |
| 3 | −5.5494949E+00 | 3.4237301E+01 | −8.0941478E+00 | −1.6041171E+00 | 8.7112503E−01 |
| 4 | 2.9665961E+00 | −4.1634779E+00 | −6.5453198E+00 | 9.5268347E+00 | −3.1795194E+00 |
| 5 | −1.0939331E−01 | 1.2012807E+00 | −1.6279446E+00 | 9.4094452E−01 | −2.0909563E−01 |
| 6 | −2.3273429E+00 | −1.1873759E+00 | −2.6415557E+00 | 4.1237659E+00 | −1.3306647E+00 |
| 7 | 3.6430531E+01 | −5.9454189E+00 | −1.3859919E+01 | 9.7685490E+00 | −2.0233756E+00 |
| 8 | 1.9893750E+00 | −2.0862749E+00 | 9.0562450E−01 | −1.6704036E−01 | 1.2706651E−02 |
| 9 | 1.2365723E+00 | 6.1888872E−01 | −1.7297255E+00 | 9.9565698E−01 | −1.8915884E−01 |
| 10 | 1.8637061E−02 | 6.0825871E−02 | −2.8673511E−02 | 3.8937388E−03 | 4.1704751E−05 |
| 11 | 8.6922609E−03 | 3.2153605E−03 | −3.4761291E−03 | 9.6573140E−04 | −9.7722338E−05 |
| 12 | −1.1059840E−03 | −5.2066304E−04 | 4.5693845E−04 | −1.2582612E−04 | 1.2577573E−05 |
| 13 | 1.1697023E−04 | 2.8010893E−05 | −1.5480990E−05 | 2.6621758E−06 | −1.6790771E−07 |

TABLE 3

Example 2
f = 4.087, Bf = 1.091, Fno. = 2.05, 2ω = 74.6

| Si | Ri | Di | Ndj | νdj |
|---|---|---|---|---|
| 1 (aperture stop) | ∞ | −0.125 | | |
| *2 | 1.66101 | 0.631 | 1.54488 | 54.87 |
| *3 | 20.85597 | 0.048 | | |
| *4 | 8.15521 | 0.257 | 1.63350 | 23.62 |
| *5 | 2.89873 | 0.461 | | |
| *6 | −25.01665 | 0.409 | 1.54488 | 54.87 |
| *7 | −42.24914 | 0.342 | | |
| *8 | −12.09693 | 0.425 | 1.54488 | 54.87 |
| *9 | −1.36259 | 0.097 | | |
| *10 | −1.88184 | 0.300 | 1.63350 | 23.62 |
| *11 | −2.05011 | 0.393 | | |
| *12 | −13.36489 | 0.268 | 1.54488 | 54.87 |
| *13 | 1.48813 | 0.400 | | |
| 14 | ∞ | 0.210 | 1.51633 | 64.14 |
| 15 | ∞ | 0.553 | | |
| 16 (imaging plane) | ∞ | | | |

*aspherical surface

TABLE 5

Example 3
f = 4.082, Bf = 1.074, Fno. = 2.05, 2ω = 74.6

| Si | Ri | Di | Ndj | νdj |
|---|---|---|---|---|
| 1 (aperture stop) | ∞ | −0.125 | | |
| *2 | 1.70495 | 0.633 | 1.54488 | 54.87 |
| *3 | −41.79102 | 0.053 | | |
| *4 | 16.24472 | 0.276 | 1.63350 | 23.62 |
| *5 | 2.86939 | 0.443 | | |
| *6 | 25.43996 | 0.385 | 1.54488 | 54.87 |
| *7 | 19.48349 | 0.357 | | |
| *8 | −26.12783 | 0.422 | 1.54488 | 54.87 |
| *9 | −1.42427 | 0.084 | | |
| *10 | −1.85235 | 0.308 | 1.63350 | 23.62 |
| *11 | −2.02099 | 0.416 | | |
| *12 | −12.37863 | 0.269 | 1.54488 | 54.87 |
| *13 | 1.50529 | 0.400 | | |
| 14 | ∞ | 0.210 | 1.51633 | 64.14 |
| 15 | ∞ | 0.535 | | |
| 16 (imaging plane) | ∞ | | | |

*aspherical surface

TABLE 4

Example 2: Aspherical Surface Data

| Surface Number | KA | A3 | A4 | A5 | A6 |
|---|---|---|---|---|---|
| 2 | 1.2338716E+00 | 0.0000000E+00 | −8.6042175E−02 | 2.5434089E−01 | 2.2812161E−02 |
| 3 | 3.5147960E+02 | 0.0000000E+00 | −2.1992015E−01 | −2.7025268E−01 | −5.7084382E−02 |
| 4 | −6.1784604E+00 | 0.0000000E+00 | −3.2068263E−01 | −6.8220154E−03 | 3.6078701E−01 |
| 5 | −7.4556979E+00 | 0.0000000E+00 | −1.2908429E−01 | 2.3009944E−01 | 2.5130241E−01 |
| 6 | −3.1293107E+02 | 0.0000000E+00 | −2.4280914E−01 | 3.5125377E−01 | −1.0720502E+00 |
| 7 | −1.3481659E+03 | 0.0000000E+00 | −3.3606746E−01 | 6.2008778E−01 | −6.8126308E−01 |
| 8 | −1.2542576E+03 | 0.0000000E+00 | −1.9868231E−01 | 1.9265524E−01 | 8.7748862E−01 |
| 9 | 4.3840005E−01 | 0.0000000E+00 | −1.1706827E−01 | 1.3030589E+00 | −2.8503711E+00 |
| 10 | −2.9475511E+00 | 0.0000000E+00 | −2.0039034E−02 | 1.9840687E−01 | −6.8811884E−02 |
| 11 | −5.1118757E−02 | 0.0000000E+00 | 1.2392010E−01 | −2.7024297E−02 | −4.6800697E−02 |
| 12 | −1.7221620E+01 | 0.0000000E+00 | −2.0670361E−01 | 7.9547928E−02 | 3.6639688E−02 |
| 13 | −5.5947143E+00 | 0.0000000E+00 | −2.2347765E−01 | 1.9377807E−01 | −6.3462838E−02 |

| | A7 | A8 | A9 | A10 | A11 |
|---|---|---|---|---|---|
| 2 | −1.8462846E+00 | 4.6823770E+00 | −7.1526235E+00 | 8.8378816E+00 | −5.6155835E+00 |
| 3 | 6.8008143E+00 | −1.7676483E+01 | 1.7935425E+01 | −6.5459003E+00 | 2.8901971E+00 |
| 4 | 2.8061966E+00 | −7.0070068E+00 | 7.6703984E+00 | −9.2442099E+00 | 9.0619710E+00 |
| 5 | −6.6217273E−01 | 1.0621253E+00 | −1.3385008E+00 | 1.8317722E−01 | 2.3070305E+00 |
| 6 | 1.5159477E+00 | 1.8629037E−01 | −2.4737942E+00 | 3.5681738E−01 | 2.9802636E+00 |
| 7 | −8.2298062E−01 | 1.5527842E+00 | 1.3116883E+00 | −3.1258103E+00 | −6.5537236E−01 |
| 8 | −4.1350140E+00 | 7.8066920E+00 | −7.2645950E+00 | 2.1346591E+00 | 7.6181205E−01 |
| 9 | 2.4756929E+00 | 9.7825656E−01 | −3.6829200E+00 | 3.7696632E+00 | −4.5134458E+00 |
| 10 | −2.1223842E−01 | 1.4790917E−01 | 4.5523684E−02 | −4.8285484E−02 | 2.2146451E−03 |
| 11 | −8.6293565E−03 | 2.7051192E−02 | 1.1377436E−02 | −1.1701394E−02 | −2.7816153E−03 |
| 12 | −1.0064857E−02 | −8.0593994E−03 | 4.4443501E−03 | −9.3304218E−04 | −4.0872580E−04 |
| 13 | 3.7428324E−03 | 3.5142267E−04 | 1.2482486E−03 | −2.0721936E−04 | −4.7178755E−04 |

| | A12 | A13 | A14 | A15 | A16 |
|---|---|---|---|---|---|
| 2 | −4.9673508E+00 | 1.0050155E+01 | −2.2666528E+00 | −3.9030684E+00 | 1.9340861E+00 |
| 3 | −1.0476404E+01 | 1.1971041E+01 | −4.9925901E+00 | 3.6592278E−01 | 1.6190682E−01 |
| 4 | 5.5115828E−02 | −2.7799715E+00 | −8.1671565E+00 | 1.1428241E+01 | −3.8912073E+00 |
| 5 | −3.1423121E+00 | 1.0280528E+00 | 1.1133517E+00 | −1.1121679E+00 | 2.9585786E−01 |
| 6 | −9.1636868E−01 | −8.5672250E−01 | −1.7598600E+00 | 2.5241352E+00 | −7.7915438E−01 |
| 7 | 3.3910784E+00 | −5.0055115E−01 | −1.9404442E+00 | 1.1382787E+00 | −1.6797603E−01 |
| 8 | 1.1634197E+00 | −3.3031204E+00 | 2.9872869E+00 | −1.4176751E+00 | 2.8931819E−01 |
| 9 | 4.5015137E+00 | −1.1520140E+00 | −1.5621108E+00 | 1.2210420E+00 | −2.5524957E−01 |
| 10 | −8.6556122E−03 | 9.3373394E−03 | 1.9688499E−04 | −1.8134031E−03 | 3.7655614E−04 |
| 11 | 2.3931648E−03 | 2.2772911E−04 | −1.8948653E−04 | −1.8528046E−05 | 8.4726784E−06 |
| 12 | 5.0358615E−04 | −2.2751719E−04 | 5.4797696E−05 | −6.5451379E−06 | 2.6462981E−07 |
| 13 | 3.6028147E−04 | −1.2554160E−04 | 2.3557255E−05 | −2.1473962E−06 | 5.8642864E−08 |

TABLE 6

Example 3: Aspherical Surface Data

| Surface Number | KA | A3 | A4 | A5 | A6 |
|---|---|---|---|---|---|
| 2 | 1.0983915E+00 | 0.0000000E+00 | −9.4743876E−02 | 5.3507982E−01 | −2.0986869E+00 |
| 3 | −5.0381661E+03 | 0.0000000E+00 | −9.7875334E−02 | −5.7211080E−01 | 2.4294185E+00 |
| 4 | −4.9281837E+01 | 0.0000000E+00 | −1.9386444E−01 | 3.4280935E−02 | 2.3706199E−01 |
| 5 | −7.3603136E+00 | 0.0000000E+00 | −9.6174230E−02 | 2.4377297E−01 | −2.5175456E−01 |
| 6 | 5.6373879E+02 | 0.0000000E+00 | −3.7493928E−01 | 2.7195586E+00 | −2.0084970E+01 |
| 7 | 2.6939302E+02 | 0.0000000E+00 | −4.0465294E−01 | 1.3323189E+00 | −4.6634096E+00 |
| 8 | −2.8468000E+03 | 0.0000000E+00 | −1.3110522E−01 | 2.8415608E−01 | −3.3117678E−01 |
| 9 | 5.6538671E−01 | 0.0000000E+00 | −5.7876392E−02 | 9.2356373E−01 | −1.7025709E+00 |
| 10 | −3.0088412E+00 | 0.0000000E+00 | −6.4348075E−03 | 2.7252640E−01 | −1.2080790E−01 |
| 11 | 7.4198623E−02 | 0.0000000E+00 | 1.5129119E−01 | 5.6380927E−03 | −6.9381396E−02 |
| 12 | −6.7102199E+00 | 0.0000000E+00 | −2.1617724E−01 | 9.3406961E−02 | 2.2154801E−02 |
| 13 | −6.0302011E+00 | 0.0000000E+00 | −2.1801520E−01 | 1.7745954E−01 | −5.1291869E−02 |

| | A7 | A8 | A9 | A10 | A11 |
|---|---|---|---|---|---|
| 2 | 6.2562939E+00 | −1.1866103E+01 | 6.7922933E+00 | 1.9126692E+01 | −3.9576743E+01 |
| 3 | −4.3750266E+00 | 6.1950939E+00 | −2.8369145E+00 | −1.9581678E+01 | 5.2320295E+01 |
| 4 | 1.2799079E+00 | −2.4542258E+00 | 1.4604672E+00 | −2.2878778E+00 | 5.3588767E−01 |
| 5 | 1.6962418E+00 | −5.8622835E+00 | 1.2206685E+01 | −2.0290877E+01 | 3.4207774E+01 |
| 6 | 8.0971652E+01 | −1.8471686E+02 | 2.1073729E+02 | −6.6763807E+02 | −2.7679444E+02 |
| 7 | 9.3187837E+00 | −3.8651267E+00 | −3.2911393E+01 | 8.6640540E+01 | −7.6951540E+01 |
| 8 | −4.8814710E−01 | 1.7689097E+00 | −1.1333786E+00 | −1.2753565E+00 | 1.3473508E+00 |
| 9 | 4.5567250E−01 | 3.3870799E+00 | −5.3574139E+00 | 3.2378759E+00 | −1.9696607E+00 |
| 10 | −2.8303202E−01 | 1.7509220E−01 | 3.4436700E−02 | 9.1633374E−02 | −1.7355846E−01 |
| 11 | −9.1430574E−02 | 1.1961615E−01 | −2.5127579E−02 | 3.2867930E−04 | −6.2740261E−03 |
| 12 | −1.4403469E−02 | 9.1714327E−05 | 6.8117064E−03 | −5.4616518E−03 | 1.4798788E−03 |
| 13 | −1.9670585E−03 | 4.5286869E−03 | −1.9750939E−03 | 9.9380673E−04 | −3.1856932E−04 |

| | A12 | A13 | A14 | A15 | A16 |
|---|---|---|---|---|---|
| 2 | 1.7665987E+01 | 2.2614171E+01 | −3.0956298E+01 | 1.3443419E+01 | −1.8923751E+00 |
| 3 | −5.4535158E+01 | 1.8135763E+01 | 1.1589457E+01 | −1.1520359E+01 | 2.7727422E+00 |
| 4 | 8.4158465E+00 | −9.5090281E+00 | −1.6366764E+00 | 6.5037704E+00 | −2.3888715E+00 |
| 5 | −5.5742422E+01 | 6.9166252E+01 | −5.5431292E+01 | 2.5118340E+01 | −4.8818287E+00 |
| 6 | 2.3111058E+02 | 1.4637400E+02 | −3.6012161E+02 | 2.2767841E+02 | −5.1022668E+01 |
| 7 | −3.4731643E+01 | 1.4122869E+02 | −1.3297256E+02 | 5.7675657E+01 | −9.9248838E+00 |
| 8 | 4.0403068E−01 | −3.3238531E−01 | −5.5862115E−01 | 4.6133852E−01 | −9.5522795E−02 |
| 9 | 2.5438899E+00 | −1.3196983E+00 | −5.1809987E−01 | 6.5830195E−01 | −1.5533143E−01 |
| 10 | 8.4150063E−02 | −1.9623841E−02 | 8.9620851E−03 | −4.3928411E−03 | 7.3181774E−04 |
| 11 | −2.4544921E−06 | 1.8147590E−03 | 7.3385721E−06 | −2.8644692E−04 | 5.1848889E−05 |
| 12 | 4.9590113E−05 | −2.1244749E−04 | 1.0579592E−04 | −2.4784222E−05 | 2.2397676E−06 |
| 13 | −3.3990686E−05 | 7.7240037E−05 | −3.1336302E−05 | 5.8773668E−06 | −4.4311094E−07 |

TABLE 7

Example 4
f = 4.048, Bf = 1.077, Fno. = 2.05, 2ω = 75.0

| Si | Ri | Di | Ndj | νdj |
|---|---|---|---|---|
| 1 (aperture stop) | ∞ | −0.125 | | |
| *2 | 1.73389 | 0.621 | 1.54488 | 54.87 |
| *3 | −28.08213 | 0.048 | | |
| *4 | 13.65826 | 0.254 | 1.63350 | 23.62 |
| *5 | 2.79414 | 0.456 | | |
| *6 | −23.57276 | 0.398 | 1.54488 | 54.87 |
| *7 | −40.16533 | 0.357 | | |
| *8 | 51.13331 | 0.424 | 1.54488 | 54.87 |
| *9 | −1.51718 | 0.093 | | |
| *10 | −1.82617 | 0.306 | 1.63350 | 23.62 |
| *11 | −1.99393 | 0.424 | | |
| *12 | −10.25029 | 0.266 | 1.54488 | 54.87 |
| *13 | 1.52282 | 0.400 | | |
| 14 | ∞ | 0.210 | 1.51633 | 64.14 |
| 15 | ∞ | 0.538 | | |
| 16 (imaging plane) | ∞ | | | |

*aspherical surface

TABLE 8

Example 4: Aspherical Surface Data

| Surface Number | KA | A3 | A4 | A5 | A6 |
|---|---|---|---|---|---|
| 2 | 1.0956602E+00 | 0.0000000E+00 | −7.9327521E−02 | 2.4687994E−01 | −1.1424899E−01 |
| 3 | 1.9155794E+02 | 0.0000000E+00 | −8.4465116E−02 | −3.2779218E−01 | 7.2745459E−01 |
| 4 | −1.7935535E+00 | 0.0000000E+00 | −1.3793695E−01 | −6.2155528E−01 | 4.9209248E+00 |
| 5 | −7.3545441E+00 | 0.0000000E+00 | −7.9575649E−02 | 1.7560172E−01 | 1.0390905E−01 |

TABLE 8-continued

Example 4: Aspherical Surface Data

|  |  |  |  |  |  |
|---|---|---|---|---|---|
| 6 | 3.0714073E+01 | 0.0000000E+00 | −2.4081450E−01 | 3.5435343E−01 | −1.2296244E+00 |
| 7 | −5.2058959E+02 | 0.0000000E+00 | −3.8154504E−01 | 7.3098703E−01 | −8.4801642E−01 |
| 8 | 1.0121849E+03 | 0.0000000E+00 | −1.2155400E−01 | 2.9232697E−01 | −3.9100681E−01 |
| 9 | 5.0157981E−01 | 0.0000000E+00 | −5.7038942E−02 | 9.5359835E−01 | −2.0673052E+00 |
| 10 | −2.9709732E+00 | 0.0000000E+00 | −1.5010493E−02 | 4.9271613E−01 | −1.1991939E+00 |
| 11 | −2.2294378E−02 | 0.0000000E+00 | 1.6459276E−01 | −2.5656506E−02 | −5.9872262E−02 |
| 12 | −1.0886969E+01 | 0.0000000E+00 | −2.2294006E−01 | 1.0188910E−01 | 2.2924518E−02 |
| 13 | −6.2508382E+00 | 0.0000000E+00 | −2.1435154E−01 | 1.7061646E−01 | −3.2240570E−02 |

|  | A7 | A8 | A9 | A10 | A11 |
|---|---|---|---|---|---|
| 2 | −6.9807819E−01 | 8.0448763E−01 | 4.2130272E−01 | −4.8682758E−01 | −2.8044756E−01 |
| 3 | 1.5047126E+00 | −4.6570941E+00 | 2.3461910E+00 | 1.5012281E+00 | 2.2504328E+00 |
| 4 | −1.8703840E+01 | 4.7466809E+01 | −6.7895247E+01 | 3.6852242E+01 | 1.7145503E+01 |
| 5 | −1.7188903E−01 | 1.2346369E−02 | 9.6030967E−02 | −2.5011315E−01 | 4.3911800E−01 |
| 6 | 1.3744700E+00 | 2.3099733E+05 | −5.7799888E+00 | −9.2622157E−01 | 9.3754892E−01 |
| 7 | −1.0379399E+00 | 2.5583271E+00 | 2.7228219E−01 | −2.2283234E+00 | −3.3579004E+00 |
| 8 | −1.1861539E−01 | 8.2877628E−01 | −5.0203257E−01 | −8.9783417E−02 | −1.6989292E+00 |
| 9 | 2.0017886E+00 | 2.7180104E−02 | −1.5384344E+00 | 9.9444730E−01 | −1.0922980E+00 |
| 10 | 2.2129874E+00 | −3.3569788E+00 | 3.0488416E+00 | −8.8685306E−01 | −1.0201958E+00 |
| 11 | −9.6598081E−02 | 1.5851631E−01 | −6.3593201E−02 | 9.8379556E−03 | 2.0072241E−04 |
| 12 | −1.7786229E−02 | 4.2262464E−03 | 1.0986515E−03 | 1.4026823E−05 | −1.7422620E−03 |
| 13 | −3.1338541E−02 | 2.8317144E−02 | −8.5706275E−03 | −3.1298791E−03 | 3.2360158E−03 |

|  | A12 | A13 | A14 | A15 | A16 |
|---|---|---|---|---|---|
| 2 | −8.0974623E−01 | 2.1938796E−02 | 3.9933726E+00 | −4.5837665E+00 | 1.5161321E+00 |
| 3 | −6.0692381E+00 | −5.7363882E−01 | 7.6757296E+00 | −5.6791756E+00 | 1.3172231E+00 |
| 4 | −6.1740994E+00 | −5.6952768E+01 | 7.4341236E+01 | −3.7062368E+01 | 6.8090089E+00 |
| 5 | −2.7726507E−01 | −1.8932578E−01 | 4.1454949E−01 | −2.5360638E−01 | 5.6281545E−02 |
| 6 | −3.2377951E+00 | −5.7862887E+00 | 3.2629631E+00 | 1.0124640E+00 | −6.9682551E−01 |
| 7 | 7.9098614E+00 | −3.6784532E+00 | −1.2431932E+00 | 1.3040882E+00 | −2.3278236E−01 |
| 8 | 3.9517860E+00 | −3.0870906E+00 | 8.8244516E−01 | 1.3313806E−02 | −3.2632857E−02 |
| 9 | 1.7529985E+00 | −5.6307734E−01 | −8.4670224E−01 | 7.0176274E−01 | −1.5156616E−01 |
| 10 | 1.3031298E+00 | −7.1063075E−01 | 2.2440252E−01 | −4.0935422E−02 | 3.3990830E−03 |
| 11 | −7.0677554E−03 | 5.4141865E−03 | −1.1191187E−03 | −8.7622200E−05 | 3.6845383E−05 |
| 12 | 1.0665353E−03 | −2.7667631E−04 | 3.8462364E−05 | −2.3770393E−06 | −7.6299518E−08 |
| 13 | −1.7904335E−04 | −7.8786101E−04 | 4.0812432E−04 | −8.6904954E−05 | 7.1136025E−06 |

TABLE 9

Example 5
f = 4.041, Bf = 1.085, Fno. = 2.05, 2ω = 75.0

| Si | Ri | Di | Ndj | νdj |
|---|---|---|---|---|
| 1 (aperture stop) | ∞ | −0.125 | | |
| *2 | 1.70964 | 0.639 | 1.54488 | 54.87 |
| *3 | −59.10011 | 0.051 | | |
| *4 | −28.50856 | 0.261 | 1.63350 | 23.62 |
| *5 | 4.84512 | 0.421 | | |
| *6 | −89.00419 | 0.371 | 1.54488 | 54.87 |
| *7 | 203.03882 | 0.396 | | |
| *8 | −11.21799 | 0.514 | 1.54488 | 54.87 |
| *9 | −1.40549 | 0.070 | | |
| *10 | −3.33302 | 0.287 | 1.63350 | 23.62 |
| *11 | −3.60904 | 0.365 | | |
| *12 | −21.66639 | 0.266 | 1.54488 | 54.87 |
| *13 | 1.40916 | 0.400 | | |
| 14 | ∞ | 0.210 | 1.51633 | 64.14 |
| 15 | ∞ | 0.546 | | |
| 16 (imaging plane) | ∞ | | | |

*aspherical surface

TABLE 10

Example 5: Aspherical Surface Data

| Surface Number | KA | A3 | A4 | A5 | A6 |
|---|---|---|---|---|---|
| 2 | 9.5348043E−01 | 0.0000000E+00 | −8.1549773E−02 | 3.2228719E−01 | −6.0560380E−01 |
| 3 | −1.8020420E+03 | 0.0000000E+00 | −1.2367653E−01 | −3.2003877E−01 | 6.7093402E−01 |
| 4 | 1.1814933E+01 | 0.0000000E+00 | −2.0274303E−01 | 5.0157745E−02 | 5.8169068E−01 |
| 5 | −7.5645561E+00 | 0.0000000E+00 | −1.0184770E−01 | 1.8404430E−01 | 2.0093898E−01 |
| 6 | −1.1503407E+02 | 0.0000000E+00 | −2.7431051E−01 | 3.1613171E−01 | −1.0415742E+00 |
| 7 | −4.3338830E+01 | 0.0000000E+00 | −3.3367932E−01 | 5.0845872E−01 | −4.0169947E−01 |
| 8 | −7.3027078E+02 | 0.0000000E+00 | −6.5990652E−02 | 1.1283614E−01 | −8.8256355E−02 |
| 9 | 4.7074078E−01 | 0.0000000E+00 | −1.3959236E−01 | 7.0775890E−01 | −8.7223803E−01 |
| 10 | −2.9569635E+00 | 0.0000000E+00 | −2.8679880E−01 | 3.2211862E−01 | 1.0751987E−01 |
| 11 | −4.6358021E−02 | 0.0000000E+00 | −6.5430411E−03 | −1.0459524E−01 | 2.4718790E−02 |
| 12 | −1.2611139E+01 | 0.0000000E+00 | −2.4617815E−01 | 6.7229344E−02 | 5.6158630E−02 |

TABLE 10-continued

Example 5: Aspherical Surface Data

| | | | | | |
|---|---|---|---|---|---|
| 13 | −6.0478815E+00 | 0.0000000E+00 | −2.2414688E−01 | 1.9270613E−01 | −7.3078870E−02 |

| | A7 | A8 | A9 | A10 | A11 |
|---|---|---|---|---|---|
| 2 | 1.1242040E+00 | −3.2784973E+00 | 5.4921352E+00 | −2.2105387E+00 | −3.7705788E+00 |
| 3 | 1.4363796E+00 | −3.9831923E+00 | 1.1236473E+00 | 3.7648718E+00 | −8.2843506E−01 |
| 4 | −9.9764013E−01 | 3.1470743E+00 | −3.9071983E+00 | −2.9123634E+00 | 5.3854764E+00 |
| 5 | −5.11188883E−01 | 1.0859135E+00 | −2.1475430E−00 | 2.7620418E+00 | −2.2870697E+00 |
| 6 | 1.7639242E+00 | −5.4774653E−01 | −1.5082362E+00 | −4.6847951E−01 | 3.0296876E+00 |
| 7 | −1.3005233E+00 | 2.6048525E+00 | −5.0671511E−01 | −2.0237535E+00 | 6.1252182E−01 |
| 8 | −4.7405819E−01 | 1.9283036E+00 | −2.5318633E+00 | 8.7459903E−01 | −6.7107764E−01 |
| 9 | 4.2427552E−01 | 6.7033924E−01 | −1.3539758E+00 | 6.4524898E−01 | 1.8426933E−01 |
| 10 | −5.0332270E−01 | 1.4272811E−01 | 3.3981974E−01 | −1.2157994E−01 | −1.4735575E−01 |
| 11 | 4.3385062E−02 | 3.5574750E−03 | −1.0246082E−03 | −1.2740880E−02 | 2.1680017E−03 |
| 12 | −2.5682447E−02 | 1.9757662E−02 | −2.0003174E−02 | 9.2909102E−03 | −1.4153769E−03 |
| 13 | 2.1273090E−02 | −8.9115368E−03 | −1.6122944E−03 | 3.6959102E−03 | 1.7018395E−03 |

| | A12 | A13 | A14 | A15 | A16 |
|---|---|---|---|---|---|
| 2 | 2.2176919E+00 | 2.8824991E+00 | −1.4638116E+00 | −1.6711624E+00 | 9.9403074E−00 |
| 3 | −5.7926461E+00 | 3.0474274E+00 | 4.3393424E+00 | −4.7076662E+00 | 1.2837566E+00 |
| 4 | 7.1346742E+00 | −1.4256146E+01 | 3.9885862E+00 | 4.0174414E+00 | −2.0164681E+00 |
| 5 | 1.6494660E+00 | −1.6545958E+00 | 1.5731641E+00 | −8.5918763E−01 | 1.9164972E−01 |
| 6 | 1.1648934E+00 | −4.7713545E+00 | 1.3886719E+00 | 1.35463362E+00 | −6.1857731E−01 |
| 7 | 1.4107425E+00 | −3.6915163E−01 | −8.4811356E−01 | 4.8012907E−01 | −5.1939172E−02 |
| 8 | 2.9617254E+00 | −2.8686617E+00 | 3.5918299E−01 | 6.5185199E−01 | −2.3454336E−01 |
| 9 | −2.0678821E−01 | 2.1754757E−01 | −3.4118006E−01 | 2.1173863E−01 | −4.3286154E−02 |
| 10 | 5.6367022E−02 | 3.6688128E−03 | 2.8868690E−02 | −2.3521283E−02 | 4.6247300E−03 |
| 11 | 1.8917596E−03 | −1.1017656E−04 | −1.7582642E−04 | −2.9780978E−06 | 7.6249648E−06 |
| 12 | −4.6351353E−04 | 7.1470917E−05 | 1.3480605E−04 | −5.9282827E−05 | 7.5373788E−06 |
| 13 | −4.6285747E−03 | 3.1565345E−03 | −1.0354645E−03 | 1.9406190E−04 | −1.4406021E−05 |

TABLE 11

Example 6
f = 4.036, Bf = 1.082, Fno. = 2.05, 2ω = 75.0

| Si | Ri | Di | Ndj | vdj |
|---|---|---|---|---|
| 1 (aperture stop) | ∞ | −0.125 | | |
| *2 | 1.71228 | 0.641 | 1.54488 | 54.87 |
| *3 | −44.02760 | 0.050 | | |
| *4 | −26.61422 | 0.260 | 1.63350 | 23.62 |
| *5 | 4.88376 | 0.422 | | |
| *6 | −27.30481 | 0.375 | 1.54488 | 54.87 |
| *7 | −43.56873 | 0.398 | | |
| *8 | −10.96472 | 0.509 | 1.54488 | 54.87 |
| *9 | −1.41326 | 0.071 | | |
| *10 | −3.43268 | 0.287 | 1.63350 | 23.62 |
| *11 | −3.72300 | 0.361 | | |
| *12 | −20.26896 | 0.267 | 1.54488 | 54.87 |
| *13 | 1.41558 | 0.400 | | |
| 14 | ∞ | 0.210 | 1.51633 | 64.14 |
| 15 | ∞ | 0.544 | | |
| 16 (imaging plane) | ∞ | | | |

*aspherical surface

TABLE 12

Example 6: Aspherical Surface Data

| Surface Number | KA | A3 | A4 | A5 | A6 |
|---|---|---|---|---|---|
| 2 | 9.0928645E−01 | 0.0000000E+00 | −7.7797157E−02 | 2.7357799E−01 | −2.6603433E−01 |
| 3 | −2.2180497E+03 | 0.0000000E+00 | −1.2101980E−01 | −4.0638221E−01 | 1.3004245E+00 |
| 4 | 3.2901929E+01 | 0.0000000E+00 | 7.8620021E−02 | −5.3307808E+00 | 4.3261333E+01 |
| 5 | −7.5698139E+00 | 0.0000000E+00 | −9.9473792E−02 | 1.8953063E−01 | 1.1737233E−01 |
| 6 | −1.5363702E+02 | 0.0000000E+00 | −2.7300156E−01 | 3.1979902E−01 | −1.1087941E+00 |
| 7 | −1.5519694E+02 | 0.0000000E+00 | −3.3380695E−01 | 5.0327452E−01 | −3.5702429E−01 |
| 8 | −7.0608435E+02 | 0.0000000E+00 | −7.6621946E−02 | 2.7320392E−01 | −1.2053024E+00 |
| 9 | 4.7540885E−01 | 0.0000000E+00 | −1.3990181E−01 | 6.8122754E−01 | −7.1824546E−01 |
| 10 | −2.9636189E+00 | 0.0000000E+00 | −2.8991848E−01 | 3.4540096E−01 | −3.4132575E−02 |
| 11 | −4.9155539E−02 | 0.0000000E+00 | −1.2410273E−02 | −1.0035732E−01 | 2.4570467E−02 |
| 12 | −1.4823555E+01 | 0.0000000E+00 | −2.4360381E−01 | 7.3112231E−02 | 3.0231346E−02 |
| 13 | −6.0523230E+00 | 0.0000000E+00 | −2.191789SE−01 | 1.8141386E−01 | −5.4763697E−02 |

| | A7 | A8 | A9 | A10 | A11 |
|---|---|---|---|---|---|
| 2 | −1.2679750E−01 | −7.4094557E−01 | 3.2538697E+00 | −3.3664691E+00 | 3.8474512E−01 |
| 3 | −7.9866444E−01 | −2.1576066E−01 | 1.1715421E+00 | −9.6370093E+00 | 2.7053391E+01 |
| 4 | −1.8194226E+02 | 4.3182830E+02 | −4.7262670E+02 | −2.4778949E+02 | 1.5999996E+03 |

TABLE 12-continued

Example 6: Aspherical Surface Data

| | | | | | |
|---|---|---|---|---|---|
| 5 | −1.0039637E−01 | −1.9117637E−01 | 4.3574466E−01 | −6.5967686E−01 | 7.6577897E−01 |
| 6 | 2.0522993E+00 | −1.0098143E+00 | −1.6626512E+00 | 1.2594354E+00 | 5.2431881E−01 |
| 7 | −1.4650230E+00 | 2.9027340E+00 | −6.9748249E−01 | −2.1331825E+00 | 6.4236616E−01 |
| 8 | 3.3470818E+00 | −5.6424319E+00 | 6.6393503E+00 | −6.1833718E+00 | 3.8170851E+00 |
| 9 | 6.4408779E+02 | 9.8717231E−01 | −1.1928215E+00 | 3.9094779E−02 | 6.1961957E−01 |
| 10 | −9.2953812E−02 | −4.8483827E−01 | 8.3860059E−01 | −2.3214761E−01 | −2.7354299E−01 |
| 11 | 5.3682607E−02 | −1.6062542E−02 | 3.6498884E−03 | −7.4711803E−03 | −9.1855455E−03 |
| 12 | 2.4274661E−02 | −3.7766396E−02 | 1.4738786E−02 | 5.4841219E−03 | −9.1585858E−03 |
| 13 | 1.3907584E−03 | −7.0883408E−04 | 4.7158619E−03 | −4.4399484E−03 | 2.3821006E−03 |

| | A12 | A13 | A14 | A15 | A16 |
|---|---|---|---|---|---|
| 2 | 6.8727427E−01 | −1.3787454E+00 | 4.5205194E+00 | −4.8376797E+00 | 1.6267682E+00 |
| 3 | −3.3495501E+01 | 1.5988153E+01 | 4.0654352E+00 | −6.9224757E+00 | 1.9270723E+00 |
| 4 | −2.4132181E+03 | 1.9200204E+03 | −8.3835672E+02 | 1.7268443E+02 | −8.5803804E+00 |
| 5 | −5.0397129E−01 | 5.5244456E−02 | 1.6597533E−01 | −1.1460099E−01 | 2.5088757E−02 |
| 6 | 1.6535568E+00 | −1.9138320E+00 | −2.4343965E+00 | 3.4324233E+00 | −1.0517415E+00 |
| 7 | 2.0573734E+00 | −1.5641338E+00 | 1.3807158E−01 | 7.2764810E−02 | 1.6567241E−02 |
| 8 | −1.3703291E+00 | 1.7474469E+00 | −2.7771477E+00 | 1.7857594E+00 | −4.0311432E−01 |
| 9 | −5.9874982E−02 | −2.3801604E−01 | −1.6986105E−02 | 1.0540170E−01 | −2.9451363E−02 |
| 10 | 1.1902315E−01 | 6.4465509E−02 | −4.1755017E−02 | 3.2360676E−03 | 9.3212638E−04 |
| 11 | 1.0963636E−02 | −4.1400937E−03 | 7.1192991E−04 | −5.2401626E−05 | −1.6187847E−07 |
| 12 | 2.6994563E−03 | 1.4255617E−03 | −1.2853832E−03 | 3.6674165E−04 | −3.8315640E−05 |
| 13 | −7.8521007E−04 | 1.3746779E−04 | −3.0194839E−06 | −3.0446983E−06 | 3.6917958E−07 |

TABLE 13

Example 7
f = 4.171, Bf = 0.995, Fno. = 2.05, 2ω = 72.8

| Si | Ri | Di | Ndj | vdj |
|---|---|---|---|---|
| 1 (aperture stop) | ∞ | −0.115 | | |
| *2 | 1.60354 | 0.679 | 1.54488 | 54.87 |
| *3 | 683.81695 | 0.039 | | |
| *4 | 11.70825 | 0.257 | 1.63350 | 23.62 |
| *5 | 2.94009 | 0.358 | | |
| *6 | −25.12735 | 0.398 | 1.54488 | 54.87 |
| *7 | 46.43181 | 0.225 | | |
| *8 | −6.12009 | 0.401 | 1.54488 | 54.87 |
| *9 | −1.78574 | 0.234 | | |
| *10 | −2.45017 | 0.265 | 1.63350 | 23.62 |
| *11 | −2.76686 | 0.600 | | |
| *12 | −25.85452 | 0.269 | 1.54488 | 54.87 |
| *13 | 2.81180 | 0.400 | | |
| 14 | ∞ | 0.210 | 1.51633 | 64.14 |
| 15 | ∞ | 0.456 | | |
| 16 (imaging plane) | ∞ | | | |

*aspherical surface

TABLE 14

Example 7: Aspherical Surface Data

| Surface Number | KA | A3 | A4 | A5 | A6 |
|---|---|---|---|---|---|
| 2 | 1.0949270E+00 | 0.0000000E+00 | −1.5636726E−01 | 4.3720380E−01 | 3.0538130E−01 |
| 3 | 4.2022612E+02 | 0.0000000E+00 | −2.0860612E−01 | −8.3822539E−02 | −1.3561297E+00 |
| 4 | −4.4707459E+00 | 0.0000000E+00 | −4.0167677E−01 | 1.5124166E−01 | 8.7269307E−01 |
| 5 | −7.5726103E+00 | 0.0000000E+00 | −1.6752517E−01 | 2.3949259E−01 | 2.7185215E−01 |
| 6 | −2.1847633E+02 | 0.0000000E+00 | −5.6104600E−01 | 1.6862154E+00 | −2.7967630E+00 |
| 7 | 1.8724597E+03 | 0.0000000E+00 | −3.0230600E−01 | 6.1316372E−01 | −6.0207551E−01 |
| 8 | −2.0810854E+03 | 0.0000000E+00 | −6.1980685E−01 | 1.0373974E+00 | 1.8961064E+00 |
| 9 | 3.5212140E−01 | 0.0000000E+00 | −9.9716893E−01 | 2.6921030E+00 | 2.9392732E+00 |
| 10 | −2.8908760E+00 | 0.0000000E+00 | −1.1705242E+00 | 4.7268948E−01 | 1.3402283E+00 |
| 11 | −5.0666332E−02 | 0.0000000E+00 | −7.9160868E−01 | 2.7785006E−01 | 9.3372662E−01 |
| 12 | −4.3740644E+00 | 0.0000000E+00 | −4.3969547E−01 | 3.3861642E−01 | 1.8118817E−02 |
| 13 | −6.3919328E+00 | 0.0000000E+00 | −1.8816802E−01 | 1.3070616E−01 | −3.1534499E−02 |

| | A7 | A8 | A9 | A10 | A11 |
|---|---|---|---|---|---|
| 2 | −2.9917023E+00 | 4.6803679E+00 | −4.5079094E+00 | 7.5363341E+00 | −9.5944828E+00 |
| 3 | 1.1191488E+01 | −2.4615364E+01 | 2.1997558E+01 | −4.6619502E+00 | 1.0214371E+00 |
| 4 | 9.5544659E−01 | −4.6216884E+00 | 5.5242551E+00 | −5.2642763E+00 | 4.3434716E+00 |
| 5 | −2.7147602E−01 | −9.0073747E−02 | −1.8351553E−01 | 5.8654696E−01 | −2.3442296E−01 |
| 6 | −3.7020139E+00 | 3.8207995E+00 | 2.9232529E−01 | −2.5358884E+00 | −7.1380701E+00 |
| 7 | −3.3840611E+00 | 9.8248945E+00 | −6.6940914E+00 | −8.4733100E+00 | 1.3967589E+01 |
| 8 | −6.8800257E+00 | 3.6398806E+00 | 6.0004153E+00 | −4.8708336E+00 | −8.1322331E−01 |
| 9 | −2.9680987E+01 | 6.3988906E+01 | −5.2929575E+01 | −7.9116274E+00 | 4.1482580E+01 |
| 10 | −5.4987338E−01 | −5.8616152E−01 | 5.9613494E−02 | 3.5993303E−01 | −1.3579818E−01 |
| 11 | −4.5576055E−00 | −5.2163894E−01 | 3.4530472E−01 | 1.4386825E−01 | −1.2439650E−01 |

TABLE 14-continued

Example 7: Aspherical Surface Data

| | | | | | |
|---|---|---|---|---|---|
| 12 | −6.5914364E−02 | −6.8983481E−02 | 1.0932649E−01 | −6.6916728E−02 | 2.2926898E−02 |
| 13 | −3.5312009E−03 | 4.1456781E−03 | −1.6408219E−03 | 4.4874243E−04 | −1.5302675E−04 |

| | A12 | A13 | A14 | A15 | A16 |
|---|---|---|---|---|---|
| 2 | 4.1229515E+00 | −3.9181551E+00 | 1.2453348E+01 | −1.2145626E+01 | 3.7358632E+00 |
| 3 | −1.3524679E+01 | 1.2171338E+01 | 3.3570420E+00 | −8.0133463E+00 | 2.6387758E+00 |
| 4 | −4.3222990E+00 | 1.2268646E+01 | −2.0639819E+01 | 1.5217949E+01 | −4.1144429E+00 |
| 5 | −4.7395089E−01 | 7.8772017E−01 | −5.6739119E−01 | 2.0757524E−01 | −3.0368057E−02 |
| 6 | 6.3672285E+00 | 7.9123473E+00 | −6.4934042E+00 | −3.6773591E+00 | 2.9520761E+00 |
| 7 | −2.5692170E+00 | −4.2499742E+00 | 7.3476925E−01 | 1.3303848E+00 | −4.4174228E−01 |
| 8 | −7.3022262E+00 | 1.1657807E+01 | −3.9844780E−01 | −5.6060414E+00 | 2.0923362E+00 |
| 9 | −1.5165912E+01 | −1.6393614E+01 | 1.7518584E+01 | −6.3971164E+00 | 8.6274415E−01 |
| 10 | −8.3960214E−02 | 1.0990133E−01 | −4.7804959E−02 | 6.9274068E−03 | 2.2265561E−04 |
| 11 | −1.8518105E−02 | 1.1437613E−02 | 1.7393774E−02 | −1.0577462E−02 | 1.6754724E−03 |
| 12 | 2.9317155E−03 | −9.1272517E−03 | 4.8930077E−03 | −1.1801099E−03 | 1.1191165E−04 |
| 13 | 1.0628246E−04 | −5.6629863E−05 | 1.6693504E−05 | −2.4857339E−06 | 1.4341867E−07 |

TABLE 15

Example 8
f = 4.183, Bf = 1.012, Fno. = 2.05, 2ω = 72.8

| Si | Ri | Di | Ndj | νdj |
|---|---|---|---|---|
| 1 (aperture stop) | ∞ | −0.125 | | |
| *2 | 1.61258 | 0.677 | 1.54488 | 54.87 |
| *3 | 1246.00341 | 0.044 | | |
| *4 | 12.00776 | 0.262 | 1.63350 | 23.62 |
| *5 | 3.00831 | 0.383 | | |
| *6 | −16.53086 | 0.445 | 1.54488 | 54.87 |
| *7 | 77.91037 | 0.208 | | |
| *8 | −6.78938 | 0.378 | 1.54488 | 54.87 |
| *9 | −1.63152 | 0.252 | | |
| *10 | −1.86809 | 0.310 | 1.63350 | 23.62 |
| *11 | −2.11189 | 0.511 | | |
| *12 | −25.24769 | 0.258 | 1.54488 | 54.87 |
| *13 | 2.31545 | 0.400 | | |
| 14 | ∞ | 0.210 | 1.51633 | 64.14 |
| 15 | ∞ | 0.474 | | |
| 16 (imaging plane) | ∞ | | | |

*aspherical surface

TABLE 16

Example 8: Aspherical Surface Data

| Surface Number | KA | A3 | A4 | A5 | A6 |
|---|---|---|---|---|---|
| 2 | 1.0747691E+00 | 0.0000000E+00 | −1.6514676E−01 | 5.0919002E−01 | −1.0368657E−01 |
| 3 | −1.3748273E+03 | 0.0000000E+00 | −1.8063472E−01 | −4.0890664E−01 | 8.6721944E−01 |
| 4 | −5.5496481E+01 | 0.0000000E+00 | −3.7624782E−01 | 9.4072735E−02 | 1.0410232E+00 |
| 5 | −7.6648086E+00 | 0.0000000E+00 | −1.5751571E−01 | 2.5767841E−01 | 2.0088310E−01 |
| 6 | −2.6622789E+02 | 0.0000000E+00 | −4.3915609E−01 | 1.2215380E+00 | −1.7783654E+00 |
| 7 | 5.1325191E+03 | 0.0000000E+00 | −3.5727179E−01 | 5.4945592E−01 | −3.5122066E−01 |
| 8 | −2.4631368E+03 | 0.0000000E+00 | −5.2991010E−01 | 8.5898298E−01 | −3.7639197E−01 |
| 9 | 3.3921214E−01 | 0.0000000E+00 | −5.3084603E−01 | 1.9728318E+00 | −3.1573835E+00 |
| 10 | −2.8955017E+00 | 0.0000000E+00 | −7.2482746E−01 | 4.7350260E−01 | 5.4478938E−01 |
| 11 | −5.7525404E−02 | 0.0000000E+00 | −3.8465691E−01 | 1.0164353E−01 | 4.1816358E−01 |
| 12 | −2.9514479E+01 | 0.0000000E+00 | −3.3823153E−01 | 1.5073730E−01 | 9.0376789E−02 |
| 13 | −6.1795416E+00 | 0.0000000E+00 | −2.2267169E−01 | 1.7216655E−01 | −4.1130601E−02 |

| | A7 | A8 | A9 | A10 | A11 |
|---|---|---|---|---|---|
| 2 | −1.4202673E+00 | 1.0749584E+00 | 3.2793230E−02 | 4.3599556E+00 | −6.0262232E+00 |
| 3 | 2.7211842E+00 | −5.7248522E+00 | −4.7518651E+00 | 2.1101593E+01 | −1.8896394E+01 |
| 4 | 7.0536800E−02 | −1.9873094E+00 | 8.0857958E−01 | −2.5362945E−01 | 4.5006372E−02 |
| 5 | −1.8715163E−01 | −2.7683265E−01 | 2.9682253E−01 | 4.5993982E−02 | −1.8789581E−01 |
| 6 | −2.9313441E+00 | 1.4559393E+01 | −2.3782786E+01 | 2.7990200E+01 | −3.9965052E+01 |
| 7 | −1.6926403E+00 | 3.6157968E+00 | −1.3611110E+00 | −3.4801574E+00 | 2.7812258E+00 |
| 8 | 1.6014392E+00 | −6.6705037E+00 | 8.2917831E+00 | −1.0046638E−01 | −8.9994749E+00 |
| 9 | 1.1455988E+00 | 3.5861040E+00 | −2.8691773E+00 | −2.0230460E+00 | 1.5899596E−03 |
| 10 | −1.0475219E+00 | 1.1306067E+00 | −6.1598456E−01 | −5.7982036E−03 | 1.7924244E−01 |
| 11 | −3.4408111E−01 | 1.1534744E−01 | −8.8839340E−02 | 1.3109428E−01 | −9.3098137E−02 |
| 12 | −5.8552227E−02 | 8.4525480E−04 | 3.3187389E−03 | −3.8432280E−03 | 6.0980118E−03 |
| 13 | −1.6714672E−02 | 1.9207353E−02 | −8.2021408E−03 | 1.6220945E−04 | 1.4219152E−03 |

| | A12 | A13 | A14 | A15 | A16 |
|---|---|---|---|---|---|
| 2 | −4.6432151E+00 | 8.8365601E+00 | 2.7103021E+00 | −8.3494975E+00 | 3.1385997E+00 |
| 3 | 4.0643520E+00 | −4.8244853E+00 | 1.4935110E+01 | −1.2221990E+01 | 3.2291213E+00 |

TABLE 16-continued

Example 8: Aspherical Surface Data

| | | | | | |
|---|---|---|---|---|---|
| 4 | 4.2986786E+00 | −4.1662918E+00 | −4.2414176E+00 | 7.2110061E+00 | −2.5751558E+00 |
| 5 | 5.1842455E−02 | 1.9785951E−01 | −3.0591644E−01 | 1.8438000E−01 | −4.1639441E−02 |
| 6 | 5.8780569E+01 | −6.6303012E+01 | 5.4242934E+01 | −2.8819413E+01 | 7.0393027E+00 |
| 7 | 2.8697749E+00 | −4.1852289E+00 | 1.3500575E+00 | 5.5312622E−02 | −4.0483258E−02 |
| 8 | 7.6424173E+00 | −1.4588885E+00 | −2.4944630E−01 | −4.1079958E−01 | 2.3318636E−01 |
| 9 | 4.7040805E+00 | −2.2640165E+00 | −2.0571692E+00 | 1.9978195E+00 | −4.6421979E−01 |
| 10 | −1.6150089E−01 | 1.3247957E−02 | 1.1827534E−01 | −8.2380024E−02 | 1.6439482E−02 |
| 11 | 3.5838105E−02 | −2.4877397E−02 | 2.1727681E−02 | −8.9297869E−03 | 1.3105394E−03 |
| 12 | −3.7455123E−03 | 9.5565475E−04 | −3.2799604E−05 | −3.0724085E−05 | 4.4926104E−06 |
| 13 | −2.8127442E−04 | −3.0254270E−04 | 1.9330522E−04 | −4.5166989E−05 | 3.9393344E−06 |

TABLE 17

Example 9
f = 4.122, Bf = 1.045, Fno. = 2.05, 2ω = 73.8

| Si | Ri | Di | Ndj | νdj |
|---|---|---|---|---|
| 1 (aperture stop) | ∞ | −0.125 | | |
| *2 | 1.64530 | 0.645 | 1.54488 | 54.87 |
| *3 | 36.04853 | 0.051 | | |
| *4 | 10.13029 | 0.261 | 1.63350 | 23.62 |
| *5 | 2.80109 | 0.403 | | |
| *6 | −25.03799 | 0.445 | 1.54488 | 54.87 |
| *7 | −49.23466 | 0.304 | | |
| *8 | −14.94731 | 0.397 | 1.54488 | 54.87 |
| *9 | −1.59369 | 0.185 | | |

TABLE 17-continued

Example 9
f = 4.122, Bf = 1.045, Fno. = 2.05, 2ω = 73.8

| Si | Ri | Di | Ndj | νdj |
|---|---|---|---|---|
| *10 | −2.03160 | 0.262 | 1.63350 | 23.62 |
| *11 | −2.28221 | 0.468 | | |
| *12 | −25.09030 | 0.259 | 1.54488 | 54.87 |
| *13 | 1.74576 | 0.400 | | |
| 14 | ∞ | 0.210 | 1.51633 | 64.14 |
| 15 | ∞ | 0.507 | | |
| 16 (imaging plane) | ∞ | | | |

*aspherical surface

TABLE 18

Example 9: Aspherical Surface Data

| Surface Number | KA | A3 | A4 | A5 | A6 |
|---|---|---|---|---|---|
| 2 | 9.7213900E−01 | 0.0000000E+00 | −8.5531160E−02 | 3.3638738E−01 | −4.7751554E−01 |
| 3 | −2.6445323E+02 | 0.0000000E+00 | −1.8092804E−01 | −4.7089761E−01 | 1.7532693E+00 |
| 4 | −4.0507395E+01 | 0.0000000E+00 | −3.0670005E−01 | 2.8790032E−03 | 8.0328662E−01 |
| 5 | −7.5266968E+00 | 0.0000000E+00 | −1.3235772E−01 | 2.3685511E−01 | 1.5739045E−01 |
| 6 | −4.9416209E+02 | 0.0000000E+00 | −3.7313795E−01 | 1.0223264E+00 | −2.1036032E+00 |
| 7 | 6.1598727E+01 | 0.0000000E+00 | −3.7013343E−01 | 7.6313574E−01 | −7.3659915E−01 |
| 8 | −2.3621787E+03 | 0.0000000E+00 | −1.3764826E−01 | 2.1250552E−01 | −1.5851047E−01 |
| 9 | 3.4317639E−01 | 0.0000000E+00 | −1.3135770E−01 | 6.8089098E−01 | 2.3699680E−02 |
| 10 | −2.9341626E+01 | 0.0000000E+00 | −2.5755288E−01 | 3.3329881E−01 | 5.5343963E−02 |
| 11 | −5.4204126E−02 | 0.0000000E+00 | −7.8919939E−02 | 2.2215004E−02 | 1.3622484E−01 |
| 12 | −3.9873381E+01 | 0.0000000E+00 | −2.8769385E−01 | 1.1343406E−01 | 7.1556951E−02 |
| 13 | −5.6890365E+00 | 0.0000000E+00 | −2.4504499E−01 | 2.1469521E−01 | −7.4574471E−02 |

| | A7 | A8 | A9 | A10 | A11 |
|---|---|---|---|---|---|
| 2 | 6.2514583E−01 | −2.9142188E+00 | 5.7161596E+00 | −2.8615237E−01 | −1.0712806E+01 |
| 3 | −7.8943202E−01 | −8.9980526E−01 | −1.9761512E+00 | 3.6286207E+00 | 3.4403893E+00 |
| 4 | 2.3101210E−01 | −9.3042627E−01 | −6.4786910E+00 | −2.1193714E+00 | 2.3903915E+00 |
| 5 | −1.6998169E−01 | −1.1599081E−01 | 1.2638747E−02 | 3.4815479E−01 | −4.3003411E−01 |
| 6 | 4.2851951E−01 | 5.8153662E+00 | −1.1764583E+01 | 1.4174093E+01 | −1.3526027E+01 |
| 7 | −1.2098438E+00 | 1.7549072E+00 | 2.2910838E+00 | −4.4005209E+00 | −1.4350057E−01 |
| 8 | 8.6701533E+00 | −2.4717001E+00 | 1.5441448E+00 | 2.5563569E+00 | −4.1924946E+00 |
| 9 | −3.9279524E+00 | 9.2029736E+00 | −7.7666643E+00 | −1.3366912E+00 | 5.7098732E+00 |
| 10 | −2.2998851E−01 | 9.9842370E−03 | 1.5014468E−01 | −3.5114970E−02 | −7.1124802E−02 |
| 11 | −8.6722744E−02 | −6.8479902E−03 | 1.4866642E−02 | 1.2070605E−02 | −1.4155534E−02 |
| 12 | −4.7196098E−02 | 1.6275396E−02 | −1.0171099E−02 | 1.2654113E−03 | 4.1314499E−03 |
| 13 | 5.9187027E−03 | 3.4675270E−03 | −2.9545469E−03 | 2.5373579E−03 | −1.3601778E−03 |

| | A12 | A13 | A14 | A15 | A16 |
|---|---|---|---|---|---|
| 2 | 1.0439350E+01 | −1.1785033E+00 | −9.1531670E−01 | −1.5700272E+00 | 9.8836460E−01 |
| 3 | −6.8489139E+00 | −3.4198350E+00 | 1.1712192E+01 | −7.7211057E+00 | 1.6889350E+00 |
| 4 | 5.3630829E+00 | −4.2300823E+00 | −6.0114535E+00 | 8.4207323E+00 | −2.7451974E+00 |
| 5 | 3.3256012E+00 | −3.7033915E−01 | 4.1455165E−01 | −2.5897595E−01 | 6.4453427E−02 |
| 6 | 2.2979443E+00 | 1.6682606E+01 | −2.0835985E+01 | 9.1419760E+00 | −1.1514445E+00 |
| 7 | 2.0924664E+00 | 2.7723677E+00 | −5.2460355E+00 | 2.6514252E+00 | −4.3215603E−01 |
| 8 | 5.5550397E−01 | 2.5783670E+00 | −1.4975358E+00 | −1.2127581E−01 | 1.8524285E−01 |
| 9 | −1.5228120E+00 | −1.6540391E+00 | 7.5222707E−01 | 1.5939540E−01 | −9.3391100E−02 |
| 10 | 3.0585696E−02 | 8.5729579E−03 | −2.6069538E−03 | −2.3013101E−03 | 6.7427509E−04 |

TABLE 18-continued

Example 9: Aspherical Surface Data

| | | | | | |
|---|---|---|---|---|---|
| 11 | 1.3152575E−03 | 2.2693758E−03 | −4.1816279E−04 | −1.7576159E−04 | 4.2477679E−05 |
| 12 | −2.7632722E−03 | 3.8036371E−04 | 2.4896380E−04 | −1.0802057E−04 | 1.2938439E−05 |
| 13 | 3.2990103E−04 | 1.3360857E−05 | −2.6920494E−05 | 5.7898525E−06 | −4.1448367E−07 |

TABLE 19

Example 10
$f = 3.813$, $Bf = 1.102$, $Fno. = 2.05$, $2\omega = 78.6$

| Si | Ri | Di | Ndj | vdj |
|---|---|---|---|---|
| 1 (aperture stop) | ∞ | −0.027 | | |
| *2 | 1.78390 | 0.553 | 1.54488 | 54.87 |
| *3 | −16.92406 | 0.032 | | |
| *4 | 6.61382 | 0.275 | 1.63350 | 23.62 |
| *5 | 2.41547 | 0.470 | | |
| *6 | 3062.69038 | 0.422 | 1.54488 | 54.87 |
| *7 | 129.51927 | 0.286 | | |
| *8 | −5.58693 | 0.451 | 1.54488 | 54.87 |
| *9 | −1.11033 | 0.095 | | |
| *10 | −1.73170 | 0.278 | 1.63350 | 23.62 |
| *11 | −1.88742 | 0.291 | | |
| *12 | −21.92581 | 0.304 | 1.54488 | 54.87 |
| *13 | 1.33553 | 0.400 | | |
| 14 | ∞ | 0.210 | 1.51633 | 64.14 |
| 15 | ∞ | 0.564 | | |
| 16 (imaging plane) | ∞ | | | |

*aspherical surface

TABLE 20

Example 10: Aspherical Surface Data

| Surface Number | KA | A3 | A4 | A5 | A6 |
|---|---|---|---|---|---|
| 2 | 2.8999668E+00 | 0.0000000E+00 | −1.3424500E−01 | 5.1145611E−01 | −1.2431241E+00 |
| 3 | 3.0883089E+01 | 0.0000000E+00 | −2.3486950E−01 | −2.6614742E−01 | −1.0501039E+00 |
| 4 | −9.0670700E+02 | 0.0000000E+00 | −4.7404444E−02 | 2.2628160E−02 | −9.0606741E−01 |
| 5 | −9.9943436E+00 | 0.0000000E+00 | −5.9555981E−02 | 2.2873343E−01 | −2.9086897E−02 |
| 6 | 2.6275312E+03 | 0.0000000E+00 | −3.0383638E−01 | 7.2981483E−01 | −1.2935405E+00 |
| 7 | 6.0388639E+00 | 0.0000000E+00 | −3.0350281E−01 | 4.1680668E−01 | −2.4283454E−01 |
| 8 | −6.3284183E+02 | 0.0000000E+00 | −6.4033538E−01 | 8.6223816E−01 | 2.0009737E−01 |
| 9 | 2.5537235E−01 | 0.0000000E+00 | −5.7700539E−01 | 2.1744465E+00 | −1.0948135E−00 |
| 10 | −2.9624709E+00 | 0.0000000E+00 | −2.7792323E−01 | 3.4222534E−01 | 2.0191706E−01 |
| 11 | −1.4499304E−01 | 0.0000000E+00 | 4.3011341E−02 | −1.2069363E−01 | 1.5415399E−01 |
| 12 | 7.5959719E+01 | 0.0000000E+00 | −1.9604761E−01 | 4.5015247E−02 | 7.7474799E−02 |
| 13 | −4.3909603E+00 | 0.0000000E+00 | −2.4439879E−01 | 2.3973631E−01 | −1.0251788E−01 |

| | A7 | A8 | A9 | A10 | A11 |
|---|---|---|---|---|---|
| 2 | −4.3631124E−01 | 8.3364453E+00 | −1.9448364E+01 | 1.9612277E+01 | 2.2569585E+00 |
| 3 | 2.0383121E+01 | −6.2531832E+01 | 6.9464710E+01 | 9.3589425E+00 | −9.0191901E+01 |
| 4 | 5.1142671E+00 | −8.8640353E+00 | 6.2668031E+00 | −3.5724409E+00 | −8.1717896E−01 |
| 5 | −2.6355392E−01 | 3.6858155E−01 | −3.7324172E−01 | 1.3859989E−01 | 4.7432088E−01 |
| 6 | 7.8719056E−01 | 2.9092434E−01 | 7.2005808E−01 | −2.9884552E+00 | 2.1749402E+00 |
| 7 | −6.5345002E−01 | 7.2645216E−01 | 1.0224189E+00 | −1.9433241E+00 | −2.8955460E−01 |
| 8 | −1.5017668E+00 | 6.3622332E−01 | 7.1958104E+00 | −8.8368426E−02 | −6.9177968E−01 |
| 9 | −7.5363966E+00 | 1.6247468E+01 | −7.7047529E+00 | −1.0414221E+01 | 1.0521581E+01 |
| 10 | −3.1081529E−01 | −2.9275846E−02 | 8.2565642E−02 | 3.0671530E−02 | −3.7489503E−02 |
| 11 | 5.4900981E−02 | −1.1699685E−01 | 2.1233697E−02 | 9.5555770E−03 | 1.2106173E−03 |
| 12 | −7.6606738E−03 | −1.7832837E−02 | 5.1556538E−04 | 2.1415578E−03 | 3.3251434E−04 |
| 13 | 2.4737760E−02 | −1.2162426E−02 | 9.4360281E−03 | −4.3968570E−03 | 1.4122468E−03 |

| | A12 | A13 | A14 | A15 | A16 |
|---|---|---|---|---|---|
| 2 | −2.8144261E+01 | 1.6653184E+01 | 2.4125912E+01 | −3.4647414E+01 | 1.2353203E+01 |
| 3 | 8.1653303E+01 | −5.5735486E+01 | 6.9964202E+01 | −5.9135758E+01 | 1.8215971E+01 |
| 4 | 1.2347336E+01 | −3.5823216E+00 | −2.7197245E+01 | 3.1583788E+01 | −1.0338203E+01 |
| 5 | −5.9776069E−01 | −2.7252612E−01 | 9.9184608E−01 | −7.2180523E−01 | 1.8051754E−01 |
| 6 | −1.7581871E−01 | 1.7443407E+00 | −3.7854482E+00 | 2.5355717E+00 | −5.7627895E−01 |
| 7 | 1.9238039E+00 | −4.5813046E−01 | −8.9312518E−01 | 5.8042039E−01 | −9.7743308E−02 |
| 8 | 1.0528134E+00 | 2.9902610E−01 | −5.7532725E−02 | −6.5490016E−02 | 2.0368065E−02 |
| 9 | 3.0862117E+00 | −5.5509631E+00 | −8.0505696E−01 | 2.4085826E+00 | −6.7214479E−01 |
| 10 | 2.0718745E−03 | 4.4825407E−03 | −3.6898303E−04 | −4.0498012E−04 | 7.2049067E−05 |
| 11 | −5.2424750E−03 | 1.7877170E−03 | 2.4734400E−03 | −2.0172706E−03 | 3.9163773E−04 |
| 12 | −3.2637399E−04 | 9.6779276E−06 | 1.6431650E−05 | −2.7306762E−06 | 1.3248636E−07 |
| 13 | −4.6331105E−04 | 1.6179405E−04 | −4.1185184E−05 | 5.8520641E−06 | −3.4294203E−07 |

TABLE 21

Example 11
f = 3.544, Bf = 1.114, Fno. = 2.05, 2ω = 82.6

| Si | Ri | Di | Ndj | νdj |
|---|---|---|---|---|
| 1 (aperture stop) | ∞ | −0.107 | | |
| *2 | 1.74510 | 0.486 | 1.54488 | 54.87 |
| *3 | −24.89945 | 0.006 | | |
| *4 | 7.13117 | 0.235 | 1.63350 | 23.62 |
| *5 | 2.49019 | 0.453 | | |
| *6 | 14.04462 | 0.417 | 1.54488 | 54.87 |
| *7 | 13.03244 | 0.282 | | |
| *8 | −6.09899 | 0.511 | 1.54488 | 54.87 |
| *9 | −0.98370 | 0.057 | | |
| *10 | −1.84491 | 0.278 | 1.63350 | 23.62 |
| *11 | −2.01427 | 0.300 | | |
| *12 | −33.26255 | 0.245 | 1.54488 | 54.87 |
| *13 | 1.16206 | 0.400 | | |
| 14 | ∞ | 0.210 | 1.51633 | 64.14 |
| 15 | ∞ | 0.576 | | |
| 16 (imaging plane) | ∞ | | | |

*aspherical surface

TABLE 23

Example 12
f = 3.727, Bf = 1.068, Fno. = 2.05, 2ω = 78.2

| Si | Ri | Di | Ndj | νdj |
|---|---|---|---|---|
| 1 (aperture stop) | ∞ | −0.133 | | |
| *2 | 1.68441 | 0.522 | 1.54488 | 54.87 |
| *3 | 25.06351 | 0.018 | | |
| *4 | 5.87502 | 0.258 | 1.63350 | 23.62 |
| *5 | 2.72308 | 0.486 | | |
| *6 | 15.01603 | 0.355 | 1.54488 | 54.87 |
| *7 | 12.83628 | 0.337 | | |
| *8 | −6.05025 | 0.406 | 1.54488 | 54.87 |
| *9 | −1.12138 | 0.136 | | |
| *10 | −1.87579 | 0.257 | 1.63350 | 23.62 |
| *11 | −2.03710 | 0.283 | | |
| *12 | −19.12546 | 0.243 | 1.54488 | 54.87 |
| *13 | 1.30943 | 0.400 | | |
| 14 | ∞ | 0.210 | 1.51633 | 64.14 |
| 15 | ∞ | 0.529 | | |
| 16 (imaging plane) | ∞ | | | |

*aspherical surface

TABLE 22

Example 11: Aspherical Surface Data

| Surface Number | KA | A3 | A4 | A5 | A6 |
|---|---|---|---|---|---|
| 2 | 2.9322606E+00 | 0.0000000E+00 | −3.2511301E−01 | 3.2490754E+00 | −1.4478560E+01 |
| 3 | −1.5997328E+03 | 0.0000000E+00 | −3.1161172E−01 | 5.1222788E−02 | 1.7935043E+00 |
| 4 | −6.6780671E+02 | 0.0000000E+00 | −2.5217866E−01 | 1.2858670E+00 | −1.3264320E+00 |
| 5 | −1.6534660E+00 | 0.0000000E+00 | 6.4351484E−02 | 2.0094691E−01 | −1.3557375E−01 |
| 6 | 4.6801116E+01 | 0.0000000E+00 | −3.1884560E−01 | 6.7981648E−01 | −7.9151484E−01 |
| 7 | 1.3134237E+02 | 0.0000000E+00 | −3.2385486E−01 | 4.6946706E−01 | −1.8503406E−01 |
| 8 | −4.7091113E+02 | 0.0000000E+00 | −4.7234334E−01 | 4.8549417E−01 | 1.2149956E−02 |
| 9 | −8.2291100E−04 | 0.0000000E+00 | −2.7370630E−01 | 1.4330176E+00 | −8.6586208E−01 |
| 10 | −5.0718336E+00 | 0.0000000E+00 | −2.5932021E−02 | 2.1765459E−01 | 2.6901644E−01 |
| 11 | −1.2425760E−01 | 0.0000000E+00 | 2.8755614E−01 | −1.8689342E−01 | −6.6603261E−02 |
| 12 | −1.6683144E+01 | 0.0000000E+00 | −7.8222012E−02 | −6.2201784E−02 | 5.7094544E−02 |
| 13 | −3.5437190E+00 | 0.0000000E+00 | −2.8470193E−01 | 3.0139997E−01 | −1.3536008E−01 |

| | A7 | A8 | A9 | A10 | A11 |
|---|---|---|---|---|---|
| 2 | 1.5549664E+01 | 6.9303359E+01 | −1.9253683E+02 | −1.2484642E+02 | 1.2011695E+03 |
| 3 | 5.7197315E+00 | −2.4605282E+01 | −5.2290124E+00 | 8.4923363E+01 | −4.5978484E+01 |
| 4 | 2.5078122E+00 | −1.2947664E+01 | 2.3378864E+01 | −1.1655838E+01 | −1.0278231E+01 |
| 5 | −1.8675759E−01 | 2.0936534E−01 | −1.5139817E−02 | −1.0740939E−01 | 1.9256901E−01 |
| 6 | −1.4391961E−01 | 2.8070426E−02 | 1.8898765E+00 | −1.7482853E−01 | −6.8569417E−01 |
| 7 | −9.9359831E−01 | 1.7833823E+00 | −8.8278799E−01 | −5.4002484E−01 | −3.2780657E−01 |
| 8 | 2.7404204E−01 | −3.0682738E−01 | −6.2239381E−01 | 4.1375737E−01 | 5.0966241E−01 |
| 9 | −4.7708207E+00 | 1.1543258E+01 | −8.1023263E+00 | −3.8580862E+00 | 8.2221966E+00 |
| 10 | −8.6212846E−01 | 2.5931366E−01 | 4.5500730E−01 | −4.1657905E−01 | 2.0889710E−01 |
| 11 | 7.1225916E−02 | 5.0277021E−03 | −4.1262044E−02 | 1.0136775E−02 | 2.5248702E−02 |
| 12 | 1.0230097E−02 | −5.1097103E−03 | −3.1084171E−03 | −9.2768013E−04 | 1.3022933E−03 |
| 13 | 1.3474422E−02 | 1.4958665E−02 | −9.2823360E−03 | 2.7695136E−03 | −7.6811589E−05 |

| | A12 | A13 | A14 | A15 | A16 |
|---|---|---|---|---|---|
| 2 | −2.0390551E+03 | 1.4056018E+03 | −8.3794053E+01 | −3.8668914E+02 | 1.4661387E+02 |
| 3 | −8.9419245E+01 | 9.2069832E+00 | 2.2165961E+02 | −2.2762648E+02 | 6.9693006E+01 |
| 4 | 6.4082729E+00 | 2.0677732E+01 | −3.5046021E+01 | 2.3697099E+01 | −6.4018603E+00 |
| 5 | −3.7457577E−02 | −3.7145863E−01 | 5.4303049E−01 | −3.1707065E−01 | 7.0340358E−02 |
| 6 | 1.0373302E+00 | 1.3752003E+00 | −2.4184503E+00 | −1.0078462E−01 | 7.0712383E−02 |
| 7 | 1.2580808E+00 | 6.9788094E−01 | −2.2948971E+00 | 1.3867277E+00 | −2.6531113E−01 |
| 8 | −3.0299151E−01 | −3.0037654E−01 | 3.1425851E−01 | −1.0810372E−01 | 1.4949897E−02 |
| 9 | −2.4284949E+00 | −1.5748178E+00 | 6.8053648E−01 | 2.5542704E−01 | −1.2129810E−01 |
| 10 | −1.3017200E−01 | 5.2710253E−02 | 7.5257259E−03 | −1.2165070E−02 | 2.4170963E−03 |
| 11 | −1.1175198E−02 | −5.0681997E−03 | 3.7473673E−03 | −6.0855420E−04 | 8.2290576E−06 |
| 12 | 2.1956139E−04 | −5.3596657E−04 | 2.3882198E−04 | −4.8820933E−05 | 3.9913331E−06 |
| 13 | −2.9649105E−04 | 5.7335014E−05 | 2.9715601E−05 | −1.3189372E−05 | 1.4886566E−06 |

TABLE 24

Example 12: Aspherical Surface Data

| Surface Number | KA | A3 | A4 | A5 | A6 |
|---|---|---|---|---|---|
| 2 | 2.8697793E+00 | 0.0000000E+00 | −3.5696736E−01 | 4.7678471E+00 | −3.3182760E+01 |
| 3 | 1.7532585E+02 | 0.0000000E+00 | −9.1694489E−01 | 3.8272710E+00 | −2.5339354E+01 |
| 4 | −7.5003364E+02 | 0.0000000E+00 | −4.9465998E−01 | 1.0640207E+00 | 2.9346851E+00 |
| 5 | −1.6553826E+01 | 0.0000000E+00 | −2.8976003E−02 | 3.2283886E−01 | −1.1223987E−01 |
| 6 | 1.3109761E+02 | 0.0000000E+00 | −3.4345956E−01 | 5.2230632E−01 | −3.1810460E−01 |
| 7 | 1.2882115E+02 | 0.0000000E+00 | −3.5430249E−01 | 2.4452366E−01 | 2.0689585E−01 |
| 8 | −5.9059182E+02 | 0.0000000E+00 | −4.9146037E−01 | 1.6991329E−01 | 5.7602849E−01 |
| 9 | −1.9052757E−02 | 0.0000000E+00 | −4.9080805E−01 | 2.4883017E+00 | −3.8809056E+00 |
| 10 | −5.2782291E+00 | 0.0000000E+00 | 5.9390109E−02 | 4.0992199E−01 | −1.6056374E−01 |
| 11 | −1.6431816E−01 | 0.0000000E+00 | 3.9343779E−01 | −1.7481341E−01 | 1.6266891E−02 |
| 12 | 5.6238563E+01 | 0.0000000E+00 | 2.0105884E−03 | −1.7231411E−01 | 2.6499629E−02 |
| 13 | −3.4543300E+00 | 0.0000000E+00 | −2.5917269E−01 | 2.0001144E−01 | −5.6549425E−02 |

| Surface Number | A7 | A8 | A9 | A10 | A11 |
|---|---|---|---|---|---|
| 2 | 1.1938341E+02 | −2.2565691E+02 | 1.6779443E+02 | 1.1880766E+02 | −2.9554083E+02 |
| 3 | 1.3655684E+02 | −3.9702707E+02 | 5.9823799E+02 | −3.4650316E+02 | −2.2538967E+02 |
| 4 | −1.4709233E+01 | 2.5019345E+01 | −1.7412132E+01 | −9.6394795E+00 | 3.5213191E+01 |
| 5 | −2.4214744E−01 | 5.9542166E−02 | 2.7269226E−01 | −2.6338404E−01 | 3.3027861E−01 |
| 6 | −8.0986885E−01 | 1.0235587E+00 | 9.8583564E−01 | −2.8740309E+00 | 2.8458782E+09 |
| 7 | −6.0394508E−01 | 2.7418629E−01 | −1.0603583E−01 | 2.6184220E−02 | 2.4585056E−01 |
| 8 | 4.4355513E−01 | −1.0139418E+00 | −5.9496369E−01 | 6.1357873E−01 | 8.0403998E−01 |
| 9 | −3.5503963E−01 | 9.2959066E+00 | −9.4611389E+00 | −1.7610301E−01 | 2.4583765E+00 |
| 10 | −5.2757635E−01 | 1.4356030E−01 | 2.8741953E−01 | −8.7820646E−02 | −7.6792337E−02 |
| 11 | −2.7144515E−01 | 2.0468189E−01 | −5.3468675E−02 | 7.4479194E−02 | −5.8769790E−02 |
| 12 | 1.2957562E−01 | −8.9534695E−02 | 3.2190749E−02 | −1.0545645E−02 | 4.2027271E−03 |
| 13 | 7.6393954E−03 | −5.3369791E−03 | 2.5633655E−03 | 4.6875181E−04 | −8.0545393E−04 |

| Surface Number | A12 | A13 | A14 | A15 | A16 |
|---|---|---|---|---|---|
| 2 | 1.3729794E+02 | −4.0478226E−01 | 9.7460002E+01 | −1.4043395E+02 | 4.9783270E+01 |
| 3 | 4.4384680E+02 | −1.9753403E+02 | 3.4245835E+00 | −3.9240380E+00 | 1.0607202E+01 |
| 4 | −2.6247502E+01 | −3.1825340E+01 | 8.3035363E+01 | −6.4852396E+01 | 1.7943586E+01 |
| 5 | −5.0816459E−01 | 4.0958542E−01 | −1.2878905E−01 | −1.4708240E−02 | 1.3795673E−02 |
| 6 | −1.4603281E+00 | −9.3666692E−01 | 2.4483844E+00 | −1.6640385E+00 | 3.8947550E−01 |
| 7 | −1.4411208E−01 | −1.1493653E−01 | 1.1761212E−01 | −6.0947354E−02 | 1.9375614E−02 |
| 8 | −6.2779519E−01 | −1.9809637E−01 | 2.5219929E−01 | −5.8201395E−02 | 2.5164156E−03 |
| 9 | 2.6856828E+00 | −2.4594938E+00 | −1.0459279E+00 | 1.4082340E+00 | −3.4070721E−01 |
| 10 | 3.2683875E−02 | 4.9642098E−03 | −2.6628193E−03 | −4.7806880E−04 | 1.6923679E−04 |
| 11 | 9.1122417E−03 | −2.7544697E−03 | 8.3076235E−03 | −4.3287113E−03 | 6.6049307E−04 |
| 12 | −4.8941761E−03 | 4.5033764E−03 | −2.0716170E−03 | 4.6804431E−04 | −4.2269964E−05 |
| 13 | 1.4940743E−04 | 1.1333338E−04 | −6.8571879E−05 | 1.4822627E−05 | −1.1969224E−06 |

TABLE 25

Values Related to Conditional Formulae

| Formula | Conditional Expression | Example 1 | Example 2 | Example 3 | Example 4 | Example 5 | Example 6 |
|---|---|---|---|---|---|---|---|
| 1 | f/f6 | −1.67 | −1.67 | −1.67 | −1.68 | −1.67 | −1.67 |
| 2 | f · P23 | −1.0 | −1.0 | −0.8 | −1.0 | −0.6 | −0.6 |
| 3 | f/f5 | −0.033 | −0.035 | −0.034 | −0.035 | −0.035 | −0.036 |
| 4 | (L5r − L5f)/(L5r + L5f) | 0.040 | 0.043 | 0.044 | 0.044 | 0.040 | 0.041 |
| 5 | f · tanω/L6r | 2.0 | 2.1 | 2.1 | 2.0 | 2.2 | 2.2 |

| Formula | Conditional Expression | Example 7 | Example 8 | Example 9 | Example 10 | Example 11 | Example 12 |
|---|---|---|---|---|---|---|---|
| 1 | f/f6 | −0.90 | −1.08 | −1.38 | −1.66 | −1.72 | −1.66 |
| 2 | f · P23 | −1.0 | −1.0 | −1.0 | −1.0 | −0.8 | −0.7 |
| 3 | f/f5 | −0.083 | −0.083 | −0.084 | −0.035 | −0.037 | −0.038 |
| 4 | (L5r − L5f)/(L5r + L5f) | 0.061 | 0.061 | 0.058 | 0.043 | 0.044 | 0.041 |
| 5 | f · tanω/L6r | 1.1 | 1.3 | 1.8 | 2.3 | 2.7 | 2.3 |

Note that the above paraxial radii of curvature, the distances among surfaces, the refractive indices, and the Abbe's numbers were obtained by measurements performed by specialists in the field of optical measurement, according to the methods described below.

The paraxial radii of curvature were obtained by measuring the lenses using an ultra high precision three dimensional measurement device UA3P (by Panasonic Factory Solutions K. K.) by the following procedures. A paraxial radius of curvature $R_m$ (m is a natural number) and a conical coefficient $K_m$ are preliminarily set and input into UA3P, and an nth order aspherical surface coefficient An of an aspherical shape formula is calculated from the input paraxial radius of curvature $R_m$ and conical coefficient $K_m$ and the measured data, using a fitting function of UA3P. $C=1/R_m$ and $KA=K_m-1$ are considered in the aforementioned aspherical surface shape formula (A). Depths Z of an aspherical surface in the direction of the optical axis corresponding to heights h from the optical axis are calculated from $R_m$, $K_m$, An, and the aspherical surface shape formula. The difference between the calculated depths Z and actually measured depth values Z' are obtained for each height h from the optical axis. Whether the difference is within a predetermined range is judged. In the case that the difference is within the predetermined range, $R_m$ is designated as the paraxial radius of curvature. On the other hand, in the case that the difference is outside the predetermined range, the value of at least one of $R_m$ and $K_m$ is changed, set as $R_{m+1}$ and $K_{m+1}$, and input to UA3P. The processes described above are performed, and judgment regarding whether the difference between the calculated depths Z and actually measured depth values Z' for each height h from the optical axis is within a predetermined range is judged. These procedures are repeated until the difference between the calculated depths Z and actually measured depth values Z' for each height h from the optical axis is within a predetermined range. Note that here, the predetermined range is set to be 200 nm or less. In addition, a range from 0 to ⅕ the maximum lens outer diameter is set as the range of h.

The distances among surfaces are obtained by measurements using OptiSurf (by Trioptics), which is an apparatus for measuring the central thicknesses and distances between surfaces of paired lenses.

The refractive indices are obtained by performing measurements in a state in which the temperature of a measurement target is 25° C., using KPR-2000 (by K. K. Shimadzu), which is a precision refractometer. The refractive index measured with respect to the d line (wavelength: 587.6 nm) is designated as Nd. Similarly, the refractive index measured with respect to the e line (wavelength: 546.1 nm) is designated as Ne, the refractive index measured with respect to the F line (wavelength: 486.1 nm) is designated as NF, the refractive index measured with respect to the C line (wavelength: 656.3 nm) is designated as NC, and the refractive index measured with respect to the g line (wavelength: 435.8 nm) is designated as Ng. The Abbe's number νd with respect to the d line is obtained by calculations, substituting the values of Nd, NF, and NC obtained by the above measurements into the formula below.

$$\nu d=(Nd-1)/(NF-NC)$$

What is claimed is:

1. An imaging lens substantially consisting of six lenses, including:
   a first lens having a positive refractive power and a convex surface toward the object side;
   a second lens having a negative refractive power;
   a third lens having a negative refractive power;
   a fourth lens having a positive refractive power;
   a fifth lens having a negative refractive power; and
   a sixth lens having a biconcave shape, provided in this order from the object side.

2. An imaging lens as defined in claim 1, wherein:
   the fifth lens is of a meniscus shape having a concave surface toward the object side.

3. An imaging lens as defined in claim 1, wherein:
   the fourth lens has a convex surface toward the image side.

4. An imaging lens as defined in claim 1, wherein:
   the second lens has a concave surface toward the image side.

5. An imaging lens as defined in claim 1 that further satisfies the following conditional formula:

$$-10<f/f6<-0.8 \tag{1}$$

wherein f is the focal length of the entire system, and f6 is the focal length of the sixth lens.

6. An imaging lens as defined in claim 1 that further satisfies the following conditional formula:

$$-1.1<f \cdot P23<0 \tag{2}$$

wherein f is the focal length of the entire system, P23 is the refractive power of an air lens formed between the surface of the second lens toward the image side and the surface of the third lens toward the object side, the refractive power of the air lens being obtained by Formula (P) below:

$$P23 = \frac{1-Nd2}{L2r} + \frac{Nd3-1}{L3f} - \frac{(1-Nd2) \times (Nd3-1) \times D5}{L2r \times L3f} \tag{P}$$

wherein Nd2 is the refractive index of the second lens with respect to the d line, Nd3 is the refractive index of the third lens with respect to the d line, L2r is the paraxial radius of curvature of the surface of the second lens toward the image side, L3f is the paraxial radius of curvature of the surface of the third lens toward the object side, and D5 is an air space distance between the second lens and the third lens along the optical axis.

7. An imaging lens as defined in claim 1 that further satisfies the following conditional formula:

$$-0.088<f/f5<0 \tag{3}$$

wherein f is the focal length of the entire system, and f5 is the focal length of the fifth lens.

8. An imaging lens as defined in claim 1 that further satisfies the following conditional formula:

$$0<(L5r-L5f)/(L5r+L5f)<0.073 \tag{4}$$

wherein L5f is the paraxial radius of curvature of the surface of the fifth lens toward the object side, and L5r is the paraxial radius of curvature of the surface of the fifth lens toward the image side.

9. An imaging lens as defined in claim 1 that further satisfies the following conditional formula:

$$0.5<f \tan \omega/L6r<20 \tag{5}$$

wherein f is the focal length of the entire system, ω is half the maximum angle of view when focused on an object at infinity, and L6r is the paraxial radius of curvature of the surface of the sixth lens toward the image side.

10. An imaging lens as defined in claim 1 that further satisfies the following conditional formula:

$$-5<f/f6<-0.85 \tag{1-1}$$

wherein f is the focal length of the entire system, and f6 is the focal length of the sixth lens.

11. An imaging lens as defined in claim 1 that further satisfies the following conditional formula:

$$-1.1<f \cdot P23<-0.2 \tag{2-1}$$

wherein f is the focal length of the entire system, P23 is the refractive power of an air lens formed between the surface of the second lens toward the image side and the surface of the third lens toward the object side, the refractive power of the air lens being obtained by Formula (P) below:

$$P23 = \frac{1-Nd2}{L2r} + \frac{Nd3-1}{L3f} - \frac{(1-Nd2) \times (Nd3-1) \times D5}{L2r \times L3f} \quad (P)$$

wherein Nd2 is the refractive index of the second lens with respect to the d line, Nd3 is the refractive index of the third lens with respect to the d line, L2r is the paraxial radius of curvature of the surface of the second lens toward the image side, L3f is the paraxial radius of curvature of the surface of the third lens toward the object side, and D5 is an air space distance between the second lens and the third lens along the optical axis.

12. An imaging lens as defined in claim 1 that further satisfies the following conditional formula:

$$-0.088 < f/f5 < -0.02 \quad (3\text{-}1)$$

wherein f is the focal length of the entire system, and f5 is the focal length of the fifth lens.

13. An imaging lens as defined in claim 1 that further satisfies the following conditional formula:

$$0.02 < (L5r-L5f)/(L5r+L5f) < 0.068 \quad (4\text{-}1)$$

wherein L5f is the paraxial radius of curvature of the surface of the fifth lens toward the object side, and L5r is the paraxial radius of curvature of the surface of the fifth lens toward the image side.

14. An imaging lens as defined in claim 1 that further satisfies the following conditional formula:

$$0.7 < f \cdot \tan \omega / L6r < 10 \quad (5\text{-}1)$$

wherein f is the focal length of the entire system, ω is half the maximum angle of view when focused on an object at infinity, and L6r is the paraxial radius of curvature of the surface of the sixth lens toward the image side.

15. An imaging lens as defined in claim 1 that further satisfies the following conditional formula:

$$-3 < f/f6 < -0.89 \quad (1\text{-}2)$$

wherein f is the focal length of the entire system, and f6 is the focal length of the sixth lens.

16. An imaging lens as defined in claim 1 that further satisfies the following conditional formula:

$$-1.1 < f \cdot P23 < -0.4 \quad (2\text{-}2)$$

wherein f is the focal length of the entire system, P23 is the refractive power of an air lens formed between the surface of the second lens toward the image side and the surface of the third lens toward the object side, the refractive power of the air lens being obtained by Formula (P) below:

$$P23 = \frac{1-Nd2}{L2r} + \frac{Nd3-1}{L3f} - \frac{(1-Nd2) \times (Nd3-1) \times D5}{L2r \times L3f} \quad (P)$$

wherein Nd2 is the refractive index of the second lens with respect to the d line, Nd3 is the refractive index of the third lens with respect to the d line, L2r is the paraxial radius of curvature of the surface of the second lens toward the image side, L3f is the paraxial radius of curvature of the surface of the third lens toward the object side, and D5 is an air space distance between the second lens and the third lens along the optical axis.

17. An imaging lens as defined in claim 1 that further satisfies the following conditional formula:

$$-0.085 < f/f5 < -0.03 \quad (3\text{-}2)$$

wherein f is the focal length of the entire system, and f5 is the focal length of the fifth lens.

18. An imaging lens as defined in claim 1 that further satisfies the following conditional formula:

$$0.03 < (L5r-L5f)/(L5r+L5f) < 0.063 \quad (4\text{-}2)$$

wherein L5f is the paraxial radius of curvature of the surface of the fifth lens toward the object side, and L5r is the paraxial radius of curvature of the surface of the fifth lens toward the image side.

19. An imaging lens as defined in claim 1 that further satisfies the following conditional formula:

$$1 < f \cdot \tan \omega / L6r < 5 \quad (5\text{-}2)$$

wherein f is the focal length of the entire system, ω is half the maximum angle of view when focused on an object at infinity, and L6r is the paraxial radius of curvature of the surface of the sixth lens toward the image side.

20. An imaging apparatus comprising an imaging lens as defined in claim 1.

* * * * *